(12) United States Patent
Huang

(10) Patent No.: US 8,363,900 B2
(45) Date of Patent: Jan. 29, 2013

(54) IMAGE PROCESSING APPARATUS, IMAGE PROCESSING METHOD, AND PROGRAM

(75) Inventor: Yenshan Huang, Tokyo (JP)

(73) Assignee: Sony Corporation (JP)

( * ) Notice: Subject to any disclaimer, the term of this patent is extended or adjusted under 35 U.S.C. 154(b) by 1016 days.

(21) Appl. No.: 12/378,821

(22) Filed: Feb. 19, 2009

(65) Prior Publication Data

US 2009/0231453 A1 Sep. 17, 2009

(30) Foreign Application Priority Data

Feb. 20, 2008 (JP) ................ P2008-038917

(51) Int. Cl.
*G06K 9/00* (2006.01)
(52) U.S. Cl. .................. 382/107; 382/103; 382/181
(58) Field of Classification Search .................. 382/103; 348/220.1, E5.031
See application file for complete search history.

(56) References Cited

U.S. PATENT DOCUMENTS

| | | | | |
|---|---|---|---|---|
| 4,839,631 A * | 6/1989 | Tsuji | ............ | 340/541 |
| 5,187,537 A * | 2/1993 | Asayama | ............ | 356/3.14 |
| 5,291,300 A * | 3/1994 | Ueda | ............ | 386/327 |
| 5,381,173 A * | 1/1995 | Asayama | ............ | 348/170 |
| 5,706,367 A * | 1/1998 | Kondo | ............ | 382/236 |
| 6,445,832 B1 * | 9/2002 | Lee et al. | ............ | 382/266 |
| 6,888,958 B1 * | 5/2005 | Sawa et al. | ............ | 382/144 |
| 7,027,054 B1 * | 4/2006 | Cheiky et al. | ............ | 345/473 |
| 7,127,120 B2 * | 10/2006 | Hua et al. | ............ | 382/254 |
| 7,200,266 B2 * | 4/2007 | Ozer et al. | ............ | 382/173 |
| 7,266,771 B1 * | 9/2007 | Tow et al. | ............ | 715/719 |
| 7,349,029 B1 * | 3/2008 | Chou | ............ | 348/448 |
| 7,970,170 B2 * | 6/2011 | Tener et al. | ............ | 382/103 |
| 8,004,614 B2 * | 8/2011 | Wyman et al. | ............ | 348/701 |
| 8,024,189 B2 * | 9/2011 | Zhang et al. | ............ | 704/246 |
| 2004/0008275 A1 * | 1/2004 | Yang et al. | ............ | 348/441 |
| 2005/0123201 A1 * | 6/2005 | Nakashima et al. | ............ | 382/195 |
| 2005/0275728 A1 * | 12/2005 | Mirtich et al. | ............ | 348/211.99 |
| 2007/0025594 A1 * | 2/2007 | Han et al. | ............ | 382/103 |

FOREIGN PATENT DOCUMENTS

| | | |
|---|---|---|
| JP | 11-032323 A | 2/1999 |
| JP | 2005-086734 A | 3/2005 |
| JP | 2005-128967 A | 5/2005 |
| JP | 2006-157604 A | 6/2006 |

* cited by examiner

*Primary Examiner* — Michelle Entezari

(74) *Attorney, Agent, or Firm* — Lerner, David, Littenberg, Krumholz & Mentlik, LLP

(57) ABSTRACT

An image processing apparatus includes: a determining unit configured to determine whether processing-target image data has image content matching a previously set motion pattern; and a validating unit configured to validate image data that is determined to match the motion pattern by the determining unit.

18 Claims, 35 Drawing Sheets

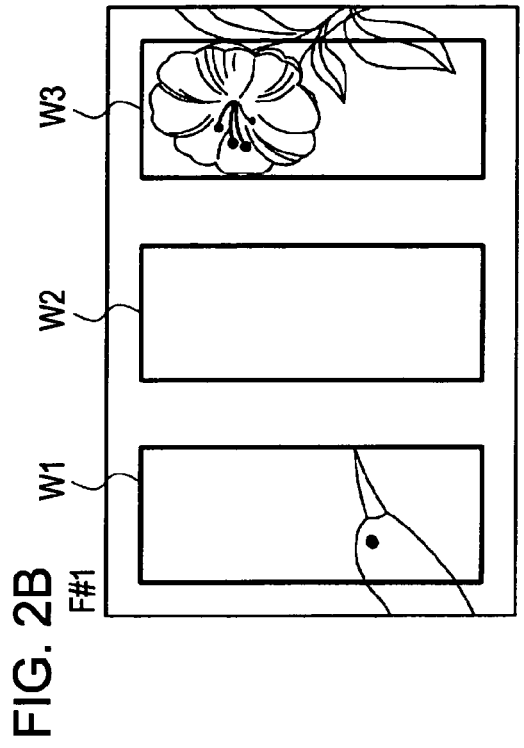
FIG. 2B F#1
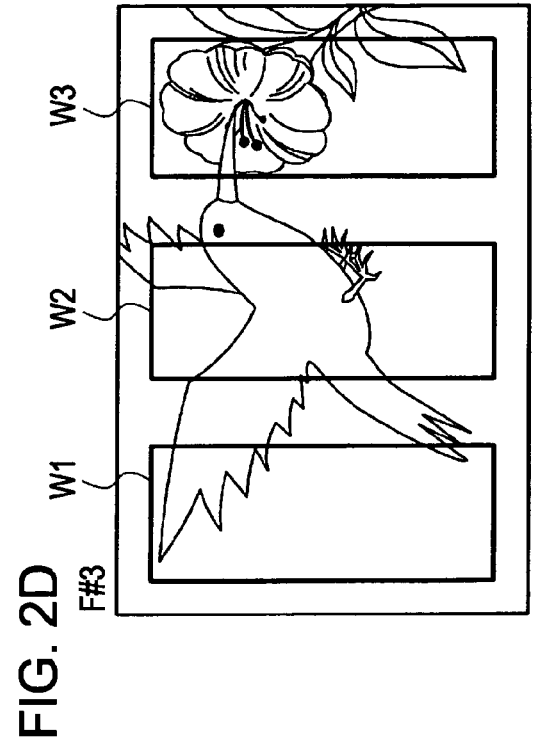
FIG. 2D F#3
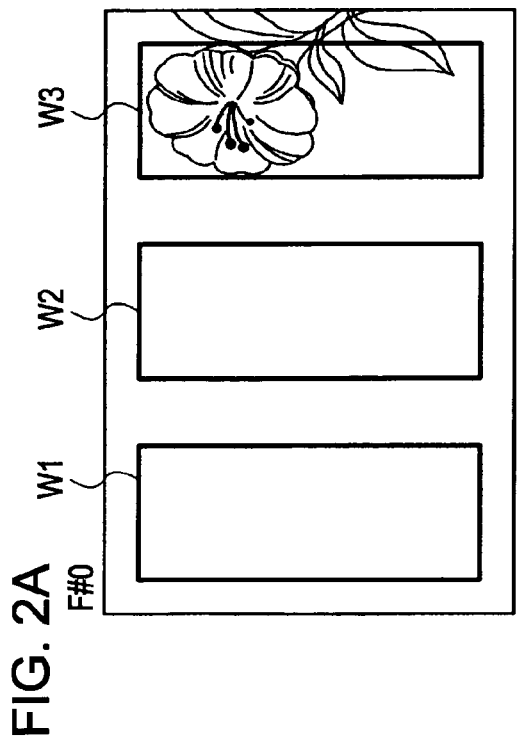
FIG. 2A F#0
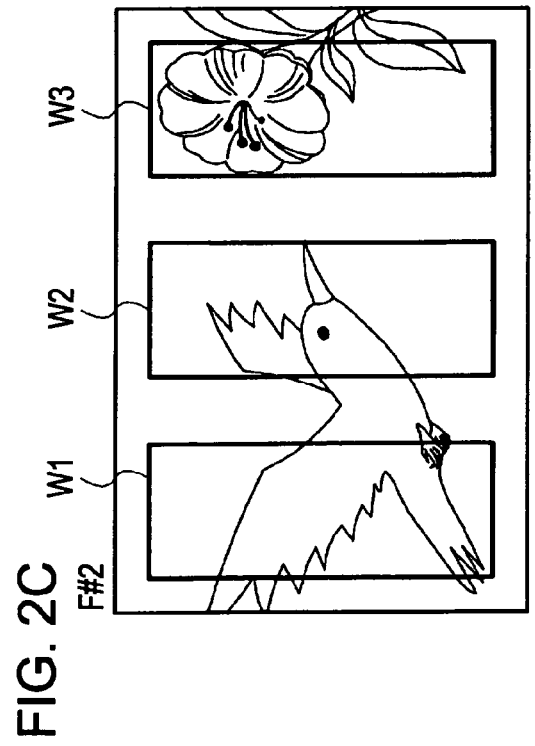
FIG. 2C F#2

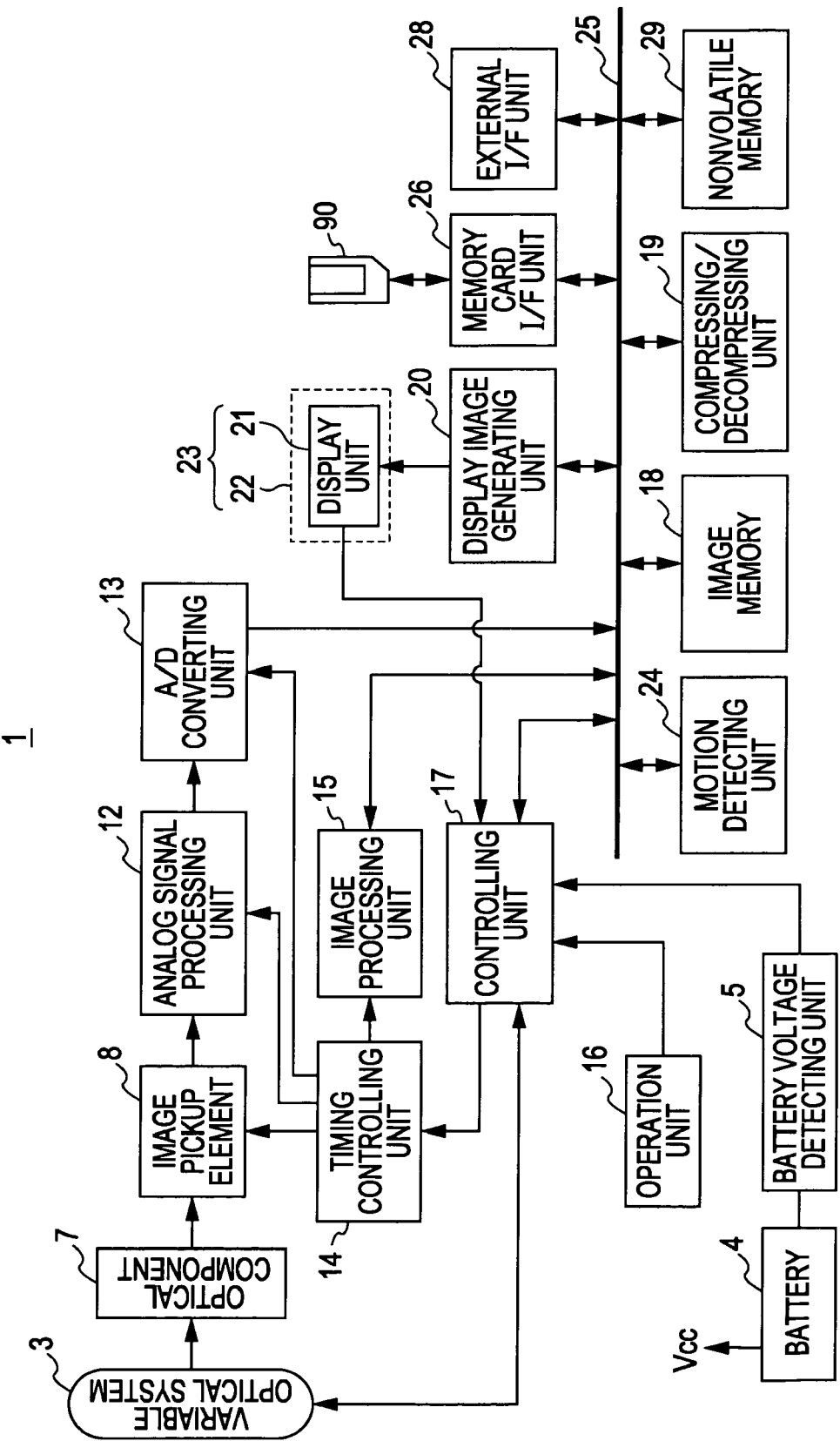

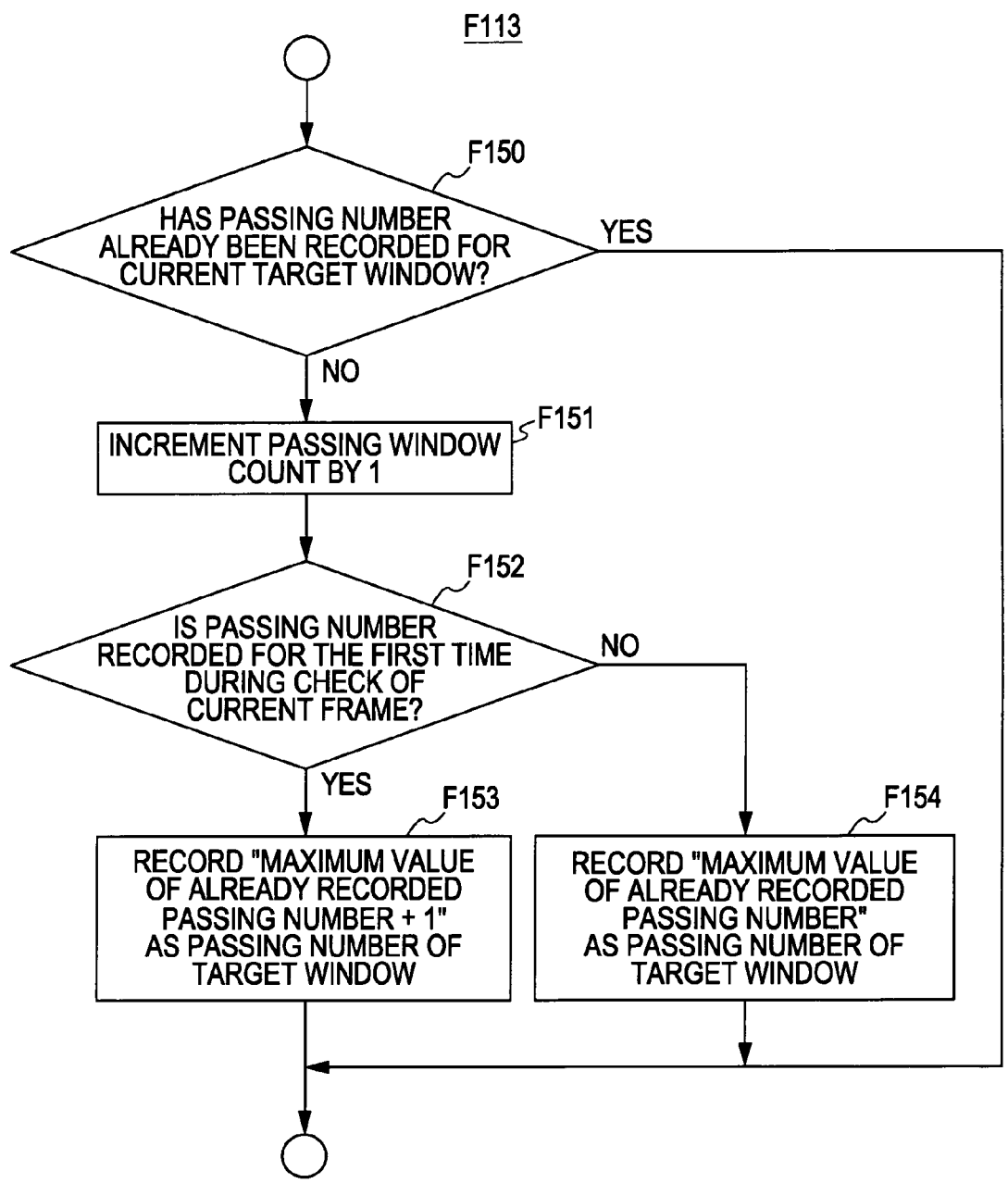

FIG. 12A

| MOVING OBJECT | | WINDOW | | | MOVING OBJECT CHECK FLAG |
|---|---|---|---|---|---|
| | | W1 | W2 | W3 | |
| M1 | | (rc) | (rc) | (rc) | (Mfin) |
| | WINDOW CHECK FLAG | (Wfin) | (Wfin) | (Wfin) | |
| M2 | | (rc) | (rc) | (rc) | (Mfin) |
| | WINDOW CHECK FLAG | (Wfin) | (Wfin) | (Wfin) | |
| M3 | | (rc) | (rc) | (rc) | (Mfin) |
| | WINDOW CHECK FLAG | (Wfin) | (Wfin) | (Wfin) | |

FIG. 12B

| PASSING NUMBER | W1 | 0 | IMAGE CAPTURING FLAG | OFF |
|---|---|---|---|---|
| | W2 | 0 | INVALID FLAG | OFF |
| | W3 | 0 | PASSING WINDOW COUNT | 0 |

FIG. 12C

| | WINDOW POSITION | MOTION VECTOR | WINDOW ORDER |
|---|---|---|---|
| W1 | Pw1 | Vw1 | Nw1 |
| W2 | Pw2 | Vw2 | Nw2 |
| W3 | Pw3 | Vw3 | Nw3 |

FIG. 13A

| MOVING OBJECT | | WINDOW | | | MOVING OBJECT CHECK FLAG |
|---|---|---|---|---|---|
| | | W1 | W2 | W3 | |
| M1 | WINDOW CHECK FLAG | ○ | — | — | |
| M2 | WINDOW CHECK FLAG | | | | |
| M3 | WINDOW CHECK FLAG | | | | |

FIG. 13B

| MOVING OBJECT | | WINDOW | | | MOVING OBJECT CHECK FLAG |
|---|---|---|---|---|---|
| | | W1 | W2 | W3 | |
| M1 | WINDOW CHECK FLAG | CHECKED | — | — | CHECKED |
| M2 | WINDOW CHECK FLAG | | | | |
| M3 | WINDOW CHECK FLAG | | | | |

FIG. 13C

| MOVING OBJECT | | WINDOW | | | MOVING OBJECT CHECK FLAG |
|---|---|---|---|---|---|
| | | W1 | W2 | W3 | |
| M1 | WINDOW CHECK FLAG | CHECKED | — | — | CHECKED |
| M2 | WINDOW CHECK FLAG | ○ | — | ○ | |
| M3 | WINDOW CHECK FLAG | | | | |

FIG. 13D

| MOVING OBJECT | | WINDOW | | | MOVING OBJECT CHECK FLAG |
|---|---|---|---|---|---|
| | | W1 | W2 | W3 | |
| M1 | WINDOW CHECK FLAG | CHECKED | — | — | CHECKED |
| M2 | WINDOW CHECK FLAG | CHECKED | — | ○ | |
| M3 | WINDOW CHECK FLAG | | | | |

FIG. 19

| | (1) | (2) | (3) | (4) | (5) | (6) | (7) | (8) | (9) | (10) | (11) |
|---|---|---|---|---|---|---|---|---|---|---|---|
| W1 | 1 | 1 | 1 | 1 | 1 | 2 | 2 | 3 | 2 | 3 | 2 |
| W2 | 2 | 2 | 1 | 1 | 3 | 1 | 1 | 1 | 1 | 2 | 2 |
| W3 | 3 | 2 | 2 | 1 | 2 | 3 | 2 | 2 | 1 | 1 | 1 |

PASSING NUMBER

COMPARISON SOURCE POINTER →
COMPARISON DESTINATION POINTER →

INVALID FLAG ON (columns (5)–(11))

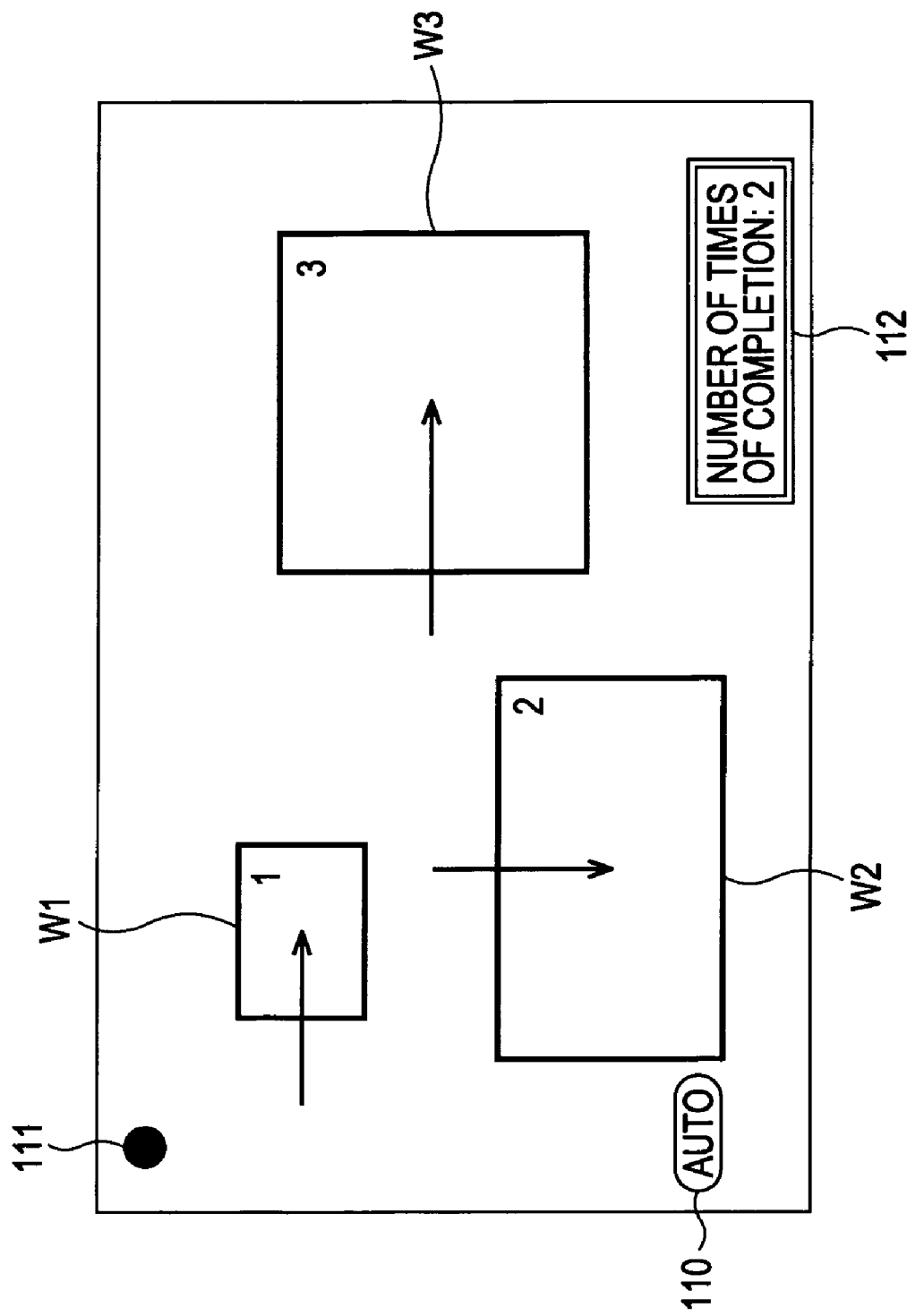

FIG. 21A

| MOVING OBJECT | WINDOW | | | MOVING OBJECT CHECK FLAG |
|---|---|---|---|---|
| | W1 | W2 | W3 | |
| M1 | ○ | — | — | CHECKED |
| WINDOW CHECK FLAG | CHECKED | | | |

| | | |
|---|---|---|
| PASSING NUMBER | W1 | 1 |
| | W2 | |
| | W3 | |

| | |
|---|---|
| IMAGE CAPTURING FLAG | ON |
| INVALID FLAG | OFF |
| PASSING WINDOW COUNT | 1 |

FIG. 21B

| MOVING OBJECT | WINDOW | | | MOVING OBJECT CHECK FLAG |
|---|---|---|---|---|
| | W1 | W2 | W3 | |
| M1 | ○ | ○ | — | CHECKED |
| WINDOW CHECK FLAG | CHECKED | CHECKED | | |

| | | |
|---|---|---|
| PASSING NUMBER | W1 | 1 |
| | W2 | 2 |
| | W3 | |

| | |
|---|---|
| IMAGE CAPTURING FLAG | ON |
| INVALID FLAG | OFF |
| PASSING WINDOW COUNT | 2 |

FIG. 21C

| MOVING OBJECT | WINDOW | | | MOVING OBJECT CHECK FLAG |
|---|---|---|---|---|
| | W1 | W2 | W3 | |
| M1 | ○ | ○ | ○ | CHECKED |
| WINDOW CHECK FLAG | CHECKED | CHECKED | CHECKED | |

| | | |
|---|---|---|
| PASSING NUMBER | W1 | 1 |
| | W2 | 2 |
| | W3 | 3 |

| | |
|---|---|
| IMAGE CAPTURING FLAG | ON |
| INVALID FLAG | OFF |
| PASSING WINDOW COUNT | 3 |

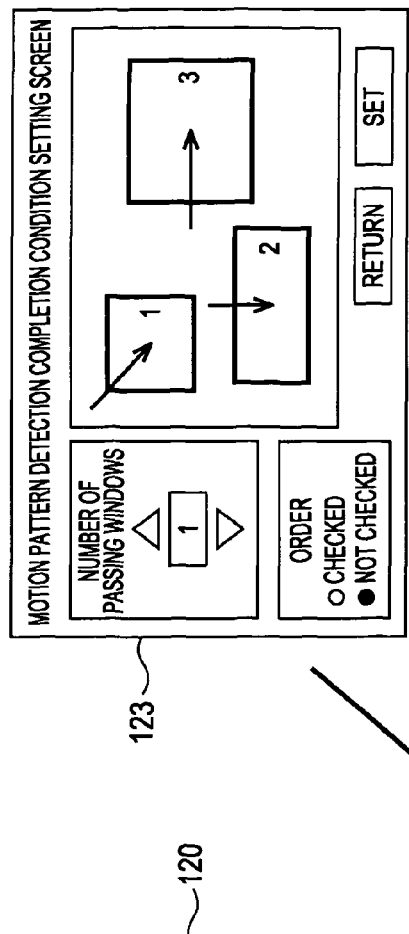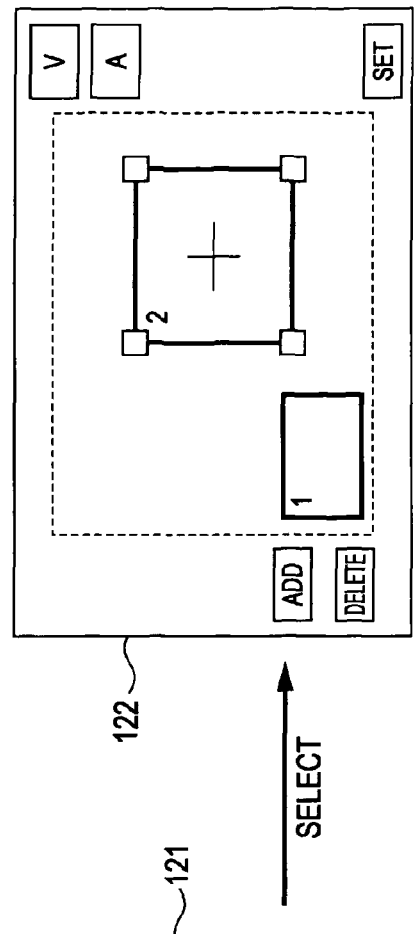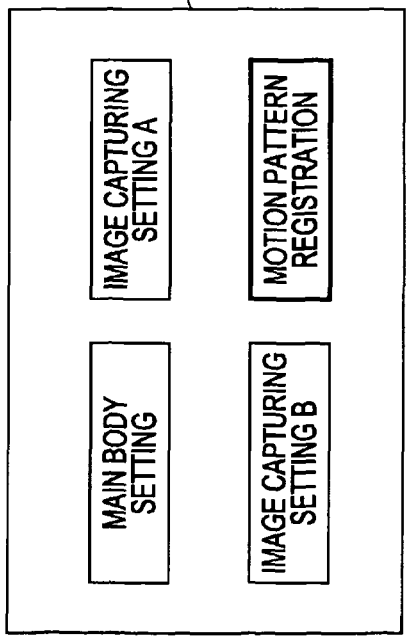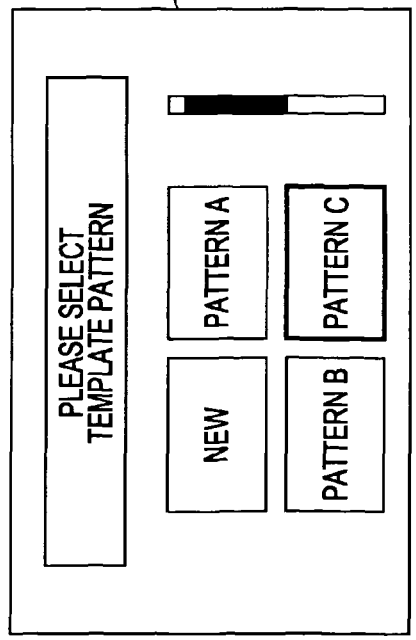

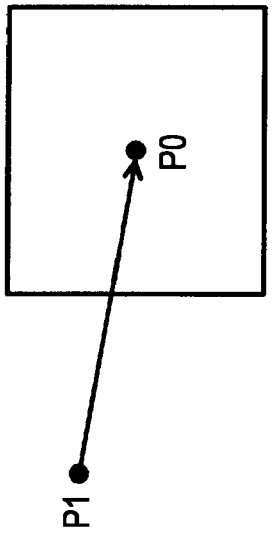
FIG. 28A
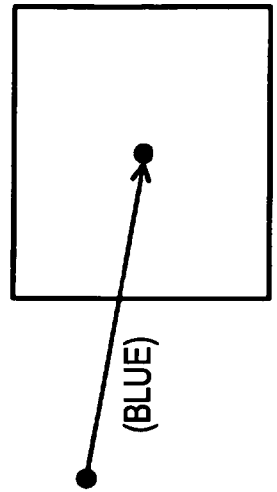
(BLUE)
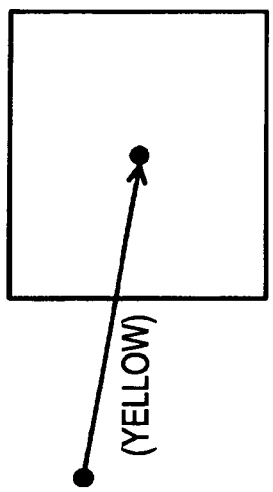
(YELLOW)
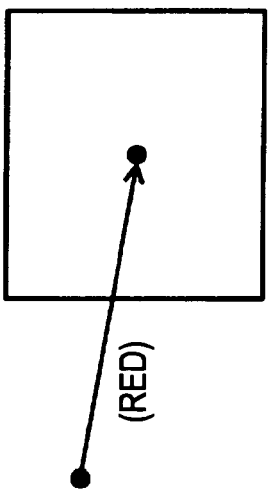
(RED)
FIG. 28B
· RED LINE: LARGE MOTION
· YELLOW LINE: MEDIUM MOTION
· BLUE LINE: SMALL MOTION (WINDOW ORDER IS PARTIALLY SPECIFIED)

(DIRECTION IS PARTIALLY SPECIFIED)

( DIRECTION IS PARTIALLY SPECIFIED
WINDOW ORDER IS PARTIALLY SPECIFIED )

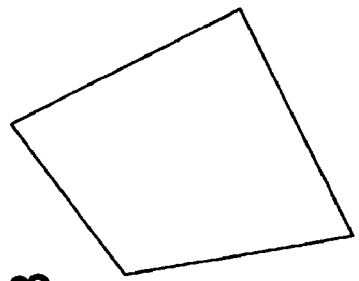
FIG. 31B
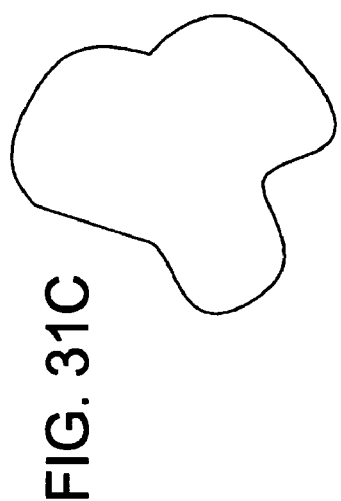
FIG. 31C
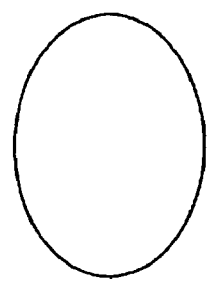 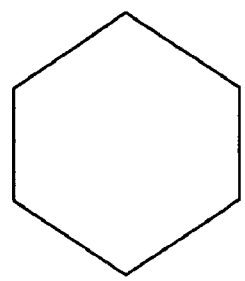 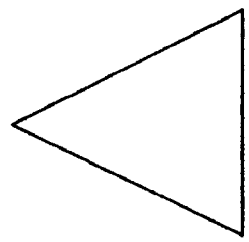
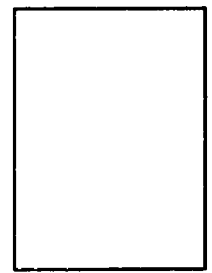 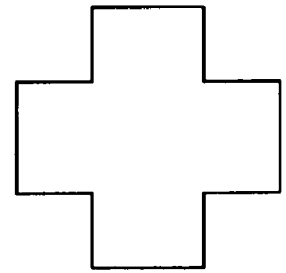 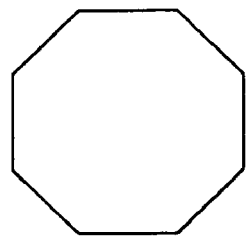
FIG. 31A

IMAGE PROCESSING APPARATUS, IMAGE PROCESSING METHOD, AND PROGRAM

CROSS REFERENCES TO RELATED APPLICATIONS

The present application claims priority from Japanese Patent Application No. JP 2008-038917, filed in the Japanese Patent Office on Feb. 20, 2008, the entire content of which is incorporated herein by reference.

BACKGROUND OF THE INVENTION

1. Field of the Invention

The present invention relates to image processing apparatuses, image processing methods, and programs. More particularly, the present invention relates to a technique for executing an appropriate operation after determining motion of a moving object represented as image content.

2. Description of the Related Art

Regarding image capturing apparatuses, such as, for example, digital still cameras, techniques for detecting the motion or the change of a subject to and capturing still images of the motion or the change available.

Japanese Unexamined Patent Application Publication No. 2006-246361 discloses, regarding capturing of still images executed during capturing of a video, a method for automatically capturing images when motion of a subject is large, when less motion blur is caused, or when a face is recognized.

Additionally, Japanese Unexamined Patent Application Publication No. 2006-121761 discloses a method for automatically capturing still images when a change in luminance or hue in a part specified by a user or a change in an image is detected through image recognition.

SUMMARY OF THE INVENTION

However, in the related art, motion of a subject intended by a user is not accurately detected with a simple method so as to capture and store the motion as, for example, still images.

For example, when still images are captured using motion detection, the detected motion often does not match motion intended by a user. As a result, circumstances in which many still images not desired by the user are captured are likely to occur.

For example, suppose that automatic image capturing is executed using motion detection when images of an object or a living thing set as a subject are captured against a given landscape. In this case, still images are captured when intended motion of a moving object does not occur but when wind moves leaves in the background.

That is, automatic image capturing using motion detection (hereinafter, referred to as motion-detection automatic image capturing) may not realize appropriate image capturing depending on a purpose of use of users.

A skilled image capturing technique is generally used to capture images of a specific moving object. Accordingly, it is difficult for non-skilled people to capture images of a moving object without using motion-detection automatic image capturing function.

The present invention proposes a technique for realizing still image capturing after determining motion of a target moving object more accurately during image capturing.

According to an embodiment of the present invention, an image processing apparatus includes determining means for determining whether processing-target image data has image content matching a previously set motion pattern, and validating means for validating image data that is determined to match the motion pattern by the determining means.

The determining means may perform moving object detection processing for detecting an image of a moving object from image data of one frame and determining whether the image data of the one frame is a candidate constituting the motion pattern using the detected image of the moving object, temporary storage processing for temporarily storing image data that is determined to be a candidate constituting the motion pattern in the moving object detection processing, and pattern matching determining processing for determining whether the image data temporarily stored in the temporary storage processing is an image matching the motion pattern.

In this case, the determining means may determine, in the moving object detection processing, whether the image data of the one frame is a candidate constituting the motion pattern using the image of the moving object detected from the image data of the one frame and a motion detection window specifying a range on a screen as setting information of the motion pattern.

The determining means may check, in the moving object detection processing, whether at least part of the image of the moving object is included in the range of the motion detection window as one kind of the processing for determining whether the image data is a candidate constituting the motion pattern.

The determining means may check, in the moving object detection processing, whether a moving direction or a moving amount of the image of the moving object matches a moving direction or a moving amount set for the motion detection window as one kind of the processing for determining whether the image data is a candidate constituting the motion pattern.

The determining means may temporarily store, in the temporary storage processing, image data of a plurality of frames including the image data that is determined to be a candidate constituting the motion pattern in the moving object detection processing.

When a plurality of motion detection windows specifying ranges on a screen are set as setting information of the motion pattern, the determining means may check, in the pattern matching determining processing, whether the image of the moving object included in image data of each of the plurality of frames enters the respective ranges of the plurality of motion detection windows in motion represented by the plurality of frames in order to determine whether the temporarily stored image data of the plurality of frames is images matching the motion pattern.

When a plurality of motion detection windows specifying ranges on a screen are set as setting information of the motion pattern, the determining means may check, in the pattern matching determining processing, the order that the image of the moving object included in the image data of each of the plurality of frames enters the respective ranges of the plurality of motion detection windows in motion represented by the plurality of frames in order to determine whether the temporarily stored image data of the plurality of frames is images matching the motion pattern.

A motion detection window specifying a range on a screen may be set as setting information of the motion pattern. The determining means may determine whether the image data including the image of the moving object has image content matching the motion pattern using a result obtained by checking whether the image of the moving object included in each image data enters the range of the motion detection window.

A plurality of motion detection windows specifying ranges on a screen may be set as setting information of the motion pattern. The determining means may determine whether the image data including the image of the moving object has image content matching the motion pattern using a result obtained by checking whether the image of the moving object included in each image data enters the respective ranges of the plurality of motion detection windows.

A motion detection window specifying a range on a screen may be set as setting information of the motion pattern. The determining means may determine whether the image data including the image of the moving object has image content matching the motion pattern using a result obtained by checking whether the image of the moving object included in each image data enters the range of the motion detection window while having a direction or a moving amount set for the motion detection window.

A plurality of motion detection windows specifying ranges on a screen may be set as setting information of the motion pattern. The determining means may determine whether the image data including the image of the moving object has image content matching the motion pattern using a result obtained by checking the order that the image of the moving object included in each image data enters the respective ranges of the plurality of motion detection windows.

The validating means may record, as the validation, image data that is determined to match the motion pattern on a recording medium.

The validating means may create, as the validation, a state in which the image data that is determined to match the motion pattern can be extracted as valid image data.

The validating means may discard image data that is determined not to match the motion pattern.

According to another embodiment of the present invention, an image processing method includes the steps of determining whether processing-target image data has image content matching a previously set motion pattern, and processing image data determined to match the motion pattern as valid image data.

According to still another embodiment of the present invention, a program allows an information processing apparatus to execute each step of the above-described image processing method.

According to the embodiments of the present invention, motion of a moving object represented as image content of processing-target image data, e.g., image data of chronologically consecutive frames captured in an image capturing operation or image data of chronologically consecutive frames reproduced from video content, is compared with a previously set motion pattern. According to whether the motion of the moving object matches the motion pattern or not, the image data is validated (e.g., stored as still images).

In particular, by setting a range on a screen as a motion detection window, setting a moving direction and a moving amount for the motion detection window, or setting the order for a plurality of motion detection windows, a motion pattern set by the motion detection windows serves as an appropriate criterion for determining a target image (subject).

Accordingly, an appropriate operation can be realized when still images of a subject having specific motion are automatically captured during image capturing or when images having the specific motion are extracted from reproduced video content and stored as still images.

According to the embodiments of the present invention, when motion matching a previously set specific motion pattern is detected in image content of processing-target image data, the image data can be appropriately validated. For example, the image data can be stored as one or more still images representing motion matching the motion pattern. In particular, by accurately determining the motion using motion detection windows, target images can be accurately determined and validated.

With this configuration, for example, when chronologically consecutive frame images captured by an image pickup unit are set as a processing target, images of a subject having intended motion can be accurately obtained as an image capturing result even if a user does not have a skilled image capturing technique.

In addition, when chronologically consecutive frame images read out from a recording medium by a reproducing unit are set as a processing target, the user can accurately extract images having intended motion without performing troublesome operations.

BRIEF DESCRIPTION OF THE DRAWINGS

FIGS. 2A-2D are explanatory diagrams regarding a motion detection operation according to an embodiment;

FIG. 5 is a block diagram showing an image capturing apparatus according to an embodiment;

FIG. 11 is a flowchart showing processing of a passing number and a passing window count according to an embodiment;

FIGS. 12A-12C are explanatory diagrams showing parameters used in processing according to an embodiment;

FIGS. 13A-13D are explanatory diagrams showing changes in parameter values in moving object detection processing according to an embodiment;

FIG. 19 is an explanatory diagram showing processing for checking a passing order of motion detection windows according to an embodiment;

FIG. 20 is an explanatory diagram showing an example of a screen displayed during execution of motion-detection automatic image capturing according to an embodiment;

FIGS. 21A-21C are explanatory diagrams showing changes in parameters during execution of motion-detection automatic image capturing according to an embodiment;

FIGS. 22A-22D are explanatory diagrams showing creation of a motion pattern according to an embodiment;

FIGS. 28A and 28B are explanatory diagrams showing a setting of a quantity of a motion vector according to an embodiment;

FIGS. 31A-31C are explanatory diagrams showing examples of shapes of a motion detection window according to an embodiment;

DESCRIPTION OF THE PREFERRED EMBODIMENTS

Embodiments of the present invention will be described below in the following order.

[1. First Embodiment (Image Capturing Apparatus)]
<1-1: Overview>
<1-2: Configuration of Image Capturing Apparatus>
<1-3: Motion-Detection Automatic Image Capturing Operation>
<1-4: Motion Pattern Setting>
<1-5: Advantages in Application of Embodiment to Image Capturing Apparatus>
[2. Second Embodiment (Image Capturing Apparatus)]
[3. Third Embodiment (Image Capturing Apparatus)]
[4. Fourth Embodiment (Image Processing Apparatus)]

1. First Embodiment

Image Capturing Apparatus

<1-1: Overview>

An example where the present invention is applied to an image capturing apparatus, such as a digital still camera, will be described as a first embodiment.

This example is suitable for a case where a user wants to capture one or more still images (e.g., as so-called continuous image capturing) of a specific moving subject with an image capturing apparatus at appropriate timings.

An image capturing apparatus detects a specific motion pattern of a subject image and stores image data containing a subject matching the motion pattern as still image data.

Before capturing images, a user specifies a predetermined motion pattern. As described later, a plurality of motion patterns may be preset or may be set by the user as the predetermined motion pattern.

Figure 1A:
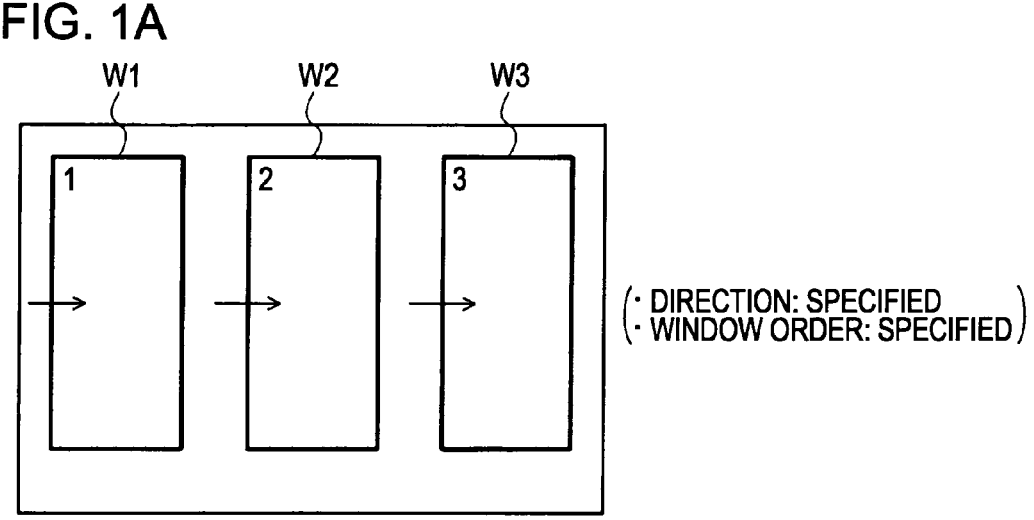
FIGS. 1A-1C are explanatory diagrams regarding motion detection windows according to an embodiment of the present invention.
Figure 1B:
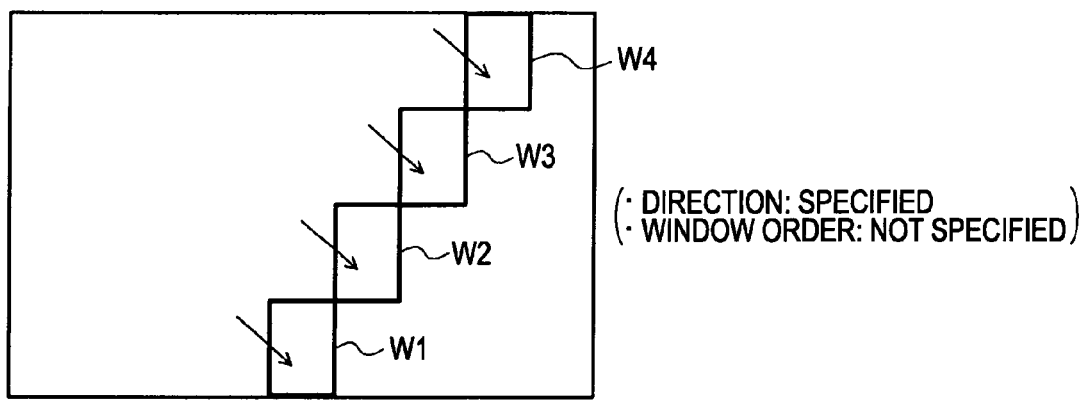
Figure 1C:
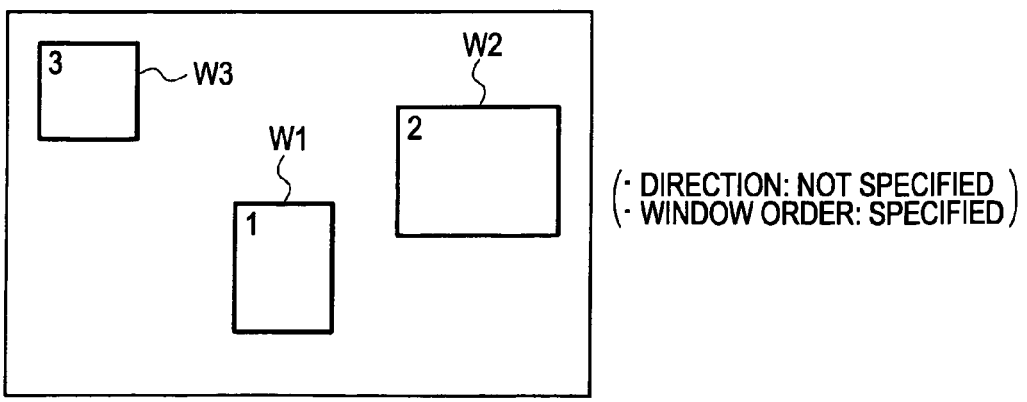
Figure 3A:
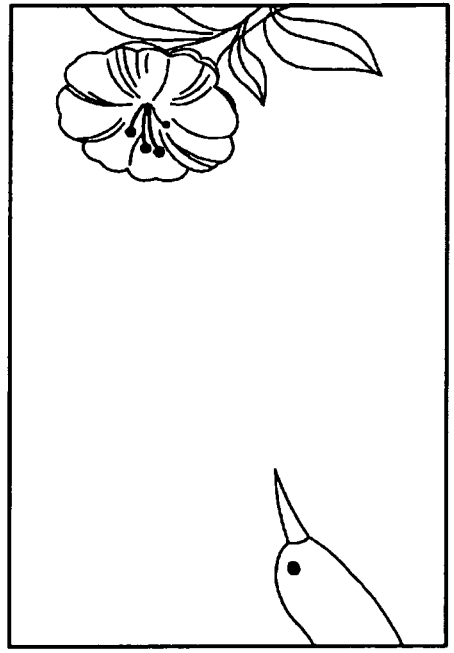
FIGS. 3A-3C are explanatory diagrams regarding example images to be stored in an embodiment.
Figure 3C:
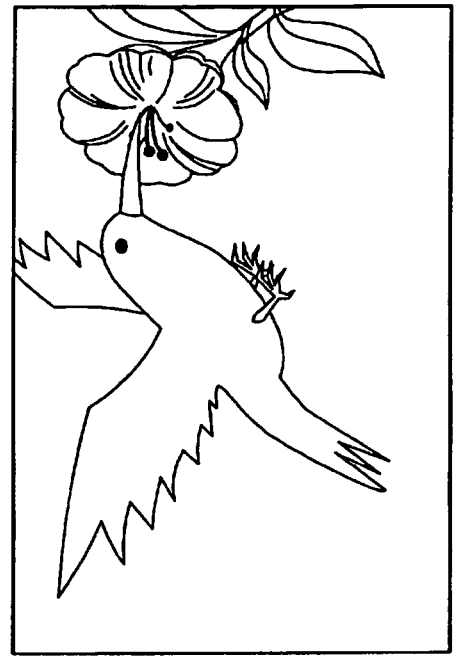
Figure 3B:
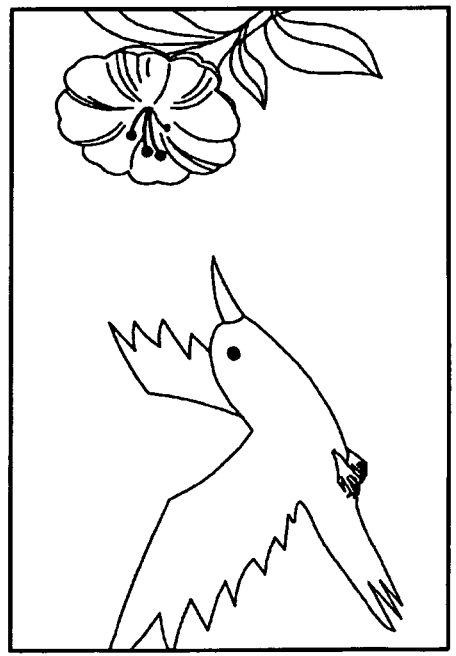

The motion pattern is set using motion detection windows. FIGS. 1A, 1B, and 1C show examples of motion detection windows set on a screen. Herein, the screen corresponds to a range of an image obtained as captured image data of a subject.

FIG. 1A shows an example where motion detection windows W1, W2, and W3 are set at specific areas of the screen.

In this case, an arrow pointing the right from the left attached to each of the motion detection windows W1, W2, and W3 indicates that a direction is set for the respective motion detection windows W1, W2, and W3.

Additionally, a numeral attached in each of the motion detection windows W1, W2, and W3 indicates that an order is set for the respective motion detection windows W1, W2, and W3.

The motion detection windows W1, W2, and W3 specify a motion pattern in which, for example, a moving object serving as a subject moves from the left to the right in front of an image capturing apparatus. More specifically, this case corresponds to a case where the moving object serving as the subject first enters an area of the motion detection window W1 from the left, then enters an area of the motion detection window W2, and further enters an area of the motion detection window W3.

An image capturing apparatus captures, through an image capturing operation thereof, images of a subject as image data of a plurality of chronologically consecutive frames, for example.

In general, a digital still camera performs video capturing called live view or preview (capturing of images by an image pickup element) and displays the consecutive frame images on a display screen as a video while a user is waiting for the best moment to capture a good image. In response to the user's pressing a shutter button, the image capturing apparatus stores a frame image obtained at that time on a recording medium as data of one still image.

Accordingly, the motion of the subject can be detected by performing frame comparison processing on data of each frame image captured as the live view.

Suppose that an image of a moving object (hereinafter, referred to as a moving object image) is detected in the subject images. In this case, when the moving object image in a first frame of chronologically arranged frames is included in the area of the motion detection window W1, the moving object image in a next frame has reached the area of the motion detection window W2, and the moving object image in the following frame has entered the area of the motion detection window W3, a motion pattern in which "a moving object serving as a subject has moved from the left to the right in front of an image capturing apparatus" can be detected as described above.

In such a case, image data of a series of frames is validated as subject images matching the motion pattern. For example, the image data is stored as, for example, continuously captured still image data. With such an operation, a still image containing the subject having the motion intended by the user can be accurately captured automatically.

An example will be described with reference to FIGS. 2A to 3C.

Suppose that a user instructs an image capturing apparatus to start automatic image capturing (a motion-detection automatic image capturing execution mode, which will be described later) while pointing the image capturing apparatus at a desired subject after setting a specific motion pattern using the motion detection windows W1, W2, and W3 shown in FIG. 1A.

FIG. 2A shows an image of a given frame F#0 obtained as the live view after the start of the automatic image capturing. Thereafter, an image shown in FIG. 2B is obtained as a given frame F#1 and it is detected that a moving object image (an image of a bird) enters the motion detection window W1 from the left as specified by the direction condition.

Furthermore, an image shown in FIG. 2C is obtained as a following frame F#2 and it is detected that the moving object image (the image of the bird) enters the motion detection window W2 from the left as specified by the direction condition.

Moreover, an image shown in FIG. 2D is obtained as a following frame F#3 and it is detected that the moving object image (the image of the bird) enters the motion detection window W3 from the left as specified by the direction condition.

It can be determined that the motion of the moving object image expressed by the image data of the series of frames F#1, F#2, and F#3 satisfies the area and direction set for each of the three motion detection windows W1, W2, and W3 and the order set for the three motion detection windows W1, W2, and W3.

In this case, the image data of the frames F#1, F#2, and F#3 is validated. For example, the image data is stored on a recording medium as three still images shown in FIGS. 3A, 3B, and 3C.

Accordingly, a user can obtain continuously captured results of the decisive moment by simply causing an image capturing apparatus to operate in the motion-detection automatic image capturing mode.

Since motion desirable as a subject can be set with the motion detection windows W1, W2, and W2 in detail, the subject having the desired motion can be obtained at a high probability. For example, even if a flower is greatly swayed by the wind in the example shown in FIGS. 2A-2D, the motion of the flower does not satisfy a condition regarding the motion pattern set by the motion detection windows W1, W2, and W3. Accordingly, image data of frames obtained at that time is not stored as still images. That is, many images undesired by the user are not stored unconditionally.

Various motion pattern settings using motion detection windows are available.

FIG. 1B shows an example in which motion detection windows W1, W2, W3, and W4 are set at respective areas and a direction toward the lower right from the upper left is set for each of the motion detection windows W1, W2, W3, and W4. In this case, the order of the motion detection windows W1, W2, W3, and W4 (hereinafter, referred to as the "window order") is not set.

FIG. 1C shows a case where motion detection windows W1, W2, and W3 are set at respective areas and the window order is set for each of the motion detection windows W1, W2, and W3. However, the direction is not set for each of the motion detection windows W1, W2, and W3.

By adding or omitting settings regarding the area, the window order, the direction, and the moving amount (speed) of motion detection windows, it is possible to accurately detect motion that user wants to capture and to perform automatic image capturing.

Figure 4A:
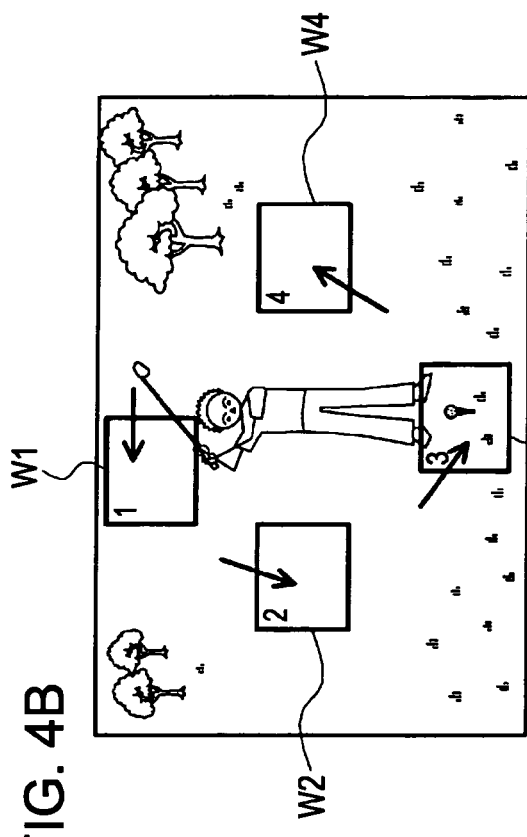
FIGS. 4A-4D are explanatory diagrams regarding various examples of a motion detection operation according to an embodiment.
Figure 4B:
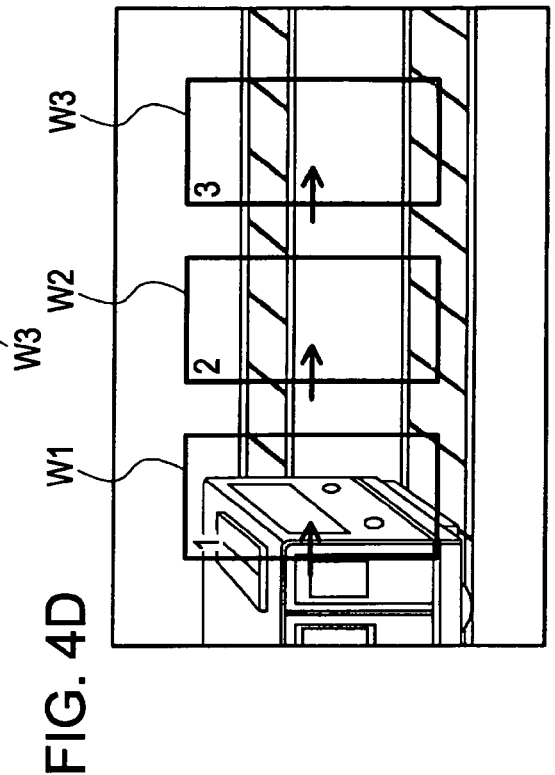

FIGS. 4A-4B show various application examples.

FIG. 4A shows an example in which motion detection windows W1, W2, W3, and W4 as shown in, for example, FIG. 1B are set.

This is suitable as a motion detection pattern used in order to automatically capture, from diagonally above, a finish line scene at, for example, an athletic meet, other track and field meets, or a swimming meet.

A user sets each of the motion detection windows W1, W2, W3, and W4 at the finish line of respective course of the sport, for example. Here, the window order is not set for the motion detection windows W1, W2, W3, and W4.

In this case, for example, when four athletes running from the upper left of a screen pass through the respective motion detection windows W1, W2, W3, and W4, data of four still images are stored regardless of standings of the athletes. Alternatively, image data of many still images including these four may be stored or image data of a plurality of still images continuously captured at a high speed at a given time may be stored for one motion detection window.

FIG. 4B shows a motion detection pattern suitable for, for example, a case of automatically capturing a golf swing. The window order corresponding to a path of the swing and the direction corresponding to the moving direction of a golf club are set for motion detection windows W1, W2, W3, and W4. In this case, data of a series of still images are stored upon detecting a moving object that moves in the order and in the vector direction set for each of the motion detection windows W1, W2, W3, and W4. As a result, data of a series of still images, such as frame-by-frame pictures of a golf swinging form, can be obtained. In addition, depending on the setting, images continuously captured at a high speed may be stored at a time point corresponding to the respective motion detection windows W1, W2, W3, and W4 or data of a plurality of consecutive still images captured between a time point corresponding to the motion detection window W1 (or a time point a little earlier than this point) and a time point corresponding to the motion detection window W4 (or a time point a little later than this point) may be stored.

Figure 4C:
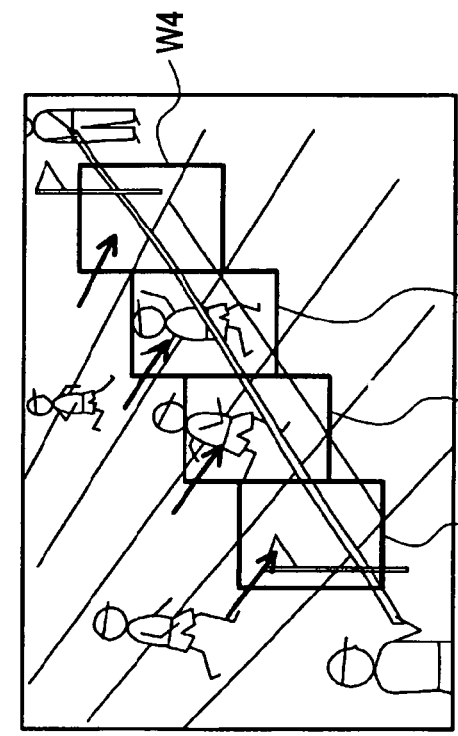

FIG. 4C shows a motion detection pattern suitable for a case of automatically capturing an image of a finish line scene at, for example, a horse race from substantially horizontal and diagonally above direction.

The direction is specified for the motion detection window W1. For example, in this case, data of one still image is stored upon a leading horse reaching the motion detection window W1. Depending on the setting, a plurality of still images following this image may be stored as continuously captured images.

Figure 4D:
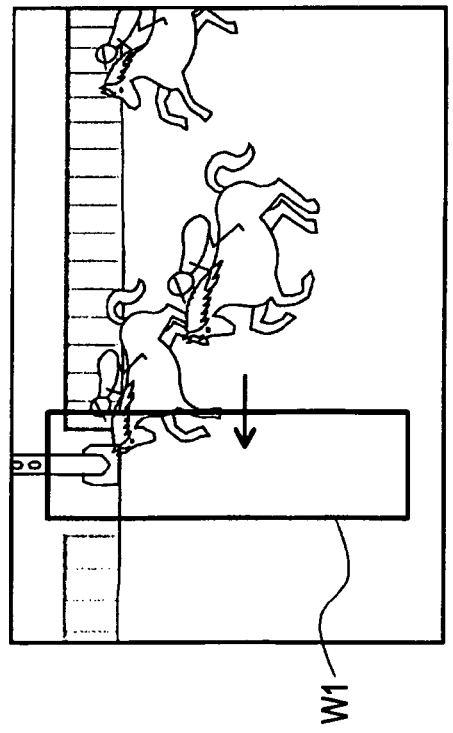

FIG. 4D shows a motion detection pattern suitable for a case of automatically capturing an image of a running train from the horizontal direction. The window order and the direction are set for motion detection windows W1, W2, and W3. In this case, when the trains coming from the left passes through each of the motion detection windows W1, W2, and W3, data of one still image is stored. Depending on the setting, images continuously captured at a high speed at time points corresponding to the respective motion detection windows W1, W2, and W3 may be stored or data of a plurality of consecutive still images captured between a time point corresponding to the motion detection window W1 (or a time point a little earlier than that point) and a time point corresponding to the motion detection window W3 (or a time point a little later than that point) may be stored.

In this case, when a train passes through the windows from the left to the right on the screen, still images are stored. However, when a train passes through the windows from the right to the left, still images are not stored since it is determined that the motion of the train does not match the target motion pattern.

If a user sets a plurality of window orders as an OR condition and eliminates the direction setting, acquisition of still image data can be realized at a time when both up and down trains pass. For example, the user simply has to set the window orders of "W1→W2→W3" and "W3→W2→W1" as the OR condition.

<1-2: Configuration of Image Capturing Apparatus>

An example of a configuration of an image capturing apparatus according to an embodiment for realizing, for example, the above-described automatic image capturing will be described with reference to FIG. 5.

An image capturing apparatus 1 shown in FIG. 5 has a battery 4, a battery voltage detecting unit 5, a variable optical system 3, an optical component 7, an image pickup element 8, an analog signal processing unit 12, an analog-to-digital (A/D) converting unit 13, a timing controlling unit 14, an image processing unit 15, an operation unit 16, a controlling unit 17, an image memory 18, a compressing/decompressing unit 19, a display image generating unit 20, a display unit 21, a touch panel 22, a motion detecting unit 24, a memory card interface (I/F) unit 26, an external I/F unit 28, and a nonvolatile memory 29.

The A/D converting unit 13, the image processing unit 15, the controlling unit 17, the image memory 18, the compressing/decompressing unit 19, the display image generating unit 20, the memory card I/F unit 26, the external I/F unit 28, and the motion detecting unit 24 are connected to each other through a bus 25.

The battery 4 supplies each unit of the image capturing apparatus 1 with the electric power (output voltage Vcc) used for operations thereof. The electric power supply from the battery 4 to each unit is executed or stopped in accordance with an operation state of the image capturing apparatus 1. The controlling unit 17 controls this electric power supply state. The battery voltage detecting unit 5 detects the output voltage Vcc (battery voltage) of the battery 4. This battery voltage detection result is supplied to the controlling unit 17 from the battery voltage detecting unit 5.

The variable optical system 3 includes an image capturing lens constituted by a plurality of optical lenses, an aperture, and a shutter. The optical component 7 includes an optical filter and a cover glass. A flux of light from a subject passes through the variable optical system 3 and the optical component 7, whereby an image of the subject is formed on the image pickup element 8.

The image pickup element 8 picks up an image of a subject formed by the variable optical system 3 and outputs image signals (captured image signals) corresponding to the picked up image of the subject.

The image pickup element 8 has a rectangular image pickup area including a plurality of pixels and sequentially outputs, for each pixel, an analog image signal corresponding to electric charge stored in the respective pixel to the analog signal processing unit 12. For example, a charge coupled device (CCD) sensor array or a complementary metal oxide semiconductor (CMOS) sensor array may be used as the image pickup element 8. This image pickup element 8 may be, for example, a single-chip color CCD.

The analog signal processing unit 12 includes a correlated double sampling (CDS) circuit and an automatic gain control (AGC) circuit therein. The analog signal processing unit 12 performs predetermined analog processing on input image signals.

The A/D converting unit 13 converts analog signals processed by the analog signal processing unit 12 into digital signals.

The timing controlling unit 14 is controlled by the controlling unit 17. The timing controlling unit 14 controls operation timings of the image pickup element 8, the analog signal processing unit 12, the A/D converting unit 13, and the image processing unit 15.

The image data digitalized by the A/D converting unit 13 is temporarily stored in the image memory 18.

The motion detecting unit 24 detects a moving object from image data of a plurality of frames stored in the image memory 18 and calculates a path or a track of motion of the moving object. A detail regarding this processing will be described later.

The image processing unit 15 reads out the image data from the image memory 18 and converts the size of images. For example, the image processing unit 15 converts image data of several millions of pixels or more picked up with the image pickup element 8 into sizes for videos, such as standard definition (SD, 720×480) and high definition (HD, 1920× 1080). In still image capturing processing, the process may proceeds to the next processing step without converting the image size.

The image processing unit 15 also performs so-called image modification, which includes gamma correction, white balance control, and edge enhancement, for example. The size-converted and modified image data is stored in the image memory 18 again.

The image data stored in the image memory 18 is used as data to be displayed on a display device and captured image data of still images or videos.

To display the image data on a display device (so-called displaying of live view and displaying of videos/still images), the image data is supplied to the display image generating unit 20. An image corresponding to the image data is displayed by the display unit 21 after other images, such as various icons and time information, are superimposed on the image data and the size of the image data is converted.

The display unit 21 may be a liquid crystal panel or an organic electroluminescence (EL) panel.

The image data to be used as captured images (recorded images) is read out from the image memory 18 and supplied to the compressing/decompressing unit 19. In general, the image data undergoes compression processing according to joint photographic experts group (JPEG) and moving picture experts group (MPEG).

The memory card I/F unit 26 reads out/writes data from/in a memory card 90 (a card-type removable memory) set in the image capturing apparatus 1. The memory card I/F unit 26 writes in the image data compressed by the compressing/decompressing unit 19 in the memory card 90.

In the case of capturing of a video or continuous capturing of still images, such a data flow is consecutively performed.

Although the portable memory card 90 is employed as an example of a recording medium here, other types of recording medium may be employed for storing image data of still images or videos to be left as image capturing results. For example, a portable disc medium, such as an optical disc, may be used or the image capturing apparatus 1 may be equipped with a hard disk drive (HDD) and store the image data in the HDD. Furthermore, an internal flash memory may be used.

The external I/F unit 28 transmits/receives various kinds of data to/from external apparatuses through a predetermined cable according to a signal standard such as, for example, the universal serial bus (USB).

The operation unit 16 has various operation buttons and switches. The operation unit 16 includes a release button, a selection dial (mode dial) for switching a camera mode, and a button (playback button) for displaying playback images on the display unit 21. The output of the operation unit 16 is supplied to the controlling unit 17.

The touch panel 22 and the display unit 21 constitute a touch screen 23.

The display unit 21 displays various operation screens in accordance with the operation state of the image capturing apparatus 1 based on display data supplied from the display image generating unit 20 and also displays images of a subject picked up with the image pickup element 8 and playback images based on image data stored in the memory card 90.

If a given position of the touch panel 22 is pressed through a touch of a finger, i.e., if a user performs a predetermined input operation, the touch panel 22 detects coordinates of the pressed position and sends a signal corresponding to the coordinates to the controlling unit 17. The controlling unit 17 obtains predetermined information corresponding to the coordinates and executes predetermined processing on the basis of the information.

Control software of the image capturing apparatus 1, setting data of a camera, setting data of the above-described motion detection patterns (setting information of motion detection windows) are recorded on the nonvolatile memory 29 (e.g., a flash memory). Additionally, in a motion-detection automatic image capturing operation to be described later, image data is temporarily stored in the nonvolatile memory 29 during temporary storage processing performed in response to detection of motion.

The controlling unit 17 is constituted by a microcomputer including, for example, a central processing unit (CPU), a read only memory (ROM), a random access memory (RAM), a nonvolatile memory unit, and an interface unit and controls the entire image capturing apparatus 1.

In accordance with programs stored in an internal ROM and user operations, the controlling unit 17 performs various kinds of arithmetic processing and exchanges control signals or the like with each unit to cause the respective unit to execute a predetermined operation.

As described above, the motion detecting unit 24 detects a moving object from a plurality of frame images stored in the image memory 18 and calculates a path or a track of motion of the moving object.

A method for detecting motion of a subject included in image information will be described below. First, block matching will be described as an example of a method used in motion detection.

Figure 6:
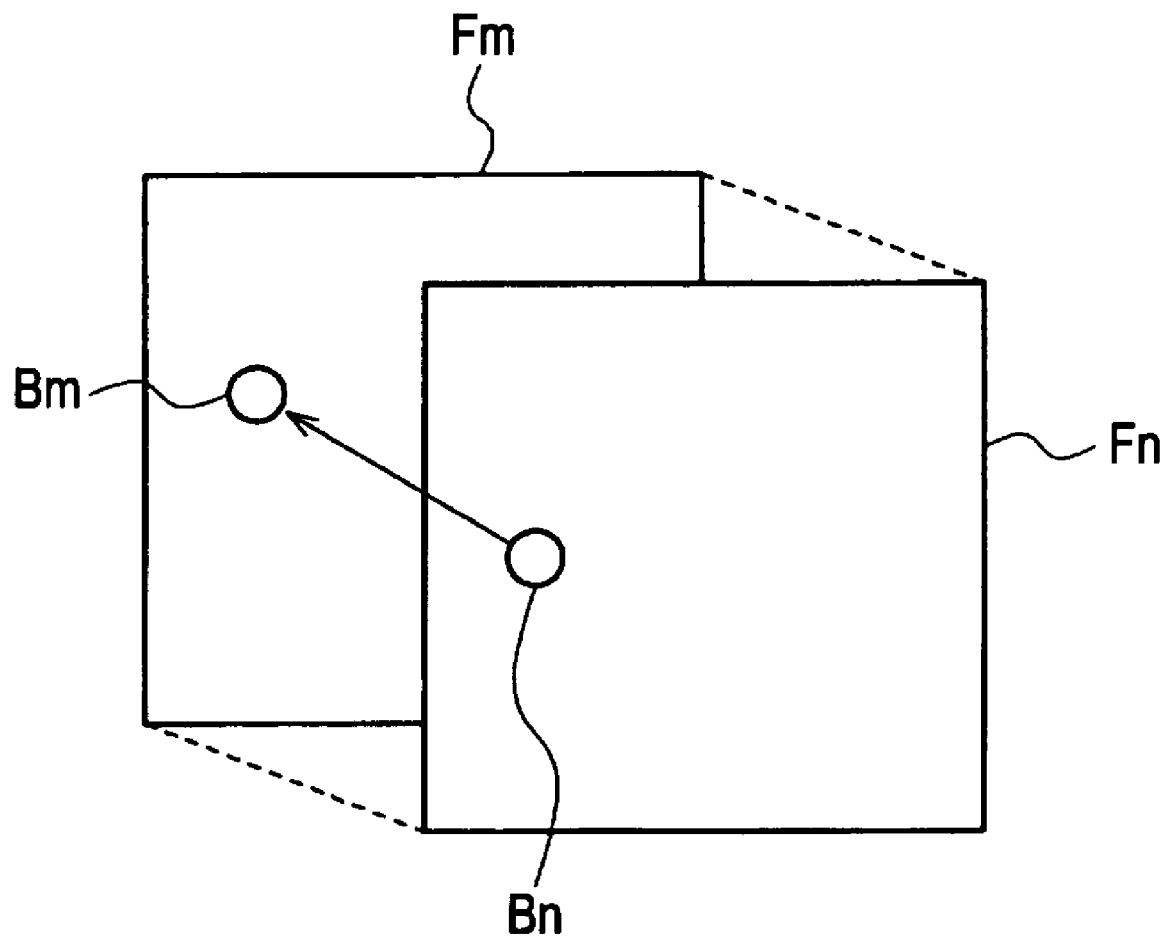
FIG. 6 is an explanatory diagram regarding moving object detection processing according to an embodiment.

FIG. 6 is a conceptual diagram showing a block matching method used in motion detection.

As shown in FIG. 6, pattern matching is performed on blocks (areas) Bn and Bm located at a specific position of a focused frame image (hereinafter, expediently referred to as a "current frame image") Fn and a frame image (hereinafter, expediently referred to as a "previous frame image") Fm at a time immediately before the current frame image.

In the pattern matching method, for example, a sum S of absolute values of differences between a pixel X(n) included in the block Bn and a pixel X(n−i), which is shifted from the pixel X(n) by i pixels, included in the block Bm is determined in accordance with Equation (1) and the shift amount i that minimizes this sum of absolute values S, i.e., a evaluation value, is searched to detect an amount of motion.

$$S = \Sigma |X(n) - X(n-i)| \quad \text{Equation (1)}$$

Here, the sum $\Sigma$ of Equation (1) is calculated regarding all of pixels X(n) belonging to the block Bn.

In the block matching method, the current frame image Fn is divided into blocks, an area of the current frame image Fn similar to that of the previous frame image Fm is searched for each block using pattern matching, and the speed and direction of motion of a subject included in the frame images are detected.

In addition to the above-described block matching method, a method for calculating a motion vector based on a change in a feature component of a subject area included in frame images may be employed as a method used in motion detection.

In this method, Laplacian processing is performed on luminance components included in the frame images. Zero crossover points of the processed images are detected as area boundaries. A part enclosed by a continuous boundary is extracted as an independent area (subject area). Alternatively, color components included in frame images are analyzed and a continuous part having a less hue change is replaced with a representative color and extracted as one area.

A feature component of the extracted area, e.g., the centroid of the area, is detected and an amount of change between the frame images is calculated, whereby a motion vector indicating a translation amount of the whole area is determined. Accordingly, by outputting the calculated change amount as a motion parameter of the area, a value of the motion vector (amount and direction of the motion) can be determined through calculation regarding a given pixel position in the subject area.

In addition, as still another motion detection method, a method for detecting a plurality of contour components included in frame images, categorizing the plurality of detected contour components into groups, and detecting motion of the whole image by neural network processing may be employed.

<1-3: Motion-Detection Automatic Image Capturing Operation>

A description will be given for a case where a user causes the above-described image capturing apparatus 1 to execute an operation of a motion-detection automatic image capturing mode.

In the description given below, operations corresponding to determination, validation, and acquisition functions will be described. The determination operation is mainly realized by arithmetic and controlling processing of the motion detecting unit 24 and the controlling unit 17 and operations of the image memory 18 and the nonvolatile memory 29 based on the control. The validation operation is mainly realized by controlling processing of the controlling unit 17 and operations of the nonvolatile memory 29 and the memory card I/F unit 26. Acquisition of processing-target image data is realized as operations of an image capturing section constituted by the variable optical system 3, the optical component 7, the image pickup element 8, the analog signal processing unit 12, the A/D converting unit 13, the timing controlling unit 14, the image processing unit 15, and the image memory 18. That is, acquisition of processing-target image data is realized as an operation for storing data of chronologically consecutive frame images in the image memory 18 by capturing images of a subject.

First, a procedure executed before the image capturing apparatus 1 starts a motion-detection automatic image capturing mode will be described with reference to FIGS. 7A-7C.

Figure 7A:
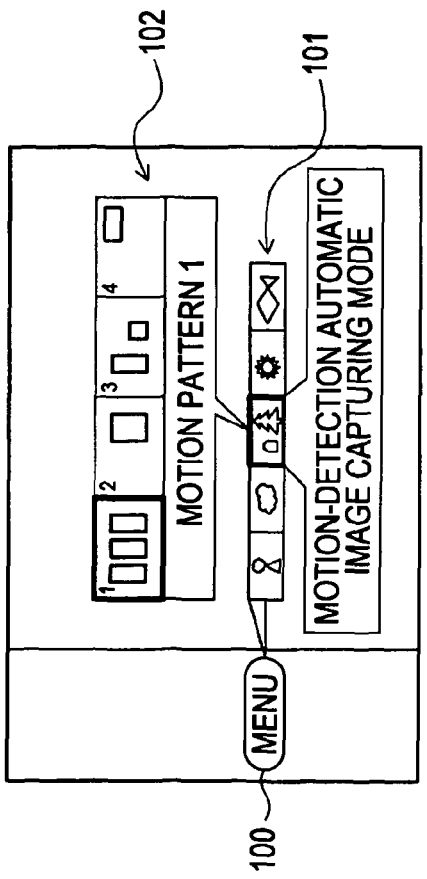
FIGS. 7A-7C are explanatory diagrams regarding transition of motion-detection automatic image capturing modes according to an embodiment.

FIG. 7A shows an example of a setting menu screen displayed on the display unit 21. As described above, since the touch panel 22 is placed over the display unit 21, a graphical user interface (GUI) is realized through detection of a touch of a displayed content. Operations performed on the menu described below can be obviously performed through user operations on the operation unit 16.

For example, when a user touches a menu button 100 displayed on a screen, the controlling unit 17 displays main menu items 101 on the display unit 21. For example, various items for operations of a camera, such as, for example, a main body setting, a scene selection, and an electronic flash selection, are displayed. An item regarding the motion-detection automatic image capturing mode is displayed as one of the items.

In response to the user's selection of the motion-detection automatic image capturing mode from the main menu items, the controlling unit 17 displays a submenu 102 on the display unit 21. In this submenu 102, a plurality of registered motion patterns are displayed in a selectable manner.

As described above, specific motion is set in each motion pattern using one or more motion detection windows (W1, W2, and so on). Standard preset patterns and customized patterns newly registered by a user are registered as the motion patterns.

If the user touches a given motion pattern item at the submenu 102, the touched motion pattern is selected. In response to the selection of the motion pattern, the controlling unit 17 switches the operation mode into a motion-detection automatic image capturing standby mode and displays an image shown in, for example, FIG. 7B on the display unit 21.

In this case, an icon 110 indicating the motion-detection automatic image capturing mode is displayed on the screen. Additionally, the motion pattern selected by the user is displayed using motion detection windows W1, W2, and W3. For example, regarding the motion pattern shown in the illustrated example, the direction and window order are set for the three motion detection windows W1, W2, and W3. A user can understand the set motion pattern by viewing the displayed motion pattern.

Figure 7B:
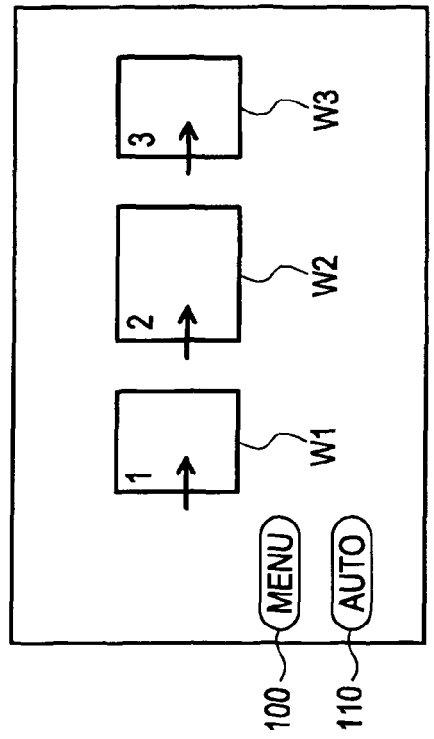
Figure 7C:
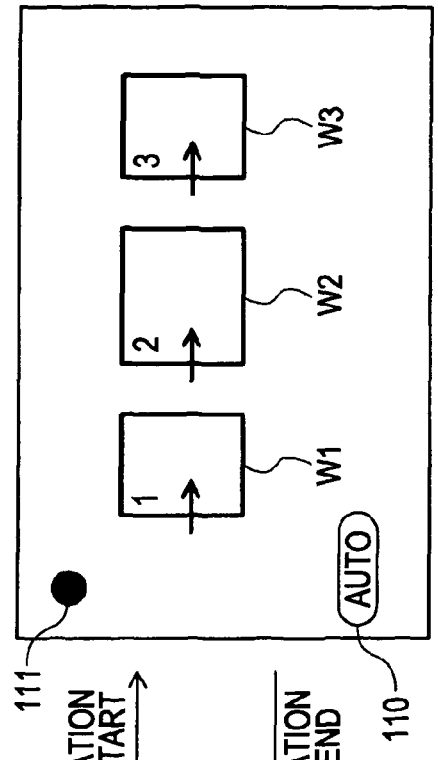

In practice, at this time, the motion detection windows W1, W2, and W3 shown in FIG. 7B and a live view image are displayed on the display unit 21.

More specifically, the controlling unit 17 causing respective units to execute an image capturing operation and a live view displaying operation, whereby a scene that the image capturing apparatus 1 is currently directed is also displayed on the display unit 21.

While watching the motion detection windows W1, W2, and W3 superimposed on an actual scene, the user adjusts the camera angle and the zoom. At this time, the user can determine whether the selected motion pattern is suitable for a scene subjected to image capturing. If the user determines that the selected motion pattern is not suitable, the user can operate the menu button 100 to return to the setting menu screen shown in FIG. 7A and select another motion pattern.

After determining the angle or the like in the motion-detection automatic image capturing standby mode, the user performs a starting operation. For example, the user presses a shutter button of the operation unit 16. The controlling unit 17 recognizes the operation on the shutter button as a starting operation and switches the operation mode into a motion-detection automatic image capturing execution mode. In this case, the controlling unit 17 instructs respective units to start a motion-detection automatic image capturing operation and displays an icon 111 indicating "execution of automatic image capturing" along with the motion detection windows W1, W2, and W3 and the live view image on the display unit 21 as shown in FIG. 7C.

When a moving object having the selected and set motion pattern is detected through the operation in the motion-detection automatic image capturing execution mode, still images are automatically captured.

When the user wants to terminate such automatic image capturing, the user performs a terminating operation. For example, when the user presses the shutter button again in the motion-detection automatic image capturing execution mode, the controlling unit 17 may recognize the operation on the shutter button as the terminating operation. Upon detecting the terminating operation, the controlling unit 17 terminates the automatic image capturing operation and returns the operation mode to the motion-detection automatic image capturing standby mode.

In this manner, the motion-detection automatic image capturing is executed in response to a user operation. An operation performed in the motion-detection automatic image capturing execution mode will be described below.

Figure 8:
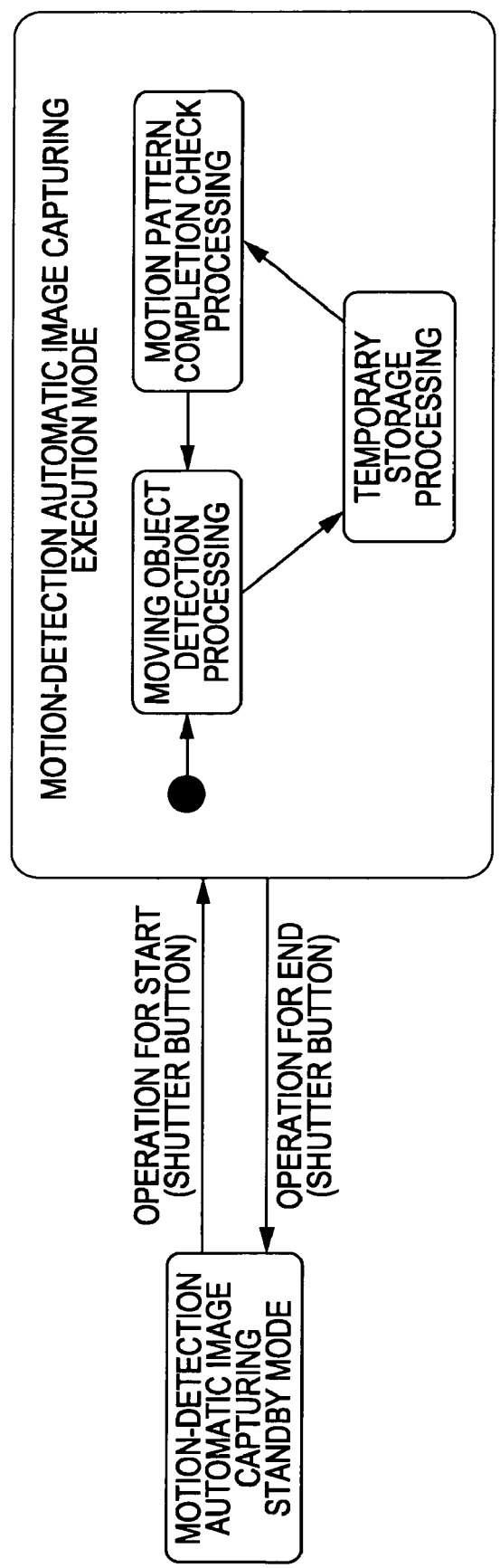
FIG. 8 is an explanatory diagram of transition between a motion-detection automatic image capturing standby mode and a motion-detection automatic image capturing execution mode according to an embodiment.

FIG. 8 shows a mode transition between the motion-detection automatic image capturing standby mode and the motion-detection automatic image capturing execution mode. In the motion-detection automatic image capturing execution mode, processing for detecting an moving object (hereinafter, referred to as moving object detection processing), temporary storage processing, and processing for checking completion of a motion pattern (hereinafter, referred to as motion pattern completion check processing) are repeatedly performed for each frame captured as the live view as shown in the drawing.

Figure 9:
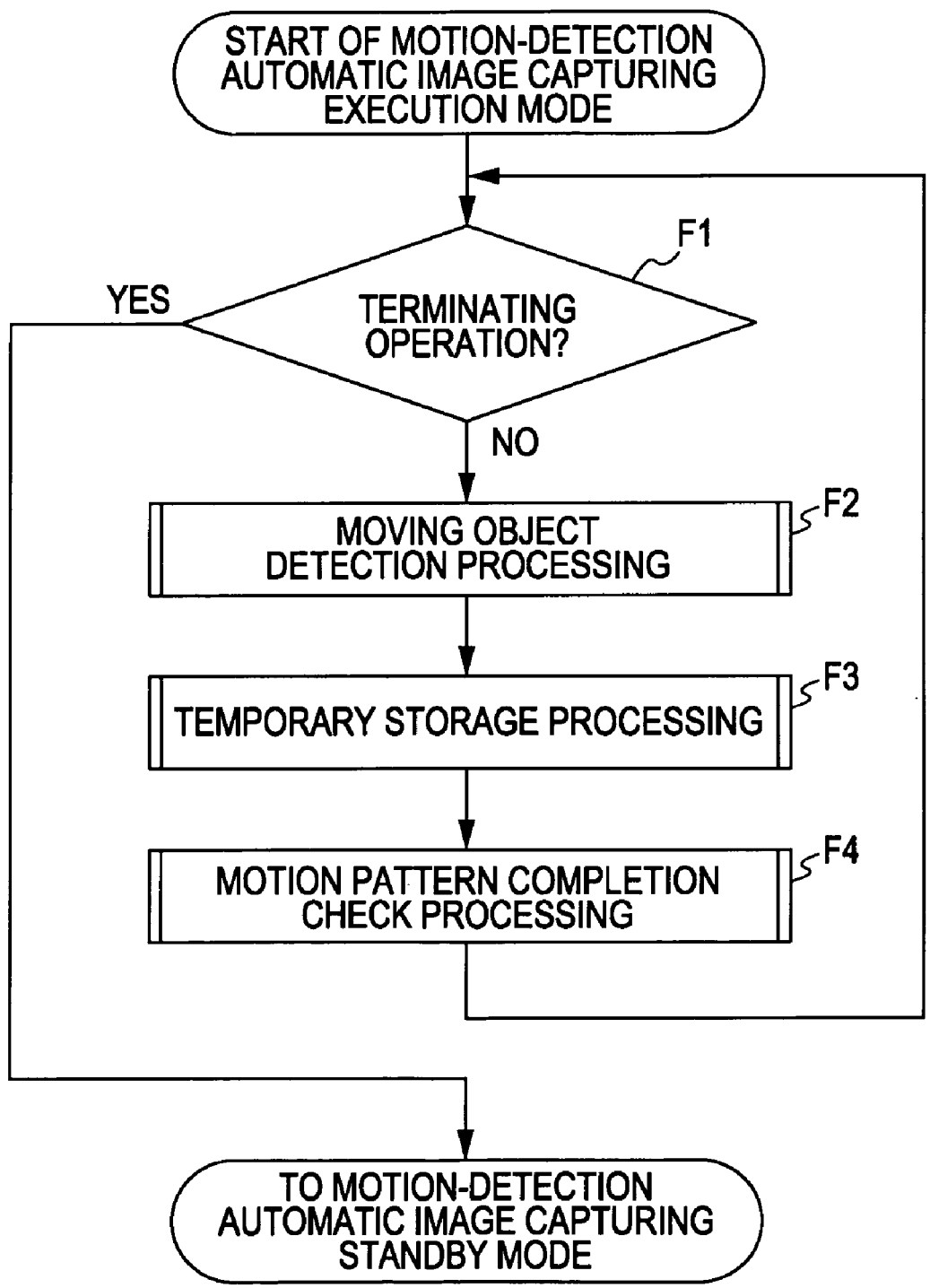
FIG. 9 is a flowchart showing processing executed in a motion-detection automatic image capturing execution mode according to an embodiment.

FIG. 9 shows processing performed by the controlling unit 17 in the motion-detection automatic image capturing execution mode.

After a start of the motion-detection automatic image capturing execution mode, the controlling unit 17 controls processing executed at STEPs F2, F3, and F4 while monitoring the user's terminating operation at STEP F1.

In the moving object detection processing executed at STEP F2, the controlling unit 17 transfers image data of one frame captured as a live view image and stored in the image memory 18 to the motion detecting unit 24 as a processing target. The motion detecting unit 24 detects a moving object and checks a relation between motion of the moving object and motion detection windows.

In the temporary storage processing executed at STEP F3, the controlling unit 17 controls temporary storage in accordance with the result of the moving object detection processing. More specifically, whether the image data of the processing-target frame is a candidate constituting the currently set motion pattern is determined as a result of the moving object detection processing executed on this frame at STEP F2. If the image data is determined to be a candidate, the image data of the frame is temporarily stored in the nonvolatile memory 29.

In the motion pattern completion check processing executed at STEP F4, the controlling unit 17 determines whether the image data temporarily stored in the nonvolatile memory 29 matches the currently selected and set motion pattern or determines whether to wait for the following temporary storage.

If the controlling unit 17 determines, in response to temporary storage of image data of three candidates, that the three pieces of image data match the currently set motion pattern after the processing of STEPs F2, F3, and F4 is repeated and the temporary storage is performed, for example, third time, the controlling unit 17 performs a control operation so that the three pieces of image data are stored in the memory card 90 as data of still images resulting from automatic image capturing.

If the controlling unit 17 determines that one or more pieces of image data temporarily stored as candidates in such a manner do not match the currently set motion pattern, the controlling unit 17 performs a control operation so that these pieces of image data are deleted from the nonvolatile memory 29.

By repeating the processing of STEPs F2, F3, and F4 until the user performs the terminating operation, a scene having motion matching the motion pattern is stored in the memory card 90 as data of captured still images every time such a scene is detected. Accordingly, image capturing desired by the user is automatically executed.

The moving object detection processing, the temporary storage processing, and the motion pattern completion check processing executed at STEPs F2, F3, and F4, respectively, will be described in detail.

Figure 10:
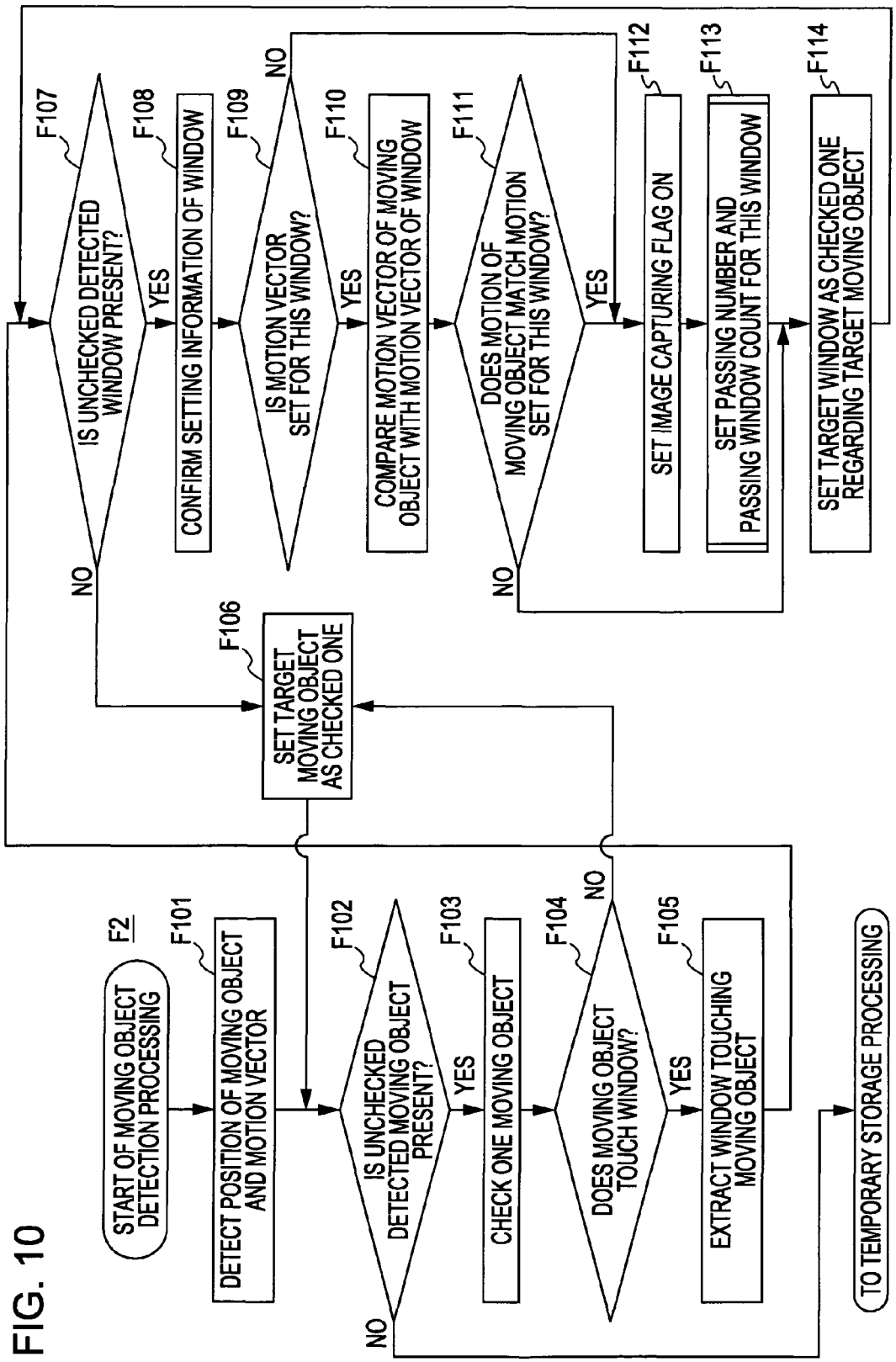
FIG. 10 is a flowchart showing moving object detection processing according to an embodiment.

FIG. 10 shows processing that the controlling unit 17 instructs the motion detecting unit 24 to execute as the moving object detection processing at STEP F2.

As described above, image data of each frame serving as a live view image is sequentially stored in the image memory 18 through an image capturing operation and the live view is displayed on the display unit 21. In parallel to this operation, each frame image is sequentially transferred to the motion detecting unit 24 and undergoes the moving object detection processing shown in FIG. 10.

Although the description will be given for a case where the processing shown in FIG. 10 is sequentially performed on each frame, the moving object detection processing is not necessarily performed on all of frames constituting the live view video. A case where intermittent frames images, such as every some frames, are transferred to the motion detecting unit 24 and subjected to the moving object detection processing is also possible.

At STEP F101, the motion detecting unit 24 detects an image of a moving object from one of the frames transferred from the image memory 18 and a position and a motion vector of the moving object image. For example, as described in FIG. 6, the motion detecting unit 24 detects a subject serving as a moving object included in the current frame image Fn and a motion vector indicating an amount and a direction of the motion using a block matching method while setting frame image data transferred this time and frame image data processed immediately before this frame image data as a current frame image Fn and a previous frame image Fm, respectively.

At STEP F101, a detection result that one or more moving object images are detected regarding the current frame or no moving object image is included is obtained.

If it is determined that no moving object image is included in the current frame in the processing performed by the motion detecting unit 24 at STEP F102, the motion detecting unit 24 terminates the processing shown in FIG. 10. The controlling unit 17 advances the process to the temporary storage processing executed at STEP F3. Although a detail regarding the temporary storage processing will be described later with reference to FIG. 16A, since an image capturing flag is not ON in this case (although this will be described later, the image capturing flag is set ON at STEP F112 shown in FIG. 10), the temporary storage processing is terminated at STEP F201 without performing the temporary storage. The process then proceeds to the motion pattern completion check processing executed at STEP F4. Although a detail regarding the motion pattern completion check processing will be described with reference to FIG. 17, the processing is also terminated at STEP F300 (and STEPs F311 and F312) in this case.

The process then returns to STEP F2 through STEP F1 shown in FIG. 9. The moving object detection processing is performed on the next frame.

That is, if it is determined that no moving object is included in the current frame at STEP F101 shown in FIG. 10, the processing is performed again on a new frame at STEP F101 after performing the process shown in FIG. 9.

If one or more moving object images are detected in the current frame at STEP F101, the motion detecting unit 24 sets parameters for moving object check (hereinafter, referred to as moving object check parameters) as shown in FIG. 12A and executes processing of the following steps shown in FIG. 10 using these parameters.

The moving object check parameters shown in FIG. 12A are set based on the number of moving object images detected in the current frame and setting information of motion detection windows (hereinafter, referred to as motion detection window setting information) in a motion pattern selected in the motion-detection automatic image capturing execution mode.

FIG. 12C shows the motion detection window setting information. For example, when the motion pattern selected this time has three motion detection windows W1, W2, and W3, the content of the setting information of the motion pattern includes setting information regarding window positions (Pw1, Pw2, and Pw3), motion vectors (Vw1, Vw2, and Vw3), and window orders (Nw1, Nw2, and Nw3) of the motion detection windows W1, W2, and W3.

The window positions (Pw1, PW2, and Pw3) are information (e.g., coordinate information) indicating areas of the motion detection windows W1, W2, and W3 on a screen, respectively.

The motion vectors (Vw1, Vw2, and Vw3) are information indicating a moving direction and a moving amount (speed) of each of the motion detection windows W1, W2, and W3 or indicating absence of such settings.

The window orders (Nw1, Nw2, and Nw3) are information indicating a window order of each window or absence of the window order setting.

Suppose that three motion detection windows W1, W2, and W3 are set as a motion pattern selected by a user this time as in this example and three moving object images are detected at STEP F101. In this case, the motion detecting unit 24 sets parameters used for checking relations between the three moving object images M1, M2, and M3 and the three motion detection windows W1, W2, and W3 as shown in FIG. 12A.

A parameter rc indicates whether each moving object image is touching the respective motion detection window.

A parameter Wfin indicates that check of a relation between the motion detection window and the moving object image has been finished.

A parameter Mfin indicates that check of the detected moving object image has been finished.

The processing shown in FIG. 10 is executed while these parameters being updated.

All of the parameters rc, Wfin, and Mfin set as shown in FIG. 12A at STEP F101 are invalid.

FIG. 12B shows, as parameters for motion pattern check, parameters used by the controlling unit 17 while performing the series of processing shown in FIG. 9, for example.

A parameter "passing number" is used to determine the order of the motion detection windows W1, W2, and W3.

A parameter "image capturing flag" is used to determine whether to execute the temporary storage processing at STEP F3.

A parameter "invalid flag" is used when a result of the motion pattern completion check processing indicates that temporary stored image data does not match a motion pattern.

A parameter "passing window count" is incremented when a moving object image passes through the area of the motion detection windows W1, W2, and W3 and is used in the motion pattern completion check processing as a value indicating the number of motion detection windows that the moving object has passed through.

Each of these parameters will be referred to every time the parameter is used in the processing described later.

If one or more moving objects are detected in the current frame and the moving object check parameters, for example, shown in FIG. 12A are set at STEP F101 shown in FIG. 10, the motion detecting unit 24 advances the process from STEP F102 to STEP F103.

At STEP F103, the motion detecting unit 24 sets one of the moving object images (e.g., the moving object M1 shown in FIG. 12A) as a check target and checks whether this moving object image touches one or more motion detection windows W1, W2, and W3, for example. More specifically, the motion detecting unit 24 checks whether the moving object image is included in each of the motion detection windows W1, W2, and W3 on the screen.

Figure 14:
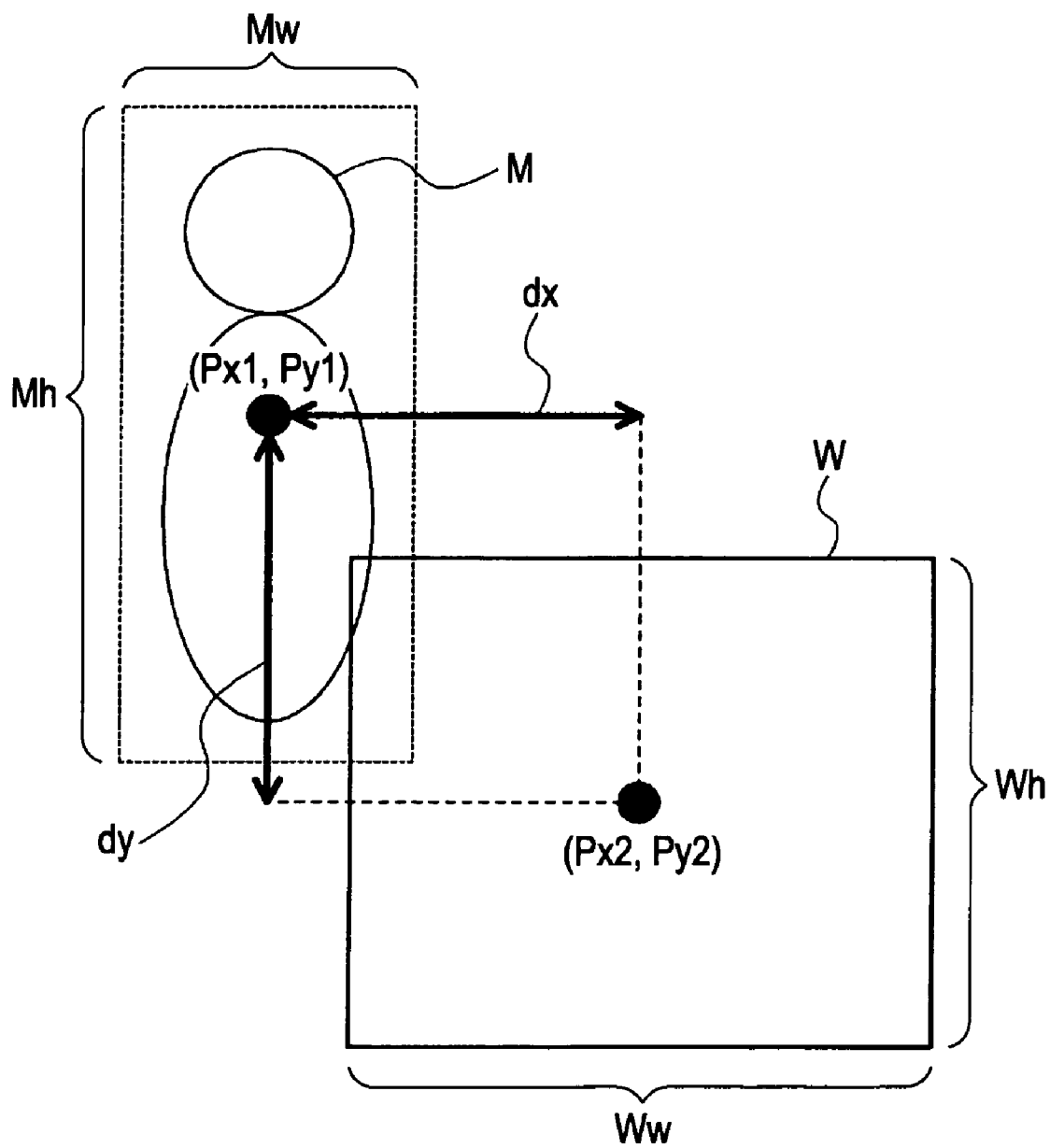
FIG. 14 is an explanatory diagram showing processing for determining whether a moving object image touches a motion detection window according to an embodiment.

Whether a given moving object image M touches a given motion detection window W can be determined using, for example, a method shown in FIG. 14.

First, distances dx and dy in the x-axis and y-axis directions between coordinates (Px1, Py1) of the centroid of the moving object image M and coordinates (Px2, Py2) of the center of the motion detection window W are determined using Equations (2) and (3), respectively.

$$dx = |Px1 - Px2| \quad \text{Equation (2)}$$

$$dy = |Py1 - Py2| \quad \text{Equation (3)}$$

Suppose that the width and height of the moving object image M and the width and height of the motion detection window W are represented as Mw, Mh, Ww, and Wh, respectively. If either "dx≦(Mw+Ww)/2" or "dy≦(Mh+Wh)/2" is satisfied, it can be determined that the moving object image M touches the motion detection window W.

Information on the position, width, and height of the moving object image M is detected in analysis of the image performed at STEP F101. In addition, information on the position, width, and height of the motion detection window W can be extracted from the window position information of the setting information shown in FIG. 12C.

For example, when the three moving object images M1, M2, and M3 are detected and the three motion detection windows W1, W2, and W3 are set as shown in FIG. 12A, the motion detecting unit 24 first determines "whether the moving object image M1 touches each of the motion detection windows W1, W2, and W3" using the above-described calculation at STEP F103. The motion detecting unit 24 then reflects the detection result in the moving object check parameters shown in FIG. 12A.

If it is determined that the moving object image M1 touches the motion detection window W1 but does not touch the motion detection windows W2 and W3, values shown in FIG. 13A are set in the moving object check parameters. More specifically, a value (represented as "○" in the drawing) indicating that the moving object image M1 touches the motion detection window W1 is set in the parameter rc. Values (represented as "-" in the drawing) indicating the moving object image M1 does not touch the motion detection windows W2 and W3 are also set. Since the following checking processing is omitted regarding the moving object image and the motion detection window that are not in contact, a value (represented as "-" in the drawing) indicating an omission of the check is written in the parameter Wfin regarding the relations between the moving object image M1 and the motion detection windows W2 and W3.

At STEP F104, the motion detecting unit 24 assigns different kinds of processing depending on whether the check result obtained at STEP F103 indicates that the target moving object image M1 is in contact with one or more motion detection windows or not. More specifically, the moving object check parameters in FIG. 13A may be checked.

If the moving object image M1 touches none of the motion detection windows W1, W2, and W3, the process returns to STEP F102 after a value indicating "completion of the check (checked)" is set in the parameter Mfin for the moving object image M1 at STEP F106.

On the other hand, a case shown in, for example, FIG. 13A corresponds to a case where a check result indicating that the moving object image M1 is in contact with the motion detection window W1. Since the moving object image M1 is in contact with at least one motion detection window, the process proceeds to STEP F105. At STEP F105, the motion detecting unit 24 extracts the motion detection window in contact with the moving object image M1. In this case, the motion detecting unit 24 extracts the motion detection window W1 as a check target. If the moving object image M1 is in contact with a plurality of motion detection windows, the motion detecting unit 24 extracts those windows as the check targets.

At STEP F107, the motion detecting unit 24 determines whether an unchecked motion detection window, among the one or more motion detection windows extracted as the check targets, exists. If the unchecked motion detection window exists, the motion detecting unit 24 checks one of the unchecked motion detection windows in-processing starting from STEP F108.

For example, in the case shown in FIG. 13A, since the parameter Wfin of the motion detection window W1 extracted as the check target based on the relation with the moving object image M1 is not "checked" at this point, the motion detecting unit 24 determines that the unchecked motion detection window exists. The process proceeds to STEP F108 and the motion detection window W1 is checked.

At STEP F108, the motion detecting unit 24 confirms setting information of the motion detection window subjected to the check. In this case, the motion detecting unit 24 confirms information on a motion vector of the motion detection window W1 based on the setting information shown in FIG. 12C.

As described above, a motion vector (the direction and quantity thereof) as well as an area can be set for the motion detection window and the motion vector can be added to a condition constituting a specific motion pattern. When a given moving object image is in contact with a given motion detection window and motion of the moving object image matches the motion vector set for the motion detection window, the frame image satisfies the temporary storage condition as one of candidates constituting a series of motion patterns.

When the setting regarding the motion vector is absent, the moving object image touching the motion detection window satisfies the temporary storage condition.

If the result of confirmation of the setting information of the motion detection window W1 indicates absence of the motion vector setting, the motion detecting unit 24 determines that the temporary storage condition is satisfied. The process proceeds to STEP F112 from STEP F109 and the image capturing flag is set ON. As shown in FIG. 12B, the image capturing flag is a parameter managed by, for example, the controlling unit 17. Accordingly, the motion detecting unit 24 requests the controlling unit 17 to set the image capturing flag ON at STEP F112. In response to this request, the controlling unit 17 sets the image capturing flag ON.

On the other hand, if the motion vector is set for the motion detection window W1, the process proceeds to STEP F110. The motion detecting unit 24 compares the set motion vector with a motion vector of the moving object image M1 to determine whether the motion vectors match or not.

Figure 15A:
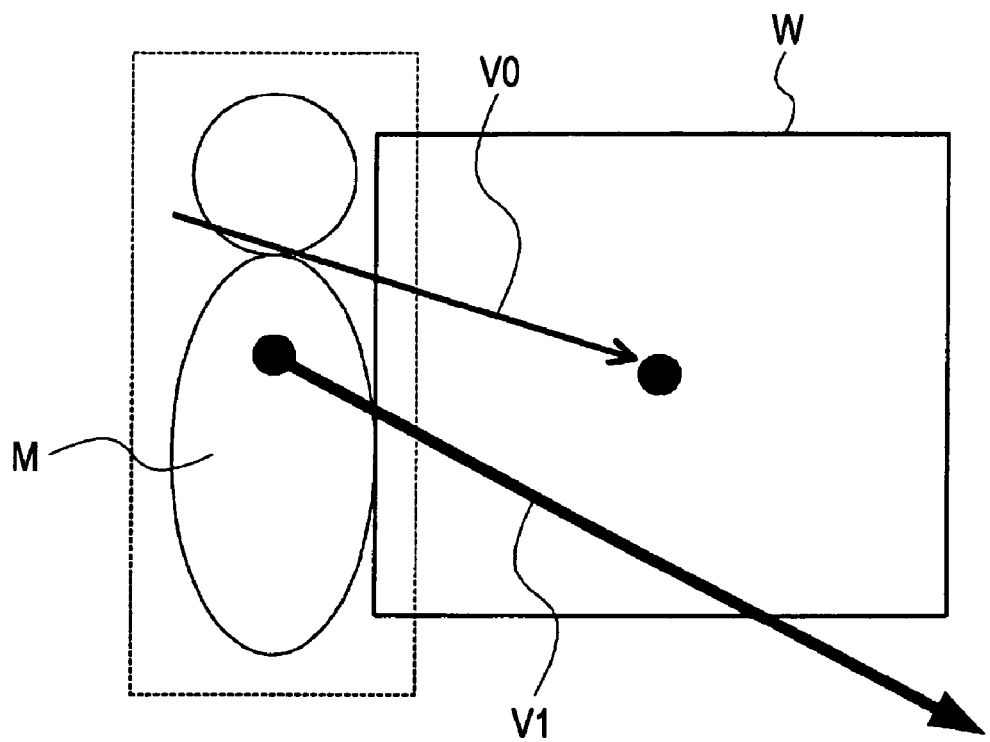
FIGS. 15A and 15B are explanatory diagrams showing processing for determining whether a vector of a moving object image matches a vector of a motion detection window according to an embodiment.
Figure 15B:
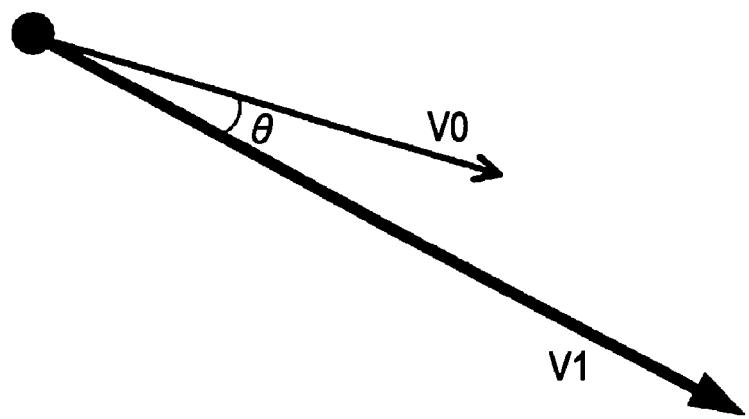

A method for comparing motion vectors is shown in FIG. 15.

Suppose that a motion vector previously set for the motion detection window W1 and a motion vector of the moving object image M detected through the motion detection are represented as V0 and V1, respectively. The motion vector V0 can be determined based on the coordinates at the time of setting of the motion detection window W. The motion vector V1 can be determined at the time of analysis performed at STEP F101.

An angle θ between these two motion vectors V0 and V1 is determined.

When the motion vectors are represented as V0=(x0, y0) and V1=(x1, y1), the angle θ can be determined using Equation (4).

$$\theta = \arccos(x0 \times x1 + y0 \times y1)/\text{sqr}((x0^2 + y0^2) \times (x1^2 + y1^2)) \quad \text{Equation (4)}$$

Here, arcos(n) indicates a function for determining the arc cosine, whereas sqr(n) indicates a function for determining the square root.

In a method for determining whether the motion vector V1 of the moving object image M matches the motion vector V0 set for the motion detection window W, it is determined that the vectors V0 and V1 indicate the same direction if the angle θ is not greater than 30 degrees, for example.

In addition, a method for determining the quantity of the vector (amount of the motion) is provided. In this method, three motion detection levels "high", "medium", and "low" are set in the image capturing apparatus 1 and a user previously selects the motion detectivity in the image capturing apparatus 1 as described in FIGS. 27A and 27B. Various ranges of the three quantity levels of the motion vector may be employed depending on a product specification of the image capturing apparatus 1 due to adjustment made at the time of design.

At STEP F110, the motion detecting unit 24 compares the motion vector set for the motion detection window W1 with the motion vector of the moving object image M1 in such processing, for example.

If the motion vectors match, the motion detecting unit 24 determines that the temporary storage condition is satisfied. The process then proceeds to STEP F112. At STEP F112, the motion detecting unit 24 requests the controlling unit 17 to set the image capturing flag ON. In response to this request, the controlling unit 17 sets the image capturing flag ON.

If the motion vector is not set for the currently checked motion detection window W or if the image capturing flag is set ON at STEP F112 after the vectors are determined to match, the controlling unit 17 updates parameters of the passing number and the passing window count for the motion detection window W1 on the basis of the notification from the motion detecting unit 24 at STEP F113. As shown in FIG. 12B, the passing number of each of the motion detection windows W1, W2 and W3 constituting the current motion pattern and the parameter for the number of windows that the moving object image has touched are used as the motion pattern check parameters. For example, the controlling unit 17 performs the processing shown in FIG. 11, thereby updating these parameters.

At STEP F150, the controlling unit 17 determines whether the passing number has been recorded regarding the motion detection window currently being checked (in this case, the motion detection window W1).

If the passing number has already been recorded, the controlling unit 17 terminates the processing shown in FIG. 11 without updating the parameters.

If the passing number has not been recorded, the process proceeds to STEP F151. At STEP F151, the controlling unit 17 increments the value of the passing window count. The passing window count is initially set to "0". If the passing window count is currently equal to 0, the passing window count is incremented to 1. At STEP F152, the controlling unit 17 determines whether this processing is a first opportunity of recording the passing number in the processing performed on the current frame (i.e., the current processing shown in FIG. 10 started from STEP F101).

If this processing is the first recording opportunity regarding the current frame, the process proceeds to STEP F153. At STEP F153, a value obtained by adding 1 to the maximum passing number value that has already been recorded is set as the passing number of the motion detection window (motion detection window W1) currently being checked.

In the case of the motion detection window currently described, since the passing numbers of the motion detection windows W1, W2, and W3 are equal to "0", the passing number of the motion detection window W1 is set equal to 1.

If the process proceeds to STEP F152 shown in FIG. 11 in a check of another motion detection window (e.g., the motion detection window W3) thereafter during the processing shown in FIG. 10 performed regarding the current frame, the process proceeds to STEP F154 since this processing is not the first recording opportunity regarding the current frame. In this case, the maximum passing number value that has been already recorded is set as the passing number of the motion detection window (e.g., the motion detection window W3) currently being checked. More specifically, the passing numbers of both of the motion detection windows W1 and W3 are set equal to 1. This is because satisfaction of the temporary storage condition is detected regarding both of the motion detection windows W1 and W3 in an identical frame based on the relation with the moving object image and in order to set the same window order for the motion detection windows W1 and W2.

After the processing shown in FIG. 11 is performed at STEP F113 shown in FIG. 10 during, for example, the check performed on the motion detection window W1, the process proceeds to STEP F114 shown in FIG. 10.

In addition, if it is determined that the motion vector of the moving object image M1 does not match the motion vector set for the motion detection window W1 as a result of comparison of the vectors at STEP F111, the temporary storage condition is not satisfied. Thus, processing at STEPs F112 and F113 are skipped and the process proceeds to STEP F114.

At the stage of STEP F114, since the check on the relation between the currently checked motion detection window W1 and the moving object image M1 has been finished, the parameter Wfin of the moving object check parameters is updated to a value indicating completion of the check (represented as "checked" in the drawing) as shown in FIG. 13B. The process then returns to STEP F107.

At this point, since all of motion detection windows previously extracted at STEP F105 based on the relation with the moving object image M1, namely, all of motion detection windows whose parameter rc is represented as "○" (in this case, only the motion detection window W1), have been checked, the process proceeds to STEP F106 from STEP F107. The check regarding the moving object image M1 has been finished. More specifically, as shown in FIG. 13B, the parameter Mfin of the moving object image M1 is updated to a value indicating completion of the check (represented as "checked" in the drawing).

The process then returns to STEP F102. At STEP F102, the controlling unit 17 determines whether an unchecked moving object image still exists or not. The moving object check parameters shown in FIG. 13B indicates that moving object images M2 and M3 have not been checked yet. Accordingly, the controlling unit 17 starts the check processing on the moving object image M2 at STEP F103.

Since processing performed on the moving object image M2 at each STEP is the same as that performed on the moving object image M1 having been described above, the processing flow is briefly described hereafter.

Suppose that the result of the check performed on the moving object image M2 at STEP F103 indicates that the moving object image M2 is in contact with the motion detection windows W1 and W3.

In this case, as shown in FIG. 13C, the parameter rc regarding the relations between the moving object image M2 and the motion detection windows W1 and W3 are set to "○" and the motion detection windows W1 and W3 are extracted as the check targets at STEP F105. The relation between the motion detection window W1 and the moving object image M2 is first checked in processing starting from STEP F108.

In this case, if the temporary storage condition is satisfied based on the check result, the processing regarding the image capturing flag, the passing number, and the passing window count is performed at STEPs F112 and F113.

Here, suppose that the processing of STEPs F112 and F113 has been performed in the check previously performed on the relation between the moving object image M1 and the motion detection window W1. In this case, even if the temporary storage condition is satisfied regarding the motion detection window W1 and the moving object image M2, substantial parameter updating processing is not performed at STEPs F112 and F113. Since the image capturing flag has been already set ON and the passing number has been already recorded for the currently checked motion detection window W1 in the processing shown in FIG. 11 at STEP F113, the process is exited without updating any parameters.

After finishing the check regarding the relation between the motion detection window W1 and the moving object image M2, the parameter Wfin of the motion detection window W1 for the moving object image M2 is set to "checked" at STEP F114 as shown in FIG. 13D.

The process then returns to STEP F107. In this case, since the motion detection window W3 is not checked, the relation between the motion detection window W3 and the moving object image M2 is checked in the processing starting from STEP F108.

If the relation between the motion detection window W3 and the moving object image M2 satisfies the temporary storage condition, the processing of STEP F112 is also performed in this case. Here, the image capturing flag is kept being set. When processing shown in FIG. 11 is performed at STEP F113, the process proceeds from STEP F152 to STEP F154 and the passing number is set equal to 1 so that the order of the motion detection window W3 is set equal to that of the motion detection window W1 as described above.

The parameter Wfin of the motion detection window W3 for the moving object image M2 is set to "checked" at STEP F114. Since the unchecked motion detection window no longer exists, the process proceeds from STEP F107 to STEP F106. At STEP F106, the parameter Mfin of the moving object image M2 is set to "checked".

The moving object image M3 is then checked in processing starting from STEP F103. Here, when the moving object image M3 touches none of the motion detection windows W1, W2, and W3, the process proceeds from STEP F104 to STEP F106. At STEP F106, the parameter Mfin of the moving object image M3 is set to "checked". At this time, since it is determined that the unchecked moving object image no longer exists at STEP F102, the controlling unit 107 terminates the processing shown in FIG. 10 performed on the current frame. The process then proceeds to the temporary storage processing at STEP F3 shown in FIG. 9.

Figure 16A:
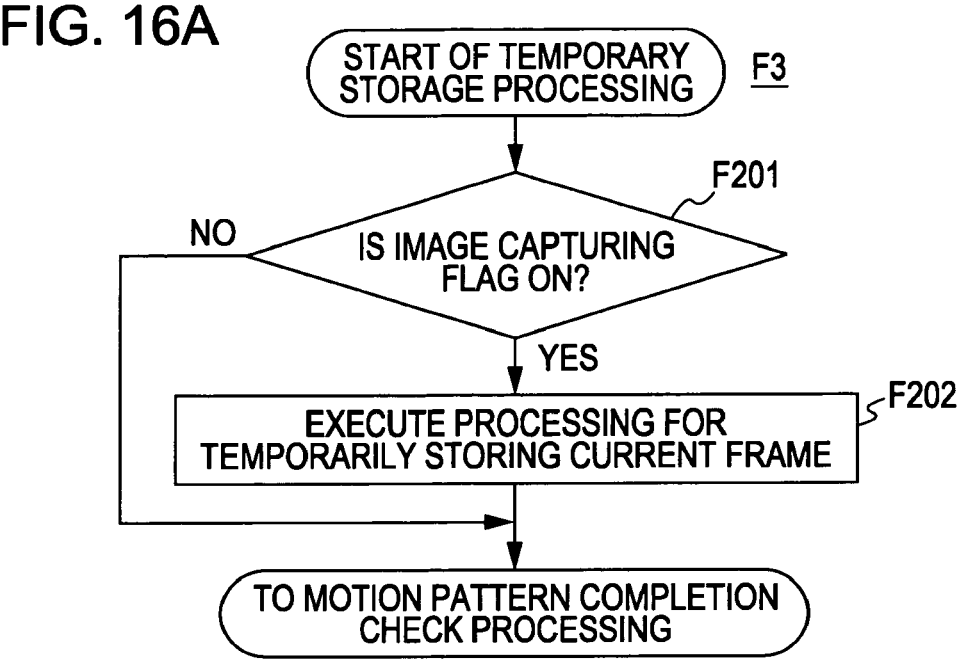
FIGS. 16A and 16B are flowcharts showing temporary storage processing according to embodiments.

The controlling unit 17 performs processing shown in FIG. 16A as the temporary storage processing at STEP F3.

The controlling unit 17 first checks the image capturing flag at STEP F201. If the image capturing flag is OFF, the controlling unit 17 terminates the processing without performing the temporary storage.

A case where the image capturing flag is ON corresponds to a case where the temporary storage condition is satisfied at least once regarding a relation between a given moving object image and a given motion detection window in the above-described processing shown in FIG. 10.

Accordingly, the process proceeds to STEP F202 and the controlling unit 17 controls temporary storage of the current frame. More specifically, the controlling unit 17 causes the compressing/decompressing unit 19 to compress image data of the current frame processed by the motion detecting unit 24 and transfer the compressed image data to the nonvolatile memory 29 so as to temporary store the image data therein.

Figure 16B:
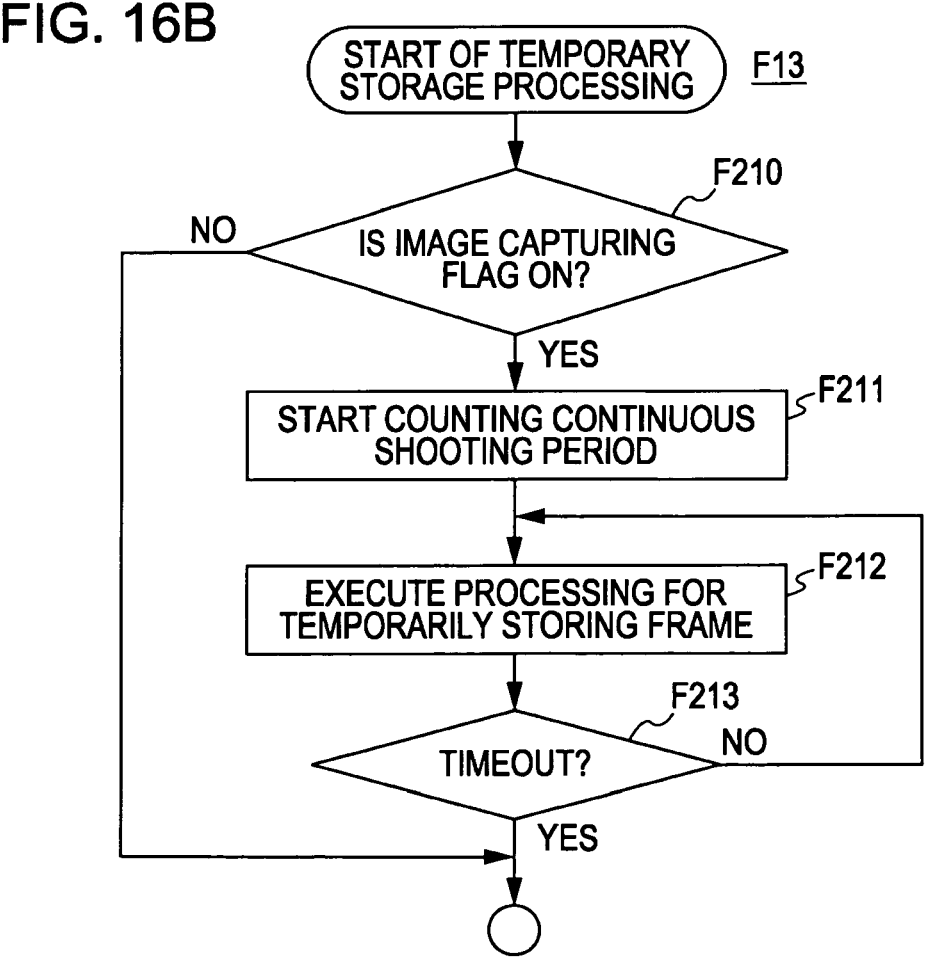

Processing shown in FIG. 16B is also employable as the temporary storage processing. This processing will be described as a second embodiment.

After the temporary storage processing shown in FIG. 16A, the controlling unit 17 performs the motion pattern completion check processing at STEP F4 shown in FIG. 9. The motion pattern completion check processing is processing for determining whether the temporarily stored image data matches the motion pattern selected by a user as a image capturing target, namely, the pattern defined by the motion detection windows.

Figure 17:
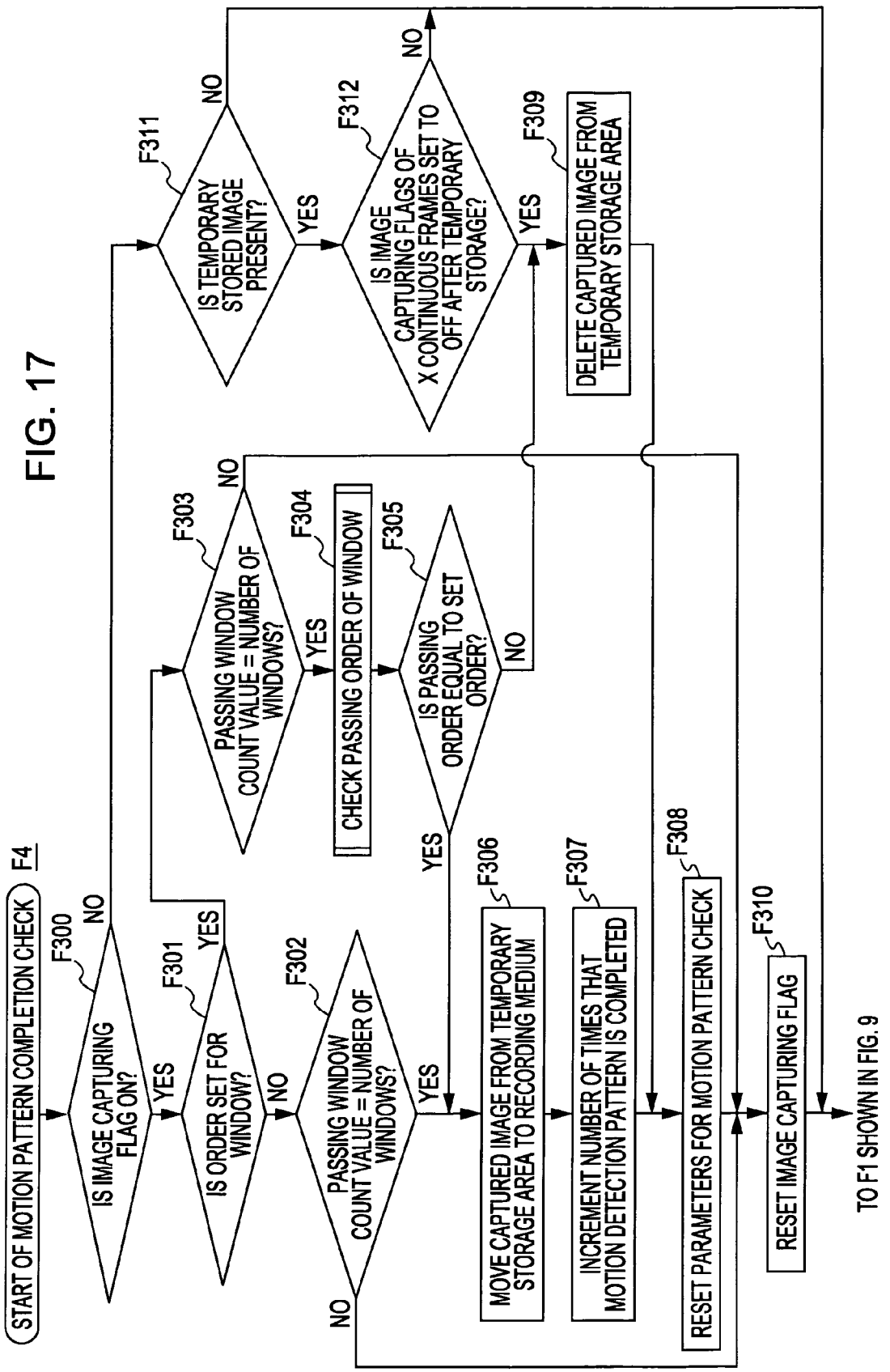
FIG. 17 is a flowchart showing motion pattern completion check processing according to an embodiment.

For example, the controlling unit 17 performs processing shown in FIG. 17 at STEP F4.

At STEP F300 shown in FIG. 17, the controlling unit 17 determines whether the image capturing flag is ON.

A case where the image capturing flag is OFF at this point corresponds to a case where the current processing target frame is not determined to be a candidate constituting the motion pattern and is not temporarily stored in the processing shown in FIG. 16A.

If the image capturing flag is OFF, the process proceeds to STEP F311 and the controlling unit 17 determines whether image data temporarily stored at that point exists or not.

If one or more pieces of temporarily stored image data exist, the controlling unit 17 determines whether image capturing flags of at least a predetermined number of consecutive frames (X frames) following the image data temporarily stored last among the one or more pieces of temporarily stored image data are OFF (i.e., whether at least X frames, following the temporarily stored one, that do not satisfy the temporary storage condition exist).

If the temporarily stored image data is not exist or if the temporarily stored image data exists but the number of following frames that area not temporarily stored is less than X, the controlling unit 17 terminates the motion pattern completion check processing without performing any kinds of processing. In this case, the process proceeds to STEP F2 through STEP F1 shown in FIG. 9 and the controlling unit 17 causes the motion detecting unit 24 to execute the moving object detection processing shown in FIG. 10 on the following frame.

A case where it is determined that no temporary stored image data exists at STEP F311 corresponds to a case where image data possibly serving as a candidate of the motion pattern has not been obtained yet. Accordingly, the controlling unit 17 performs processing on the following frame.

A case where it is determined that the temporarily stored image data exists but the image capturing flags of at least X consecutive frames are OFF after the temporary storage (i.e., at least X continuous frames are not temporarily stored) corresponds to a case where image data possibly serving as a candidate of the current motion pattern is temporarily stored but a subject image constituting the target motion of the subject is not obtained during a predetermined frame period. It is appropriate to determine that the temporarily stored image data is not the subject image constituting the target motion.

Accordingly, the process proceeds from STEP F312 to STEP F309 and the controlling unit 17 deletes the captured image temporarily stored in the nonvolatile memory 29.

The controlling unit 17 resets each motion pattern check parameter shown in FIG. 12B having been used in determination performed up to this point at STEP F308. The process then proceeds to STEPs F1 and F2 shown in FIG. 9 through STEP F310. More specifically, the controlling unit 17 starts the motion pattern detection processing on the following frame in an initial state.

If it is determined that the number of consecutive frames does not reach the value X at STEP F312, the controlling unit 17 determines that it is too early to determine whether the temporarily stored image data is a valid image or not and starts the processing for the following frames.

A case where it is determined that the image capturing flag is ON at STEP F300 corresponds to a case where image data of the current processing-target frame has been temporarily stored in the nonvolatile memory 29 in the temporary storage processing performed immediately before this processing.

In this case, the controlling unit 17 determines whether image data of one or more frames temporarily stored at that point constitute the target motion pattern.

At STEP F301, the controlling unit 17 first determines whether the window order is set as the settings of the currently selected motion pattern.

If the window order is not set, the process proceeds from STEP F301 to STEP F302 and the controlling unit 17 determines whether the value of the passing window count (see FIG. 12B) reaches the number of motion detection windows.

If the value of the passing window count does not reach the number of the motion detection windows, the controlling unit 17 determines that the image data of one or more frames temporarily stored at that point has not completed the target motion pattern yet and determination regarding whether the temporarily stored image data is valid or not at this point is inappropriate. The controlling unit 17 resets the image capturing flag OFF at STEP F310 and the process returns to STEP F1 shown in FIG. 9. At STEP F2, the controlling unit 17 causes the motion detecting unit 24 to execute the moving object detection processing shown in FIG. 10 on the following frame.

If the window order is set for the current motion pattern, the process proceeds from STEP F301 to STEP F303 and the controlling unit 17 determines whether the value of the passing window count (see FIG. 12B) reaches the number of motion detection windows.

If the value of the passing window count does not reach the number of the motion detection windows, the controlling unit 17 determines that the image data of one or more frames temporarily stored at that point has not completed the target motion pattern yet and determination regarding whether the temporarily stored image data is valid or not at this point is inappropriate. The controlling unit 17 resets the image capturing flag OFF at STEP F310 and the process returns to STEP F1 shown in FIG. 9. At STEP F2, the controlling unit 17 causes the motion detecting unit 24 to execute the moving object detection processing shown in FIG. 10 on the following frame.

For example, suppose that a motion pattern is defined by three motion detection windows W1, W2, and W3. In this case, if a moving object image M of a temporarily stored first frame touches only the motion detection window W1, the value of the passing window count is set equal to 1. In such a case, an appropriate determination result regarding whether a plurality of frames constitutes the target motion pattern is not obtained unless following frames are checked.

Accordingly, the controlling unit 17 performs the processing on the following frames by skipping the determination until the value of the passing window count reaches the number of motion detection windows (i.e., it is detected that the moving object image has touched all of the motion detection windows W1, W2, and W3 in one or more frames).

Depending on the motion of the subject, the value of the passing window count becomes equal to the number of motion detection windows after temporary storage of a plurality of frames by repeatedly performing the processing of STEPs F2, F3, and F4 shown in FIG. 9 on each following frame.

Needless to say, there may be a case where each frame image that can be a candidate is not detected thereafter and temporary storage is continuously skipped. In such a case, as described above, the process proceeds sequentially to STEP F312, STEP F309, and F308 and the motion pattern detection is restarted in an initial state.

In addition, depending on a relation between the size of the moving object or the speed of the motion and the frame rate of the image capturing operation, there may be case where the moving object image touches all of a plurality of motion detection windows (or touches in a vector matching state) in an image of one frame. More specifically, there may be a case where the value of the passing window count becomes equal to the number of motion detection windows at STEPs F302 or F303 after temporary storage of image data of one frame and matching of the motion pattern is determined in the following processing.

A case where the window order is not set for the currently selected motion pattern will be described.

In this case, upon the value of the passing window count becoming equal to the number of motion detection windows at STEP F302, it is determined that the target motion pattern is detected. In an example shown in, for example, FIG. 1B or 4A where four athletes are set as subjects, image data obtained when images of the athletes touch the respective motion detection windows W1, W2, W3, and W4 with the motion vectors matching each other are temporarily stored. Since the athletes may arrive at the same time, 1-4 pieces of image data are temporarily stored in response to the motion of the subjects.

In this case, when the value of the passing window count becomes equal to the number of motion detection windows, 1, 2, 3, or 4 pieces of image data temporarily stored may include an image containing each athlete crossing the finish line.

Accordingly, upon the value of the passing window count becoming equal to the number of motion detection windows, the controlling unit 17 processes the one or more pieces of temporarily stored image data as valid image data constituting the target motion pattern.

More specifically, the process proceeds to STEP F306 and the controlling unit 17 records the one or more pieces of image data temporarily stored in the nonvolatile memory 29 in the memory card 90. The controlling unit 17 records the temporarily stored image data in the memory card 90 as valid image data captured this time.

Meanwhile, in this case, in addition to recording of the temporarily stored image data in the memory card 90 (or without recording the temporarily stored image data in the memory card 90), the temporarily stored image data may be managed as valid image data in the nonvolatile memory 29.

By recording the image data in the memory card 90 at STEP F306, one image capturing operation (capturing of one image or a continuous shooting operation) is automatically performed at an appropriate timing.

At STEP F307, the controlling unit 17 increments the number of times that the motion detection pattern has completed. This value indicates the number of times that image capturing (capturing of one image or a continuous shooting operation) is actually performed during the motion-detection automatic image capturing execution mode according to this embodiment.

For example, as shown in FIG. 20, if the value of the number of times of motion detection pattern completion is displayed as a completion icon 112 on the display unit 21 during the motion-detection automatic image capturing execution mode, the user can know the number of times that images of a target movement (one image or continuously shot images) have been captured.

In the motion-detection automatic image capturing execution mode, motion detection windows or the like are superimposed on an image of a subject and displayed on the display unit 21 as shown in FIG. 20. For example, by changing a color of the displayed motion detection window regarding which the temporary storage condition is satisfied in the moving object detection processing shown in FIG. 10, a display image readily understood by the user can be provided.

The controlling unit 17 then resets all of the motion pattern check parameters at STEP F308 and the process returns to STEP F1 shown in FIG. 9.

Accordingly, the automatic image capturing operation is continued again in a parameter-initialized state.

A case where the window order is set for the motion detection windows will now be described.

In this case, the processing shown in FIG. 17 proceeds from STEP F301 to STEP F303. If the value of the passing window count is equal to the number of motion detection windows at that time, the controlling unit 17 checks the passing order of each motion detection window at STEP F304. More specifically, the controlling unit 17 determines whether the subject image touches the respective motion detection window in the set order.

Figure 18:
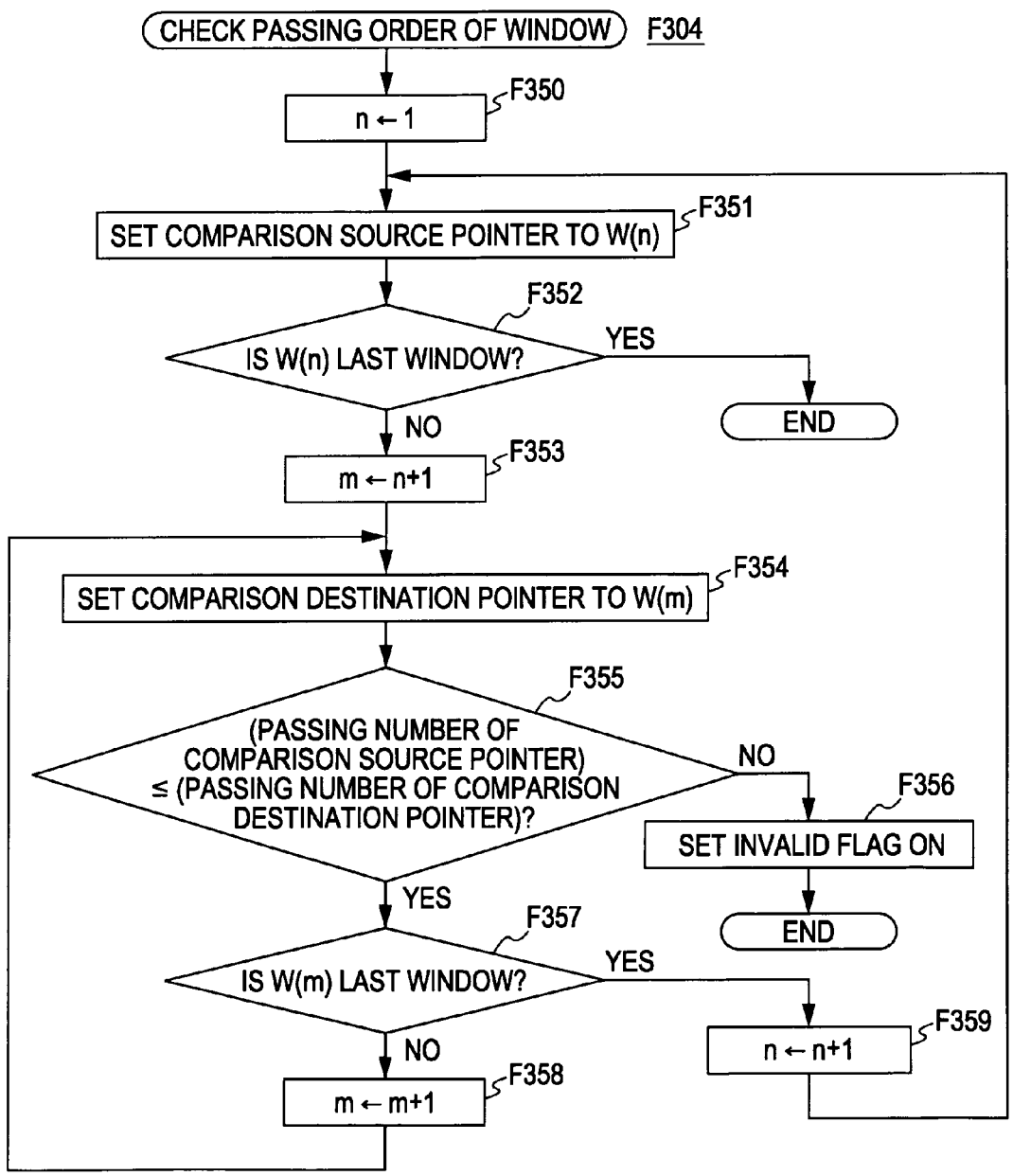
FIG. 18 is a flowchart showing processing for checking a passing order of motion detection windows according to an embodiment.

The controlling unit 17 executes processing of STEP F304 in a manner shown in, for example, FIG. 18.

At STEP F350, the controlling unit 17 sets a variable n to "1".

At STEP F351, the controlling unit 17 sets a comparison source pointer to a motion detection window W(n).

Suppose that three motion detection windows W1, W2, and W3 are set as a current motion pattern and the order of W1, W2, and W3 are set as the window order. In this case, as shown in FIG. 19, the comparison source pointer is set to the motion detection window W1, which is the first in the window order.

At STEP F352, the controlling unit 17 determines whether the current motion detection window W(n) is the last motion detection window (motion detection window W3). This means that the processing shown in FIG. 18 is terminated when the comparison source pointer is set to the last motion detection window W3.

After the comparison source pointer is set to the first motion detection window W1, the process proceeds to STEP F353 and the controlling unit 17 sets a variable m equal to n+1.

At STEP F354, the controlling unit 17 sets a comparison destination pointer to a motion detection window W(m). More specifically, as shown in FIG. 19, the comparison destination pointer is set to the motion detection window W2.

At STEP F355, the controlling unit 17 compares the passing number (see FIG. 12B) of the motion detection window W(n) indicated by the comparison source pointer with the passing number of the motion detection window W(m) indicated by the comparison destination pointer.

If (the value of the passing number of the motion detection window W(n))$\leq$(the value of the passing number of the motion detection window W(m)) is satisfied, the relation between the window orders of these two motion detection windows is appropriate.

More specifically, the motion detection window W1 is touched by the moving object image before (or at the same time of) the motion detection window W2.

If (the value of the passing number of the motion detection window W(n))>(the value of the passing number of the motion detection window W(m)) is satisfied, the moving object image touches the motion detection window W2 before the motion detection window W1. Accordingly, the window order is determined to be inappropriate. In this case, the controlling unit 17 sets the invalid flag ON at STEP F356 and terminates the processing shown in FIG. 18.

If the relation between the window orders of the motion detection window W(n) and the motion detection window W(m) is appropriate, the controlling unit 17 then determines whether the motion detection window W(m) is the last motion detection window at STEP F357.

When variable m=2, the motion detection window W2 is not the last motion detection window (motion detection window W3 in this case). Thus, the process proceeds to STEP F358 and the controlling unit 17 increments the variable m. The process then returns to STEP F354, the controlling unit 17 sets the comparison destination pointer to the motion detection window W(m). Accordingly, the comparison destination pointer is now set to the motion detection window W3. Whether (the value of the passing number of the motion detection window W1)$\leq$(the number of the passing number of the motion detection window W3) is satisfied is determined in the comparison processing performed at STEP F355. If this condition is satisfied, the motion detection window W1 is touched by the moving object image before (or at the time of)

the motion detection window W3. Thus, this relation between the window orders is appropriate.

On the other hand, if this condition is not satisfied, the controlling unit 17 determines the window order is inappropriate since the moving object image touches the motion detection window W3 before the motion detection window W1, sets the invalid flag ON at STEP F356, and terminates the processing shown in FIG. 18.

If the relation between the window orders is appropriate, the controlling unit 17 determines whether the motion detection window W(m) indicated by the comparison destination pointer is the last motion detection window W3. If the motion detection window W(m) is the last motion detection window W3, the process proceeds from STEP F357 to STEP F359 and the controlling unit 17 increments the variable n. At STEP F351, the controlling unit 17 sets the comparison source pointer to the motion detection window W(n), namely, the motion detection window W2, this time.

Since processing is performed in the similar manner at STEPs F352, F353, and F354, the controlling unit 17 determines whether (the value of the passing number of the motion detection window W2)≦(the value of the passing number of the motion detection window W3) is satisfied at STEP F355. If this condition is satisfied, the motion detection window W2 is touched by the moving object image before (or at the same time of) the motion detection window W3. Thus, this relation between the window orders is appropriate. On the other hand, if this condition is not satisfied, the controlling unit 17 determines that the window order is inappropriate since the moving object image touches the motion detection window W3 before the motion detection window W2, sets the invalid flag ON at STEP F356, and terminates the processing shown in FIG. 18.

If the relation between the window orders is determined to be appropriate at STEP F355, the process proceeds from STEP F357 to STEP F359 since the motion detection window W(m) indicated by the comparison destination pointer is the last motion detection window W3 and the controlling unit 17 increments the variable n. At STEP F351, the controlling unit 17 sets the comparison source pointer to the motion detection window W(n), namely, the motion detection window W3, this time. However, the motion detection window W(n) is determined to be the last motion detection window W3 at STEP F352, the processing is terminated.

In the processing shown in FIG. 18, the relation between the window orders is checked regarding each combination of a plurality of motion detection windows. The invalid flag is not set ON unless one of the combinations indicates the opposite order.

As described above, the value of the passing number is substituted in the processing shown in FIG. 11 performed at STEP F113 shown in FIG. 10. The passing number of each motion detection window indicates the order that the moving object image M touches the window for the first time.

When, for example, three motion detection windows W1, W2, and W3 are employed, the number of pieces of temporary stored image data is one, two, or three at the time when the process proceeds to STEP F304 shown in FIG. 17. In this case, possible combinations of passing number values are shown as (1)-(11) in FIG. 19.

Here, the combination (1) shown in FIG. 19 indicates a case where, for example, image data of FIGS. 2B, 2C, and 2D is temporarily stored as a typical case.

Referring to FIGS. 2 and 21, a procedure of processing performed in such a case will be described.

Since a moving object image is not detected during processing of a frame F#0 shown in FIG. 2A, no processing is performed at STEPs F2, F3, and F4 shown in FIG. 9. An image of a bird is detected as the moving object image M1 in the moving object detection processing performed at STEP F2 after the processing target is moved to a frame F#1 shown in FIG. 2B and the processing shown in FIGS. 10 and 11 is performed. After the completion of the processing shown in FIG. 10, each parameter is set as shown in FIG. 21A. More specifically, since the relation between the image of the bird and the motion detection window W1 satisfies the temporary storage condition, the passing number of the motion detection window W1 is set equal to "1". In addition, the value of the passing window count is set equal to "1".

Since the image capturing flag is set ON, image data of the frame F#1 is temporarily stored in the temporary storage processing (FIG. 16A) performed at STEP F3.

Although the processing shown in FIG. 17 is performed at STEP F4, the processing is exited since the value of the passing window count equal to 1 does not reach the number of motion detection windows. The process then proceeds to processing on a frame F#2 shown in FIG. 2C.

An image of a bird is also detected as the moving object image M1 in this moving object detection processing performed at STEP F2 and the processing shown in FIGS. 10 and 11 are performed. After the completion of the processing shown in FIG. 10, each parameter is set as shown in FIG. 21B. More specifically, the relation between the image of the bird and the motion detection windows W1 and W2 satisfies the temporary storage condition. Since the passing number of the motion detection window W1 has been already recorded, the passing number is not updated. The passing number of the motion detection window W2 is set equal to 2. In addition, the value of the passing window count is set equal to "2".

Since the image capturing flag is set ON, image data of the frame F#2 is temporarily stored in the temporary storage processing (FIG. 16A) performed at STEP F3.

Although the processing shown in FIG. 17 is performed at STEP F4, the processing is exited since the value of the passing window count equal to 2 does not reach the number of motion detection windows. The process then proceeds to processing on a frame F#3 shown in FIG. 2D.

An image of a bird is also detected as the moving object image M1 in this moving object detection processing performed at STEP F2 and the processing shown in FIGS. 10 and 11 are performed. After the completion of the processing shown in FIG. 10, each parameter is set as shown in FIG. 21C. More specifically, the relation between the image of the bird and the motion detection windows W1, W2, and W3 satisfies the temporary storage condition. Since the passing numbers of the motion detection windows W1 and W2 have been already recorded, the passing numbers are not updated. The passing number of the motion detection window W3 is set equal to 3. In addition, the value of the passing window count is set equal to "3".

Since the image capturing flag is set ON, image data of the frame F#3 is temporarily stored in the temporary storage processing (FIG. 16A) performed at STEP F3.

The processing shown in FIG. 17 is performed at STEP F4. The value of the passing window count equal to 3 reaches the number of motion detection windows at this point. Accordingly, the window order is checked in the processing performed at STEP F304.

At this time, the passing numbers of the motion detection windows W1, W2, and W3 are set as shown in the case (1) of FIG. 19.

In this case, the invalid flag is not set ON in the processing shown in FIG. 18. More specifically, the image data of the temporarily stored frames F#1, F#2, and F#3 is determined to satisfy the condition regarding the window order.

The window order shown in the cases (1)-(4) of FIG. 19 are determined to be appropriate in the processing shown in FIG. 18. Regarding the cases (5)-(11), the invalid flag is set ON in the processing shown in FIG. 18.

After checking the window order in the above-described manner at STEP F304 shown in FIG. 17, different kinds of processing are assigned at STEP F305 in accordance with the check result. More specifically, if the invalid flag is OFF, the process proceeds to STEP F306 since the set window order is satisfied.

At STEP F306, the controlling unit 17 processes one or more pieces of temporarily stored image data as valid image data constituting the target motion pattern. More specifically, the controlling unit 17 records the one or more pieces of image data temporarily stored in the nonvolatile memory 29 in the memory card 90.

By recording the image data in the memory card 90 at STEP F306, one image capturing operation (capturing of one image or a continuous shooting operation) is automatically performed at an appropriate timing. For example, continuously shot images shown in FIGS. 2B, 2C, and 2D are "captured".

At STEP F307, the controlling unit 17 increments the number of times of the motion detection pattern completion.

At STEP F308, the controlling unit 17 resets all of the motion pattern check parameters and the process returns to STEP F1 shown in FIG. 9.

More specifically, the automatic image capturing operation is continued again in the parameter initialized state.

On the other hand, if the invalid flag is set ON in the processing (i.e., the processing shown in FIG. 18) performed at STEP F304 shown in FIG. 17, the following processing is performed.

The invalid flag is set ON when, for example, the passing numbers are set as shown in cases (5)-(11) shown in FIG. 19 since the window order setting is not satisfied. In this case, the processing shown in FIG. 17 proceeds from STEP F305 to STEP F309 and the controlling unit 17 performs a control operation to delete invalid image data temporarily stored in the nonvolatile memory 29.

More specifically, the image data having been temporarily stored up to this point is determined not to be a subject image constituting the target motion and is deleted.

At STEP F308, the controlling unit 17 resets the value of each motion pattern check parameter shown in FIG. 12B having been used in determination performed up to this point. The process then returns to STEPs F1 and F2 shown in FIG. 9 through STEP F310. More specifically, the controlling unit 17 starts the motion pattern detection operation on the following frame in the initial state.

In the motion-detection automatic image capturing execution mode according to this embodiment, the user's terminating operation is detected at STEP F1 shown in FIG. 9. The above-described processing is continuously performed until the mode is switched to the motion-detection automatic image capturing standby mode.

As a result, image data matching the motion pattern is stored in the memory card 90 as a result of image capturing intended by the user.

Candidate image data is temporarily stored until it is determined that the image data matches the motion pattern. If it is determined that the candidate image data does not match the motion pattern, the controlling unit 17 considers the temporarily stored image data as unwanted image data and deletes the image data.

Accordingly, images of a subject having intended motion can be automatically captured and stored in the memory card 90 at a high probability and storage of unwanted images can be reduced as much as possible.

The processing performed by such an image capturing apparatus 1 may be modified in response to a user's setting change performed on the image capturing apparatus 1. The temporarily stored image data may be stored in, for example, a nonvolatile memory 29 instead of deleting and the user may be permitted to select whether to validate the image or delete the invalid image after confirming the image later.

When the image data that is once determined to be invalid is not deleted but is stored in the nonvolatile memory 29 or the like, a restriction is provided regarding a capacity of the storage area. A configuration in which older image data is sequentially overwritten if the size of the image data exceeds the capacity is also employable.

Validation equates to storage of image data in the memory card 90 as captured images. As described above, valid captured images (as image data generally considered by the user as captured results) may be stored in an internal memory, such as the nonvolatile memory 29, or the image data may be transferred to the other device as the captured results when the image capturing apparatus 1 is connected to another device through the external I/F unit 28.

Although validation/invalidation of temporarily stored image data is determined in accordance the processing shown in FIG. 17, various conditions for determining the image data to be valid may be employed.

In the above-described example, when the window order is not set, the temporarily stored image data is validated if a moving object touches all windows. When the window order is set, the temporarily stored image data is validated if a moving object touches all windows in the window order.

The conditions are not limited to these particular ones. The following conditions may be employed or a user may select the following conditions.

Validate image data if a moving object image touches at least one of one or more motion detection windows.

Validate image data if a moving object image touches a predetermined number of motion detection windows out of a plurality of motion detection windows.

Validate image data if a moving object image touches at least a majority of a plurality of motion detection windows.

Validate image data if a moving object image touches at least one of one or more motion detection windows with a motion vector of the image data matching a set motion vector.

Validate image data if a moving object image touches at least a majority of a plurality of motion detection windows with a motion vector of the image data matching a set motion vector.

In a case where a window order and a motion vector are set for a plurality of motion detection windows, validate image data when both the window order and the motion vector matches those of a moving object, when the motion vectors do not match but the window order is correct, or when the motion vectors match but the window order is not correct.

Combinations of passing numbers, among combinations (1)-(11) shown in FIG. 19, determined to be valid are freely selected regarding a window order.

The above-described conditions are illustrative only and various validity determining conditions are available other than these conditions. For example, by using various validity determining conditions or by permitting a user to select the validity determining condition, automatic image capturing matching the user's intention can be executed accurately.

<1-4: Motion Pattern Setting>

A description will be given for a method employed when a user newly creates a motion pattern used in the image capturing apparatus 1 according to this embodiment in the above-described manner. More specifically, a method for setting motion detection windows will be described.

FIG. 22A shows a setting menu 120 displayed on the touch screen 23 of the image capturing apparatus 1. A user selects an item "motion pattern registration" in this setting menu. The controlling unit 17 displays a motion pattern selection screen 121 shown in FIG. 22B on the display unit 21 (touch screen 23) in response to such a user operation.

The user can select previously registered motion patterns (pattern A, B, C) or select to newly create a pattern in this motion pattern selection screen 121 by touching the touch screen 23.

In response to the user's selection of a registered pattern or creation of a new pattern, the controlling unit 17 displays a motion detection area setting screen 122 shown in FIG. 22C on the display unit 21.

The user edits motion detection windows of registered motion patterns or newly creates motion detection windows using this motion detection area setting screen 122. For example, a user specifies an area of a motion detection window in which a subject is detected as a rectangular window, thereby being able to set the size and position thereof. In addition, the user can set conditions for each motion detection window, i.e., a motion vector indicating the direction and amount of the motion and the window order.

If the user completes the work for creating/editing the motion detection windows and operates a "set" button, the controlling unit 17 displays a motion pattern detection completion condition setting screen 123 shown in FIG. 22D on the display unit 21.

Through this motion pattern detection completion condition setting screen 123, the user can set the number of passing windows serving as a condition for completing motion detection (e.g., a validation determining condition used in processing shown in FIG. 17) or whether to check the window order.

If a user operates a "return" button, the controlling unit 17 switches the displayed screen back to the motion detection area setting screen 122 shown in FIG. 22C. In this manner, the user can perform an operation for setting areas of motion detection windows again.

If the user operates the "set" button after setting the condition on the motion pattern detection completion condition setting screen 123, the controlling unit 17 switches the screen to the motion pattern selection screen 121 shown in FIG. 22B. At this time, the controlling unit 17 registers a motion pattern created this time as a new motion pattern so that the user can select the pattern thereafter.

A detail of the motion detection area setting screen 122 shown in FIG. 22C will be described with reference to FIG. 23.

Here, a description will be given for an example of a method for setting a rectangular window representing a range and a position where a moving object image is detected. The display operation to be described below is executed in display control processing performed by the controlling unit 17 in response to user operations.

A broken line 133 defining a range where motion detection windows can be set is displayed in the motion detection area setting screen 122 displayed on the screen of the touch screen 23. An "add" button B1, a "delete" button B2, and a "set" button B3 are also displayed. In addition, a vector setting button B4 and a vector automatically setting button B5 are displayed.

In response to a user's touch on the add button B1, a motion detection window (e.g., motion detection window W1) is newly displayed at a blank space on the screen. This drawing shows a state in which two motion detection windows W1 and W2 are displayed in response to operations performed on the add button B1 twice.

The newly added motion detection window in a predetermined size appears on the screen. If the blank space on the screen is too small to display a new motion detection window, the controlling unit 17 does not add the motion detection window but displays an error message to notify the user of the error.

In addition, the newly added motion detection window is automatically selected. When a plurality of motion detection windows are displayed on the screen, a user simply has to touch a motion detection window that the user wants to select.

Numerals (order icon 136) indicating the order of the motion detection windows are displayed at an upper left portion of the motion detection windows (W1 and W2) displayed on the screen. The numeral serving as the order icon 136 is incremented according to a creation order of the motion detection window and is managed as order data accompanying the motion detection window. More specifically, this numeral serves as the above-described window order setting and is used in determination of a motion pattern. When setting a condition of completion of the motion detection pattern to be described later, the user can select whether to validate or invalidate this numeral. More specifically, this selection is regarding whether to perform the window order setting or not.

Although the order of the motion detection window is set in accordance with the creation order of the motion detection window herein, the user may freely set or change the window order after creating a given number of motion detection windows.

Buttons 134 are displayed at four corners of the selected motion detection window. FIG. 23 shows an example where the motion detection window W2 is selected. The buttons 134 are not displayed at four corners of the non-selected motion detection window (motion detection window W1 in this case).

By dragging the button 134, the user can enlarge/reduce the range of the motion detection window. A variable range of enlargement/reduction may be defined. For example, the minimum size of reduction may be set to the size of the motion detection window displayed when the motion detection window is newly added and it may be configured that the motion detection window is not reduced to the size smaller than that.

A cross 135 is displayed at the center of the selected motion detection window (W2). By dragging the cross 135, the user can move the position of the entire motion detection window (W2). However, the motion detection window is not moved outside of the broken line 133. That is, the range of the motion detection window has to be inside of the broken line 133. The controlling unit 17 performs a control operation so that the motion detection window is not moved even if the user drags the motion detection window to outside of the area enclosed by the broken line 133.

If the user touches the delete button B2 with a given motion detection window being selected, the controlling unit 17 deletes the selected motion detection window. At this time, it is preferable to display a dialog before actually deleting the motion detection window so that a user can select "OK" or "CANCEL".

If a plurality of motion detection window exist on the screen, one motion detection window and another motion detection window may partially overlap. However, it may be configured that motion detection windows in an identical size do not exist at a completely identical position or a motion detection window in a given size does not exist inside of another motion detection window. When a user attempts to move a given motion detection window to such positions by dragging the motion detection window, the controlling unit 17 may notify the user of an error message instead of moving the motion detection window. Needless to say, a restriction for prohibiting the partial overlap of the motion detection windows may be provided.

A motion vector can be set for a motion detection window.

A user first selects a given motion detection window and presses the vector setting button B4. If the vector setting button B4 is pressed once, the display is changed to an icon indicating a pressed state. Here, suppose that this icon indicates that this screen demonstrates as a motion vector setting mode to the user. If the user touches the vector setting button B4 again in this state, the mode returns to the above-described window size/position setting mode again.

Figure 24:
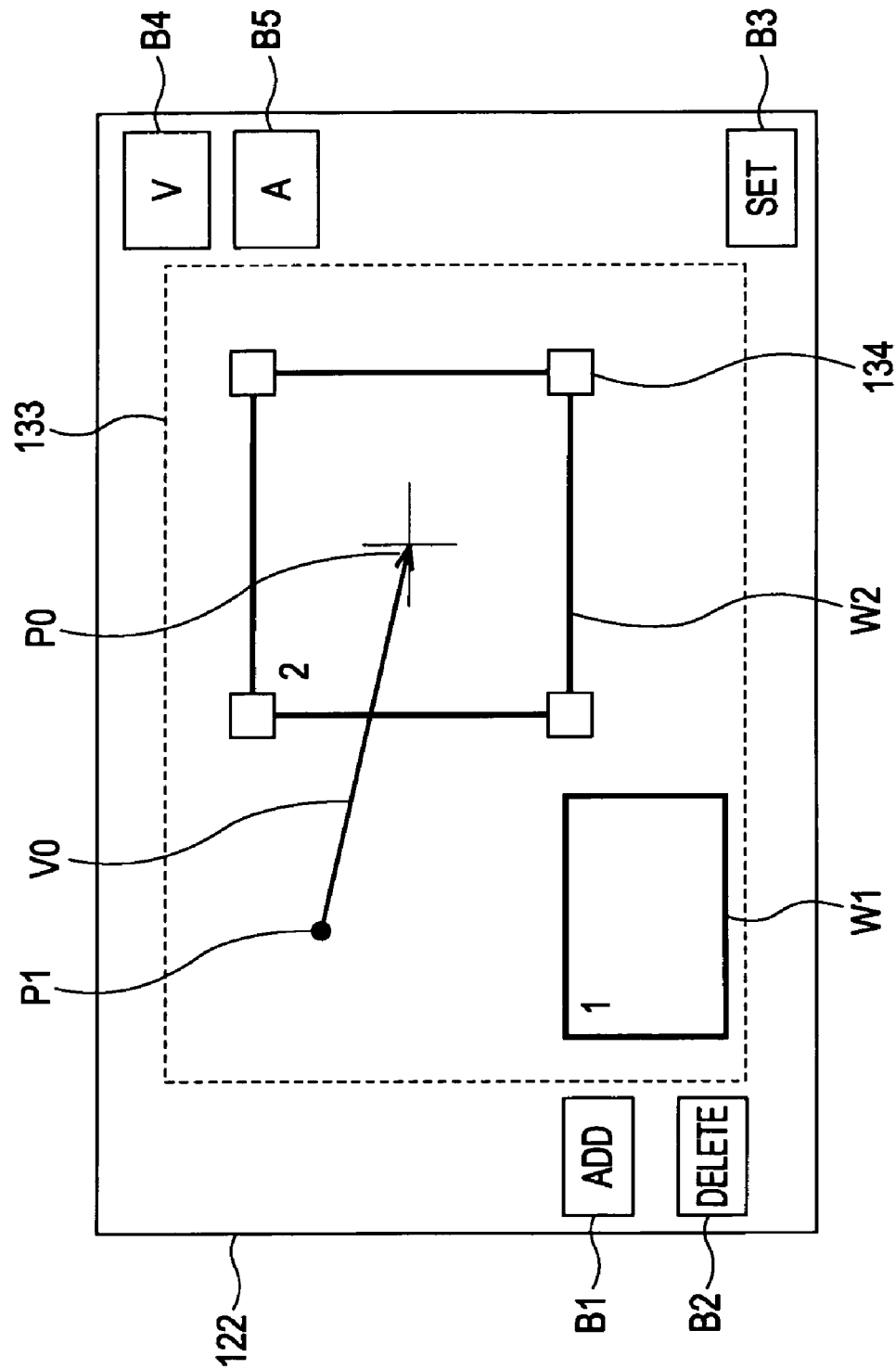
FIG. 24 is an explanatory diagram showing a motion vector setting according to an embodiment.

In the motion vector setting mode, a point P1 appears at a given position on the screen with respect to the selected motion detection window (W2) as shown in FIG. 24. In addition, an arrow V0 is drawn from the point P1 to a center P0 of the selected motion detection window (W2). This arrow V0 indicates the direction of the vector set for the motion detection window (W2).

It is preferable to draw this arrow V0 in a color (e.g., red) indicating that the arrow is being edited.

At this time, if the user touches at a given position, which is outside of the selected motion detection window (W2), on the screen, the point P1 moves to the given position. The point P1 may be moved to outside of the broken line 103. That is, the point P1 may be moved within a screen range of the touch screen 23. If the point P1 is moved, the arrow V0 is redrawn from the position to which the point P1 has been moved.

If the user touches a given position inside of the selected motion detection window (W2), display of the point P1 and the arrow V0 disappears. For example, this state indicates that no motion vector is set for the selected motion detection window.

When a user wants to finish setting the motion vector of the motion detection window, the mode returns to the above-described window size/position setting mode by pressing the vector setting button B4 again. The set motion vector is drawn in a color (e.g., black) indicating that the vector is determined.

Furthermore, if the user wants to set a motion vector for another motion detection window, the user simply touches the motion detection window to select the window, presses the vector setting button B4 to switch the mode into the motion vector setting mode, and performs the similar operation.

Figure 25:
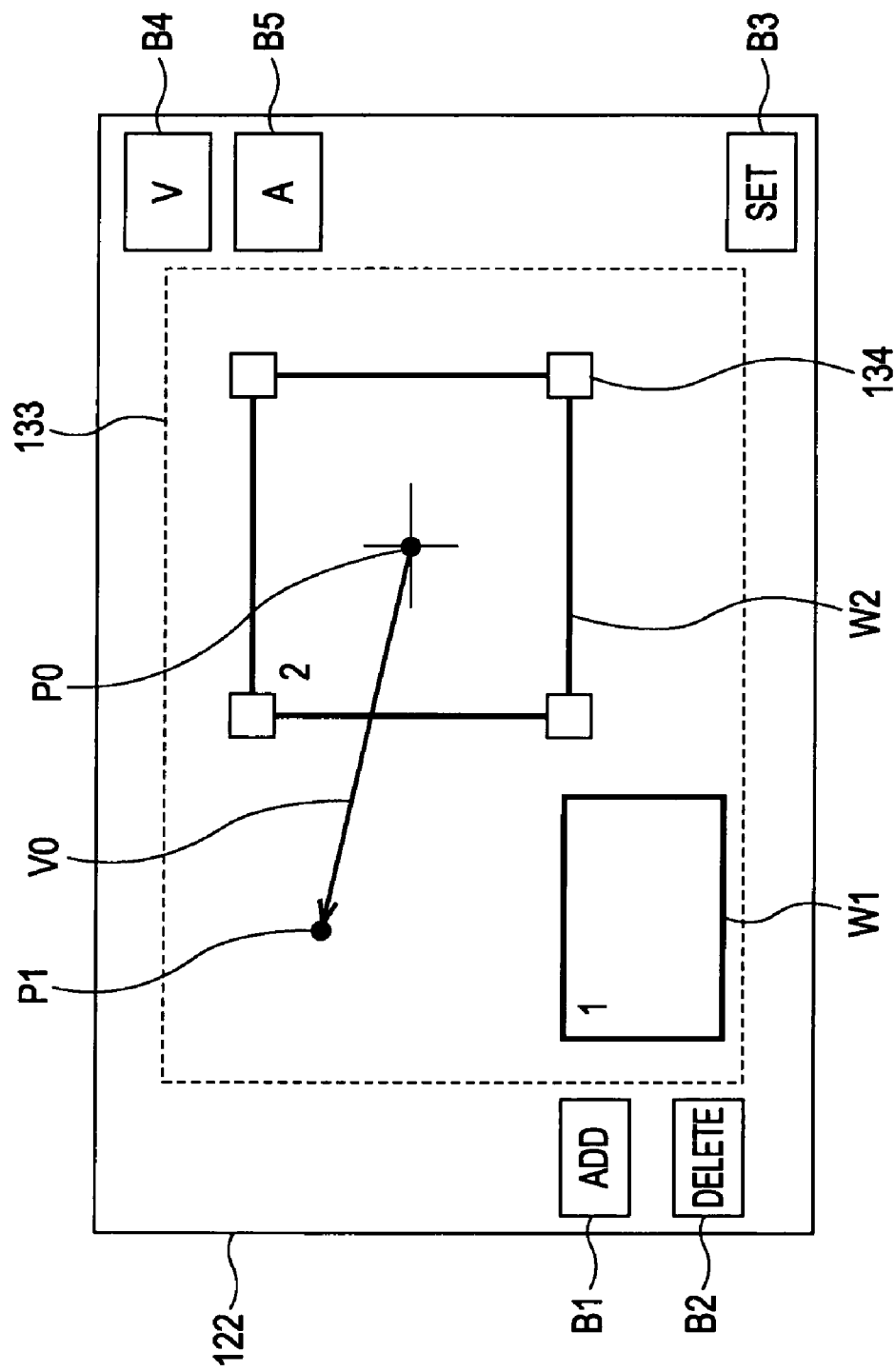
FIG. 25 is an explanatory diagram showing specification of a direction of a motion vector according to an embodiment.

FIG. 25 shows an example for changing a direction of a vector set for a motion detection window.

This case corresponds to a case where a user wants to set an opposite vector direction from the center P0 of the motion detection window (W2) to the point P1 located outside of the window instead of the vector direction from the point P1 located outside of the selected motion detection window (W2) to the center P0 of the motion detection window.

In a specification method, the user touches the same coordinates as those of the point P1 again after determining the position of the point P1 in the above-described motion vector setting mode. The controlling unit 17 recognizes this operation as an instruction for switching the direction and sets the direction of the vector to the opposite direction. In this case, the vector direction can be switched between P1→P0 and P0→P1 by touching the point P1 over and over again. The arrow V0 is also drawn in response to a change in the vector direction.

A mode for automatically setting a motion vector (hereinafter, referred to as a motion vector automatically setting mode) is also prepared.

In this mode, a user touches the vector automatically setting button B5 displayed on the screen, whereby a motion vector to be set for each motion detection window is automatically determined according to the window order of the motion detection window.

Figure 26:
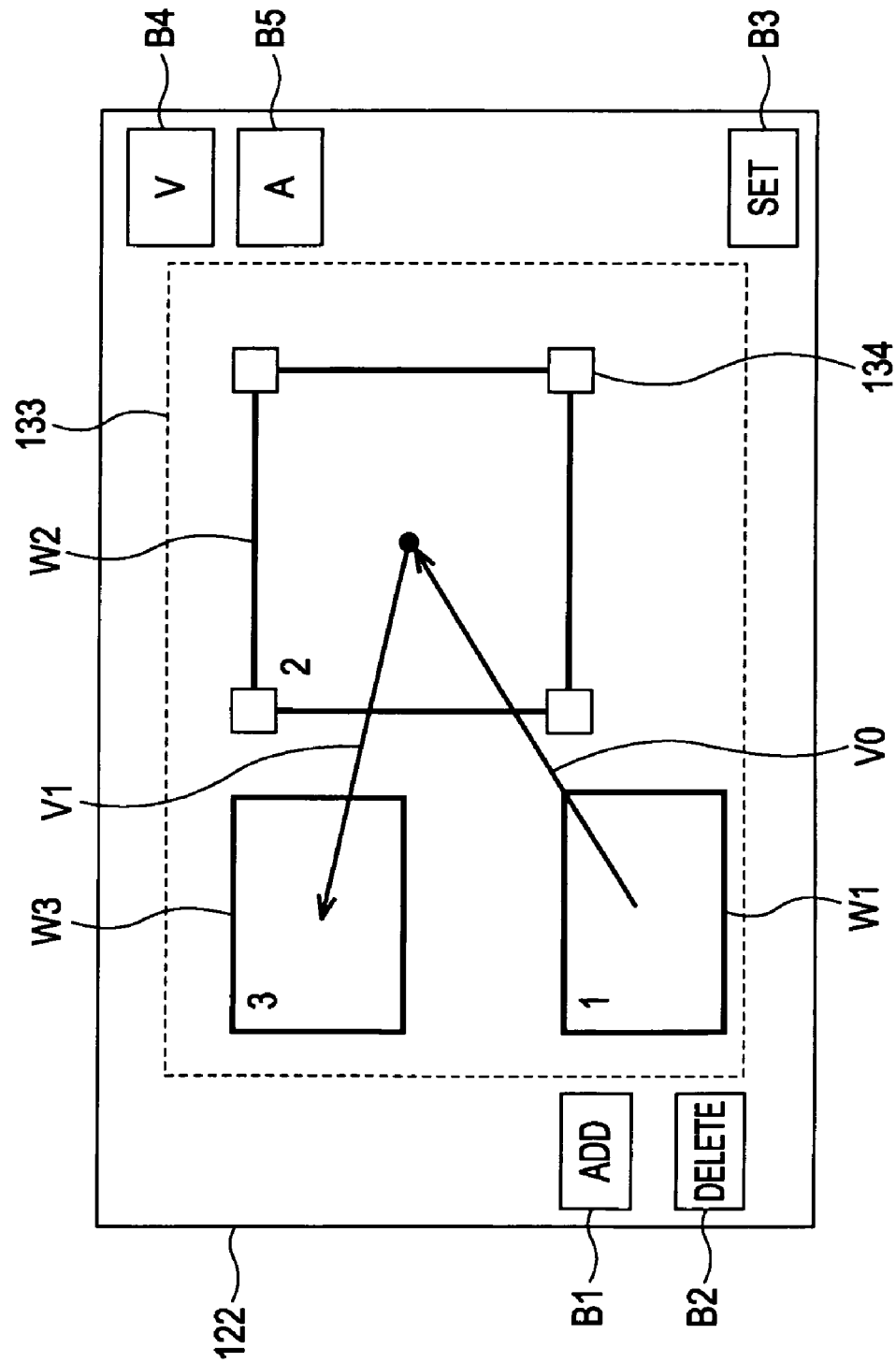
FIG. 26 is an explanatory diagram showing an automatic motion vector setting according to an embodiment.

FIG. 26 shows a state in which three motion detection windows W1, W2, and W3 are created. If the user presses the vector automatically setting button B5 in this state, the controlling unit 17 automatically set motion vectors based the center P0 of each of the motion detection windows W1, W2, and W3 as shown in the drawing.

More specifically, a vector extending from the center of the motion detection window W1 to the center of the motion detection window W2 is set as an arrow V0, whereas a vector extending from the center of the motion detection window W2 to the center of the motion detection window W3 is set as an arrow V1.

In this mode, the user may not be allowed to individually set a motion vector for each motion detection window.

A setting regarding a quantity of a motion vector will now be described with reference to FIGS. 27A and 27B.

The most preferably, the quantity of the motion vector (an amount of motion) can be set as sensitivity that the image capturing apparatus 1 detects the motion.

Figure 27A:
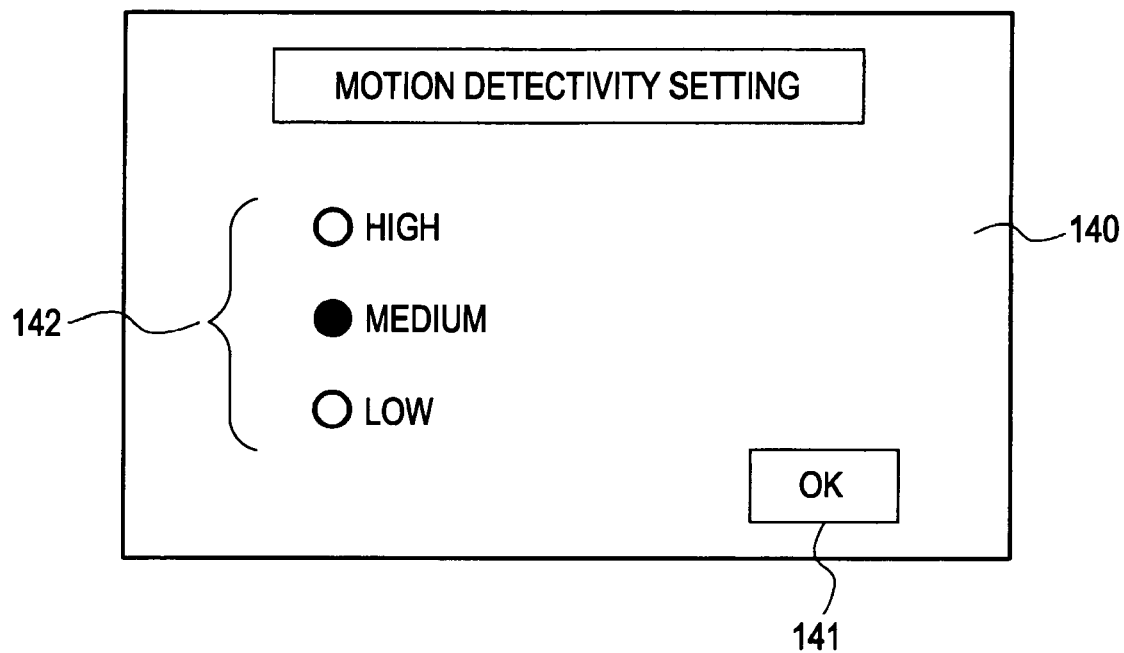
FIGS. 27A and 27B are explanatory diagrams showing a setting of a quantity of a motion vector according to an embodiment.

In this case, a user can select the motion vector detectivity from three levels "high", "medium", and "low" in a setting menu GUI shown in FIG. 27A.

The three levels are defined as follows:

"high"—motion is detected when the quantity of a motion vector is small;

"medium"—motion is detected when the quantity of a motion vector is medium; and

"low"—motion is detected when the quantity of a motion vector is large.

The user is permitted to select one of "high", "medium", and "low" through a checkbox 142 and establish the selection through an OK button 141.

Figure 27B:
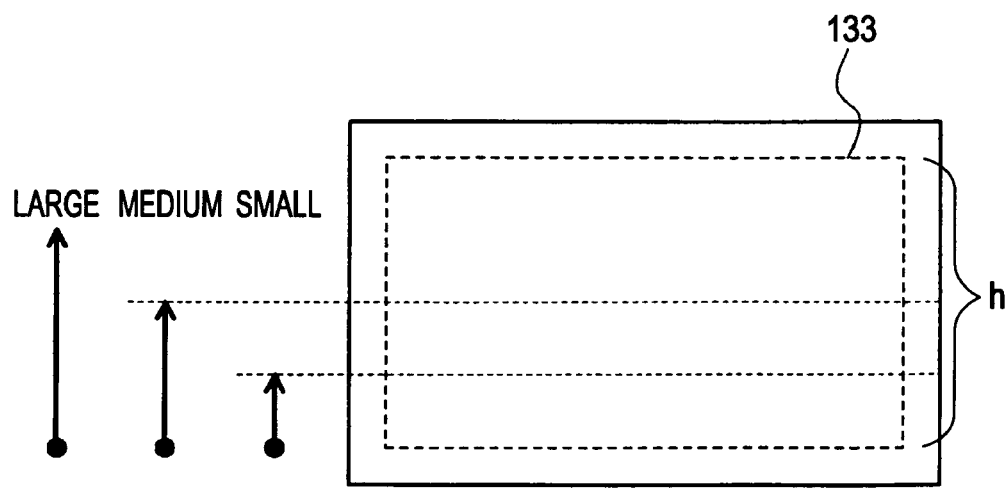

As an example method for determining the levels, such as large, medium, and small, of the motion vector, the level of the motion vector is determined by comparing the quantity of a motion vector of a moving object image in one frame with the resolution of the touch screen as shown in FIG. 27B. For example, as shown in FIG. 27B, when a height of the broken line window 103 indicating a window settable area is denoted by h, thresholds are defined as follows:

"large"—when motion of the moving object image in one frame is larger than ½ of the height h;

"medium"—when motion of the moving object image in one frame is between ¼ and ½ of the height h; and "small"—when motion of the moving object image in one frame is smaller than ¼ of the height h.

The thresholds for determining the levels "large", "medium", and "small" are preferably designed to be readily chageable as adjustment parameters during the use of the image capturing apparatus 1. In addition, a GUI menu may be provided so that the user can set the parameters as setting values of the image capturing apparatus 1.

FIGS. 28A and 28B show another example of setting a quantity of a motion vector.

FIG. 28A shows an example in which a distance between the point P1 and the center P0 is used as the quantity of the motion vector when a user specifies the point P1 at a given position located outside of a selected motion detection window during the above-described motion vector direction setting operation performed on the motion vector setting screen shown in FIG. 24.

Referring to FIG. 28B, three quantities (large, medium, and small) of a motion vector are prepared and an arrow having each quantity is displayed in different colors in the GUI. For example, the colors are set as follows:
red line—large motion;
yellow line—medium motion; and
blue line—small motion.
The user specifies the direction of the motion vector after specifying a given color. The above-described method shown in FIG. 27B may be employed as a method for determining large, medium, or small motion executed by the image capturing apparatus 1.

According to the two method described with reference to FIGS. 28A and 28B, more accurate motion pattern setting can be advantageously realized since different vector quantities can be specified for each motion detection window.

The image capturing apparatus 1 may employ one of the motion vector quantity setting methods shown in FIGS. 27A, 27B, 28A, and 28B or may employ all of the methods and permit the user to select a given one.

The description has been given for the case where a user performs a motion detection window area setting, a window order setting, and a motion vector direction/quantity setting on the motion detection area setting screen 122 shown in FIG. 22C. After finishing these works, the user operates the set button B3.

In response to the user's pressing of the set button B3, the controlling unit 17 recognizes that the motion detection window area setting has completed and switches the screen to the motion pattern detection completion condition setting screen 123 shown in FIG. 22D.

User operations through the motion pattern detection completion condition setting screen 123 shown in FIG. 22D will now be described with reference to FIG. 29.

The motion pattern detection completion condition setting equates to setting of a condition used in, for example, the motion pattern completion check processing shown in FIG. 17 in order to determine whether motion of a moving object matches the motion pattern, i.e., whether image data of the moving object is valid. As described above, in the example shown in FIG. 17, when the window order is not set, temporarily stored image data is determined to be valid if the moving object touches all windows. Additionally, when the window order is set, temporarily stored image data is determined to be valid if the moving object touches all windows in the set window order.

Furthermore, as described above, various conditions, e.g., a condition for determining that image data is valid if a moving object image touches a predetermined number of motion detection windows out of a plurality of motion detection windows, can be considered.

Here, an example of permitting a setting regarding whether to include the window order of motion detection windows in a condition and a setting regarding a number of windows touched by the moving object image will be discussed as one example.

Figure 29:
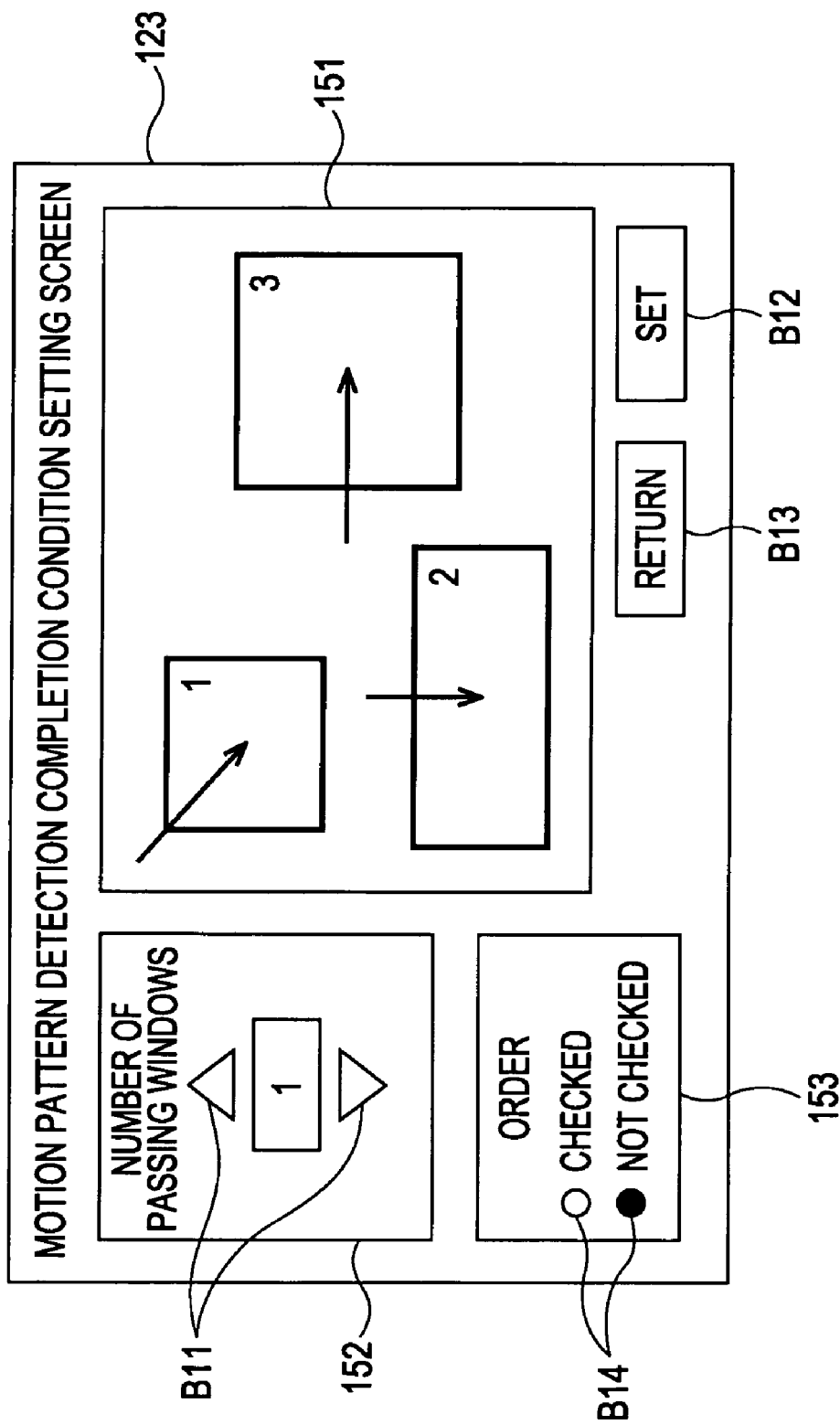
FIG. 29 is an explanatory diagram showing a motion pattern detection completion condition setting screen according to an embodiment.

In the motion pattern detection completion condition setting screen 123 shown in FIG. 29, a motion pattern setting screen 151 including motion detection windows previously set on the motion detection area setting screen 122 is displayed.

A part for setting the number of passing windows (hereinafter referred to as a passing window number setting part) 152 and a number adjusting button B11 are also displayed.

In addition, an order checkbox 153 and a checkbox B14 are displayed.

Furthermore, a return button B13 and a set button B12 are displayed.

A motion pattern currently being created is displayed as the motion pattern setting screen 151. If a user wants to modify this motion pattern, the user simply has to press the return button B13. In this case, the controlling unit 17 performs a control operation to switch the screen 123 to the motion detection area setting screen 122 shown in FIG. 22C again.

The user can set whether to function the window order as a determination condition of the motion pattern shown in the motion pattern setting screen 151.

More specifically, the user can select existence or absence of the order check by touching the checkbox 314 of the order checkbox 153. Here, existence or absence of the order check equates to whether to include the determination of the window order described with reference to FIG. 17 to the condition. On the basis of this setting, different kinds of processing are assigned at STEP F301 shown in FIG. 17.

The user can also set the number of passing windows as a determination condition of the motion pattern displayed in the motion pattern setting screen 151. More specifically, the user can set a given number by changing a value with the number adjusting button B11 of the passing window number setting part 152. For example, when three motion detection window are created as shown in the drawing, the user can select "1", "2", or "3" as the number of passing windows.

The number of passing windows corresponds to "the number of motion detection windows" described at STEPs F302 and F303 shown in FIG. 17. The description regarding FIG. 17 has been given for a case where "the number of motion detection windows" is equal to "the total number of motion detection windows", which is a fixed value. Thus, a condition that "a moving object image has touched all motion detection windows" is employed as one of the determination conditions. According to this setting of the number of passing windows, a condition that "a moving object image has touched one motion detection window" or "a moving object image has touched two motion detection windows" may be employed as the conditions when the motion pattern includes, for example, three motion detection windows.

Regarding the setting of the number of passing windows and the setting of the order check, for example, the number of passing windows and the order check may be initially set to the total number of created motion detection windows and "invalid", respectively.

Needless to say, these settings can be omitted when the number of motion detection windows is one. In such a case, it is appropriate to invalidate a touch operation performed on the passing window number setting part 152 and the order checkbox 153 or display the passing window number setting part 152 and the order checkbox 153 in a pale color.

Although an example of setting the number of passing windows and existence/absence of the order check has been described, various settings may be made.

After selecting the conditions on the motion pattern detection completion condition setting unit 123, the user touches the set button B12. The controller 17 then considers this operation as completion of the condition setting and switches the screen 123 into the motion pattern selection screen 121 shown in FIG. 22B.

When terminating this motion pattern detection completion condition setting screen 124, the controlling unit 17 may display the set information to the user to allow the user to confirm the information and select "OK" or "CANCEL".

The user can freely create and register motion patterns, for example, in the above-described manner so that the motion patterns are used in the image capturing apparatus 1.

The controlling unit 17 stores information on the created motion patterns in a nonvolatile memory included in the controlling unit 17 or a predetermined area of the nonvolatile memory 29 and allows the user to select the created motion patterns through the setting menu shown in FIG. 7A when executing the motion-detection automatic image capturing thereafter.

<1-5: Advantages in Application of Embodiment to Image Capturing Apparatus>

The description has been given for the motion-detection automatic image capturing operation performed in the image capturing apparatus 1 and the motion pattern setting. Such an image capturing apparatus 1 according to the embodiment can provide following advantages.

In general, it is difficult for non-skilled people to capture images of a moving object since a skilled image capturing technique is used to capture the images of the moving object. A user can photographs a moving object in an intended composition with a simple operation using the image capturing apparatus 1 according to this embodiment.

For example, if the user points the finder at around a goal in a soccer game, the user can capture the decisive moment without missing the best moment to take a good picture.

In addition, since a motion pattern can be set regarding motion that can be predicted to some extent, a photographer does not have to wait for the moment while holding a camera.

For example, as described in FIGS. 2A-4D, when a user aims to take pictures of a rapidly moving living thing or a train or when the user originally has to wait for a subject for a long time while fixing an image capturing location, an angle, and a finder, the user does not have to standby in front of the camera during this period but can capture images in an intended composition while doing other things.

For example, when a user captures an image of a running race at an athletic meet, the user can effectively capture an image of a finishing line scene of athletes by fixing the finder around the finish line. In addition, since a high-speed image capturing setting is also available, a usage such as decision of the horse race winner by a photograph is also available.

In addition, motion patterns are set using simple combinations of arrangement and number of motion detection windows and vectors for the motion detection windows. Accordingly, various kinds of motion or complex motion can be handled by simply setting only one motion detection window and providing the motion vector setting and the window order setting using a plurality of motion detection windows.

In this way, the user can select a motion detection pattern in accordance with characteristics of various scenes to be captured and can capture images using a motion pattern closer to the user's intention. Accordingly, various kinds of motion of a subject to be captured can be flexibly coped with.

Figure 30A:
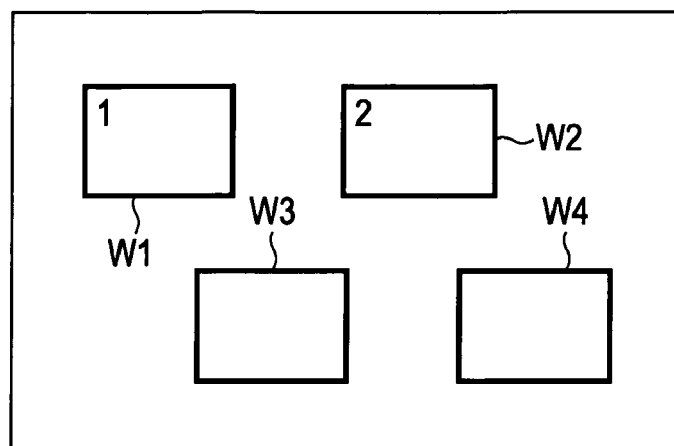
FIGS. 30A-30C are explanatory diagrams showing examples of motion detection window settings according to an embodiment.

Various setting examples can be considered regarding the setting of motion patterns using motion detection windows. For example, FIG. 30A shows an example where the window order is set some of motion detection windows. The window orders of the motion detection windows W1 and W2, among motion detection windows W1, W2, W3, and W4, are set as the first and second, respectively. However, the window order is not specified regarding the motion detection windows W3 and W4. In this case, the window order is determined to be appropriate when a moving object image passes through the windows in an order of "W1→W2→W3→W4" and when the moving object image passes through the windows in an order of "W1→W2→W4→W3".

Figure 30B:
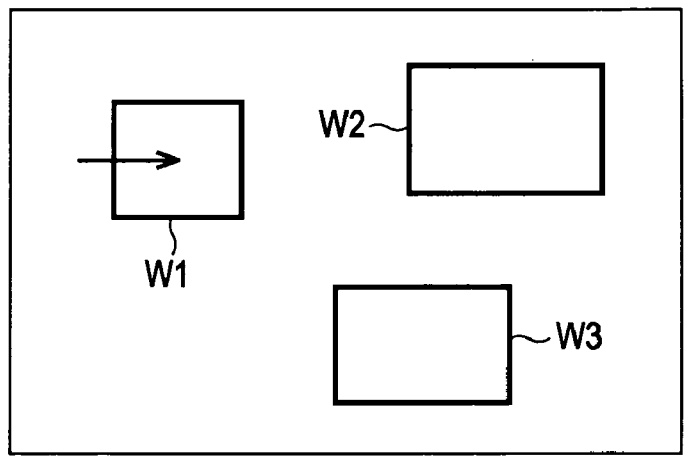

FIG. 30B shows an example where motion vectors are set some of motion detection windows. A motion vector is set only for the motion detection window W1. If the moving object image enters the window W1 from the left, the motion of the moving object image matches the motion vector. The moving object image may be detected in any directions in other motion detection windows W2 and W3.

Figure 30C:
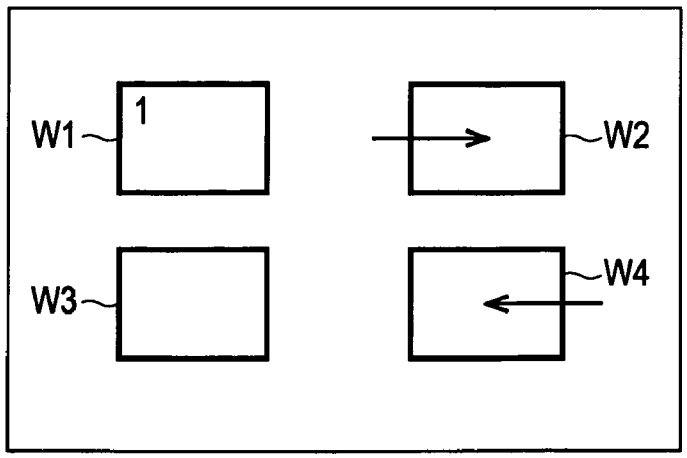

FIG. 30C shows an example where the window order and motion vectors are set for some of motion detection windows. The window order of the motion detection window W1 is set as the first, whereas the window order is not specified for other motion detection windows. Motion vectors are set for the motion detection windows W2 and W4.

It is possible to detect a motion pattern of a target subject more accurately using the above-described various setting combinations.

Since high-speed image capturing or continuous image capturing is also executed depending on a scene to be captured or selection of a motion pattern, a user can capture the decisive moment of a moving object without missing the best moment to capture an image.

In such a case, since pictures are taken (stored as valid images) only when a subject performs intended movement, many unwanted images are not captured.

In addition, in the related art, a user has to select images containing the desired composition or motion from many captured images in an editing work after continuously capturing images of a subject that moves at a high speed before and after a desired scene. However, according to this embodiment, cases of capturing disappointing images reduce.

In addition, since a function for creating motion detection patterns is provided, a user can create given motion detection patterns.

Since a given number of motion detection patterns created by the user can be stored in the image capturing apparatus 1 and the user can set a given pattern at the time of automatic image capturing, the user can quickly set a composition to be captured and the motion detection pattern in various cases, which is thus significantly convenient.

During execution of motion-detection automatic image capturing, the icon 111, the motion detection windows, and the number of times of completion 112 are displayed as shown in FIG. 20 so that the user can know the execution of the automatic image capturing. In addition, motion detection windows regarding which passing of the moving object image is detected are displayed in different colors. With this configuration, the user can confirm, in real time, motion detection windows that the subject has passed through and the number of times that images are captured with this motion detection pattern. Accordingly, the user can precisely determine whether to terminate or continue the automatic image capturing.

By performing exposure adjustment and focus adjustment corresponding to the detected moving object image before execution of the motion-detection automatic image capturing, images of a clearly captured subject can be recorded, which is thus more preferable.

More specifically, the controlling unit 17 can determine an exposure control value and a focus control value regarding the moving object image detected by the motion detecting unit 24 and can perform, using the determined values, adjustment of a lens and an aperture of the variable optical system 3, electronic shutter adjustment by issuing an instruction to the timing controlling unit 14, and gain adjustment in the analog signal processing unit 12.

The image capturing apparatus 1 according to this embodiment can be suitably employed as a security camera. In addition, for example, when a user attempts to effectively perform continuous image capturing with an inexpensive camera, the continuous image capturing can be performed at an appropriate timing desired by the user using the image capturing apparatus 1 according to this embodiment even if the camera does not have a high-speed continuous image capturing function.

Although the description has been given for a case where the shape of the motion detection window is rectangular in the above-described embodiment, the shape of the window is not limited to this particular shape.

Figure 23:
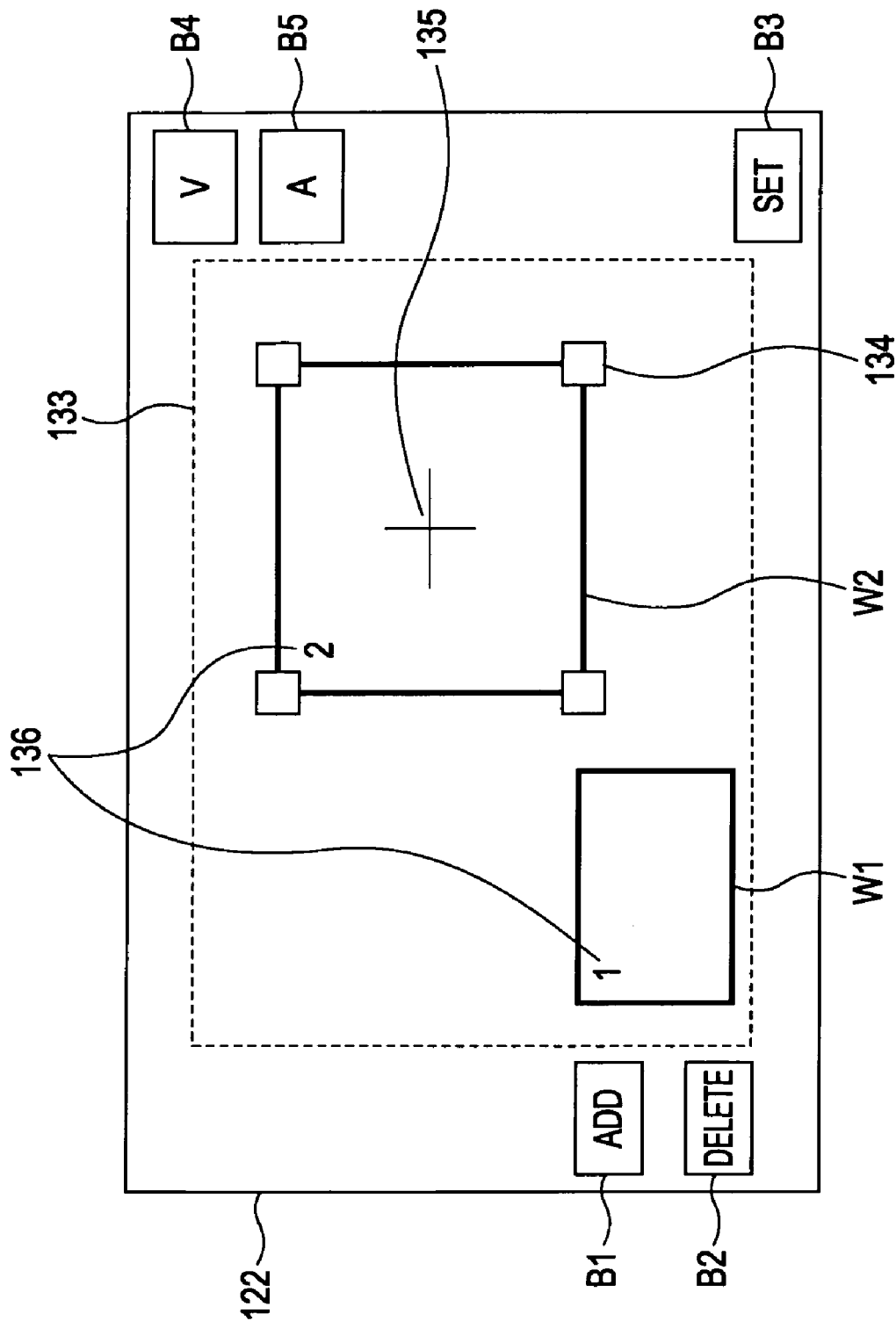
FIG. 23 is an explanatory diagram showing a motion detection area setting screen according to an embodiment.

For example, various window shapes shown in FIGS. 31A-31C are employable when a user sets motion detection windows as shown in FIG. 23 to create a motion pattern or as motion detection windows in motion patterns prestored in the image capturing apparatus 1.

FIG. 31A shows examples of motion detection windows in given shapes of geometrical figures. FIG. 31B shows an example of a motion detection window, which is a polygon formed by linking given positions. FIG. 31C shows an example shape of a motion detection window, which indicates a path enclosed by a hand-written curve.

That is, motion detection windows may be in any shape as long as a position and an area at which a moving object image is detected is specified.

A plurality of shapes of motion detection windows may be prepared and a user may be permitted to select the shape in an edit menu or at the time of the motion pattern setting depending on implementation of the image capturing apparatus 1.

2. Second Embodiment

Image Capturing Apparatus

A second embodiment of the present invention will now be described. The second embodiment is realized as an image capturing apparatus 1 having a configuration shown in FIG. 5. However, the second embodiment particularly discusses an example case where processing shown in FIG. 16B is employed in temporary storage processing.

Figure 32:
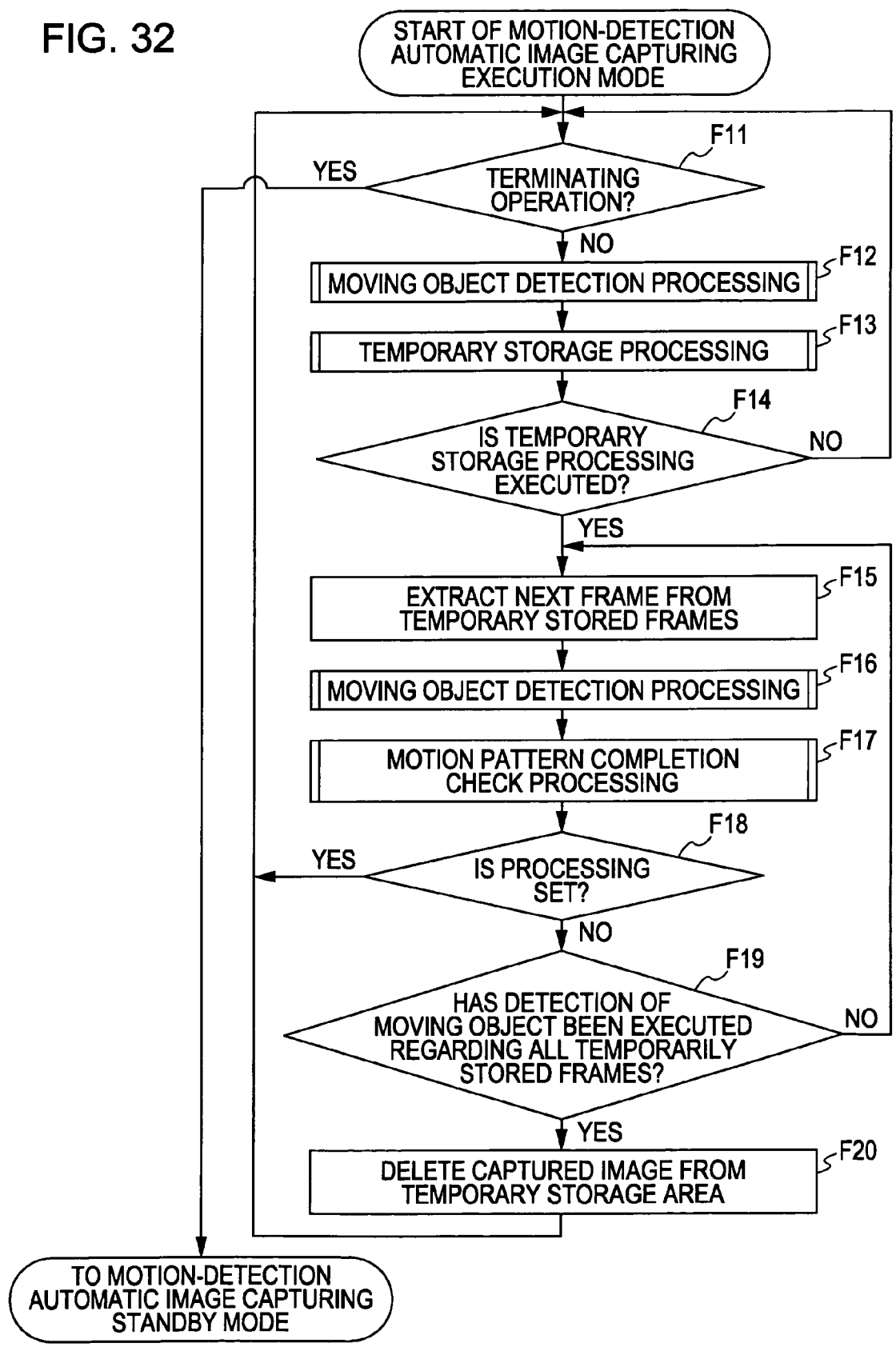
FIG. 32 is a flowchart showing processing performed in a motion-detection automatic image capturing execution mode according another embodiment.

FIG. 32 shows processing performed by a controlling unit 17 when the image capturing apparatus 1 is brought into a motion-detection automatic image capturing execution mode by a user operation.

STEP F11 indicates processing for monitoring a user's terminating operation as in the case of STEP F1 shown in FIG. 9.

At STEP F12, the controlling unit 17 causes a current frame resulting from image capturing to be transferred from an image memory 18 to a motion detecting unit 24 and causes the motion detecting unit 24 to execute moving object detection processing. The motion detecting unit 24 (and the controlling unit 17) executes the above-described processing shown in FIG. 10 at STEP F12.

After finishing the processing shown in FIG. 10, the controlling unit 17 performs temporary storage processing at STEP F13 shown in FIG. 32.

In this case, the controlling unit 17 executes processing shown in FIG. 16B.

First, the controlling unit 17 assigns different kinds of processing in accordance with whether an image capturing flag is ON at STEP F210. If the image capturing flag is OFF, the controlling unit 17 does not perform any processing and the process proceeds to STEP F14 shown in FIG. 32.

As described with reference to FIG. 10, when a moving object image touches a given motion detection window while satisfying a condition, the frame is determined to be a temporary storage target and the image capturing flag is set ON.

If the image capturing flag is ON, the process shown in FIG. 16B proceeds from STEP F210 to STEP F211.

At STEP F211, the controlling unit 17 starts counting a continuous shooting period. At STEP F212, the controlling unit 17 temporarily stores the frame image data in a nonvolatile memory 29. The image data may be compressed by the compressing/decompressing unit 19 at the time of the temporary storage or compression may be omitted at the time of the temporary storage. The image data is not necessarily temporarily stored in the nonvolatile memory 29. A plurality of corresponding frames may be managed as temporarily stored data in the image memory 18.

This processing is repeated until timeout of the continuous shooing period is detected at STEP F213.

More specifically, in this case, if the image capturing flag is set ON as a result of the moving object detection processing performed on a given frame image data, image data of a plurality of frames is temporarily stored in the nonvolatile memory 29 during a predetermined continuous shooting period in the temporary storage processing.

The temporarily stored frames are a plurality of frames, starting from a frame subjected to the moving object detection processing, captured during the continuous shooting period and transferred to the image memory 18.

After performing such temporary storage processing at STEP F13 shown in FIG. 32, the controlling unit 17 assigns different kinds of processing in accordance with whether the temporarily storage processing has been executed at STEP F14.

In this case, if the image capturing flag is OFF and the temporarily storage is not performed at STEP F13, the process returns to STEP F11. If the terminating operation is not detected at STEP F11, the controlling unit 17 performs the similar processing at STEP F12.

On the other hand, if a plurality of frames are temporarily stored at STEP F13, the process proceeds to STEP F15. The controlling unit 17 first extracts a frame, from image data of the plurality of temporarily stored frames, immediately after the frame subjected to the moving object detection processing at STEP F12.

The controlling unit 17 transfers the extracted frame image data to the motion detecting unit 24 and causes the motion detecting unit 24 to execute the moving object detection processing shown in FIG. 10 at STEP F16.

After the moving object detection processing performed at STEP F16, the controlling unit 17 performs motion pattern completion check operation shown in FIG. 17 at STEP F17.

In this case, the first frame serving as a trigger of temporary storage and the following frame are subjected to the moving object detection processing at STEPs F12 and F16, respectively. Using motion pattern check parameters (see FIG. 12B) reflecting the processing result, the controlling unit 17 can determine whether image data matches the motion pattern (or whether to check the following frame) through processing shown in FIG. 17.

If processing of STEPs F306 and F309 is not performed because a condition is not satisfied in the processing shown in FIG. 17 (if processing is not set), the process proceeds from STEP F18 to STEP F19. At STEP F19, the controlling unit 17 determines whether the moving object detection processing has been performed on all pieces of temporarily stored image data. If unprocessed image data of the following frame still exists, the process returns to STEP F15. The controlling unit 17 transfers image data of the following frame to the motion detecting unit 24. At STEP F16, the controlling unit 17 causes the motion detecting unit 24 to execute the above-described moving object detection processing shown in FIG. 10. After the moving object detection processing, the controlling unit 17 performs the motion pattern completion check processing shown in FIG. 17 at STEP F17.

If the condition matching the motion pattern is satisfied in the motion detection pattern completion check processing performed at STEP F17 in the process of such processing, the plurality of pieces of temporarily stored image data are validated at STEP F306 shown in FIG. 17.

More specifically, the controlling unit 17 stores the image data of a plurality of frames temporarily stored at STEP F13 in a memory card 90 as so-called continuously shot still images. If the image data is not compressed at the time of the temporary storage, the temporarily stored image data is compressed by the compressing/decompressing unit 19 at this point, is transferred to a memory card I/F unit 26, and is written in the memory card 90.

In this case, the processing is determined to be set at STEP F18, the process returns to STEP F11 and the controlling unit 17 starts the automatic image capturing operation in an initial state again.

On the other hand, if the condition matching the motion pattern is not satisfied in the motion detection pattern completion check processing performed at STEP F17 and, for example, an invalid flag is set ON, the invalidation processing is performed at STEP F309. In this case, the controlling unit 17 deletes the temporarily stored image data of the plurality of frames.

In this case, the processing is also determined to be set at STEP F18, the process returns to STEP F11 and the controlling unit 17 continues the automatic image capturing operation in an initial state again.

If the processing is continuously determined not to be set in the motion detection pattern completion check processing at STEP F17 and the moving object detection processing has completed for all of the temporarily stored frames, the process proceeds from STEP F19 to STEP F20. In this case, the controlling unit 17 determines that the temporarily stored image data of the plurality of frames does not match the motion pattern and deletes the temporarily stored image data of the plurality of frames. The process then returns to STEP F11 and the controlling unit 17 performs the automatic image capturing operation in an initial state again.

In the processing shown in FIG. 32, once the image capturing flag is set ON regarding image data of a given frame, frames following this frame captured during a period set as a continuous shooting period are temporarily stored. After the temporary storage, the controlling unit 17 performs the moving object detection processing and the motion detection pattern completion check processing on each frame to determine whether the temporarily stored frames are a series of images matching the motion pattern, and performs validation/invalidation processing.

Advantages similar to those of the above-descried first embodiment can be obtained using this processing example. The processing shown in FIG. 32 is particularly suitable for a case where the moving object detection processing and the motion detection pattern completion check processing are not completed within one frame period because of a relation between time taken for the moving object detection processing and the motion detection pattern completion check processing and the frame rate.

A plurality of frames, starting from a frame that is located chronologically before a frame subjected to the moving object detection processing at STEP F12, captured during the continuous shooting period may be temporarily stored. For example, if each captured frame is left in the image memory 18 during a predetermined time, a plurality of frames, starting from the frame located chronologically before the frame subjected to the moving object detection processing and including the frame subjected to the moving object detection processing, can be temporarily stored.

In this case, the frames to be temporarily stored may be continuous frames or intermittent frames, such as every other frame or every some frame, may be extracted and temporarily stored.

Although a plurality of frames captured during the continuous shooting period are temporarily stored, image data of a predetermined number of following frames may be temporarily stored without counting the time.

Needless to say, the continuous shooting period and the number of frames employed in the temporary storage may be set by the user.

Furthermore, an example in which the temporary storage processing shown in FIG. 16B is employed at STEP F3 of the processing shown in FIG. 9 according to the above-described first embodiment is also possible.

3. Third Embodiment

Image Capturing Apparatus

A third embodiment serving as a processing example that can be also realized as an image capturing apparatus 1 will be described with reference to FIG. 33. This processing example is for extracting images matching a specific selected motion pattern while the image capturing apparatus 1 is capturing a video.

Figure 33:
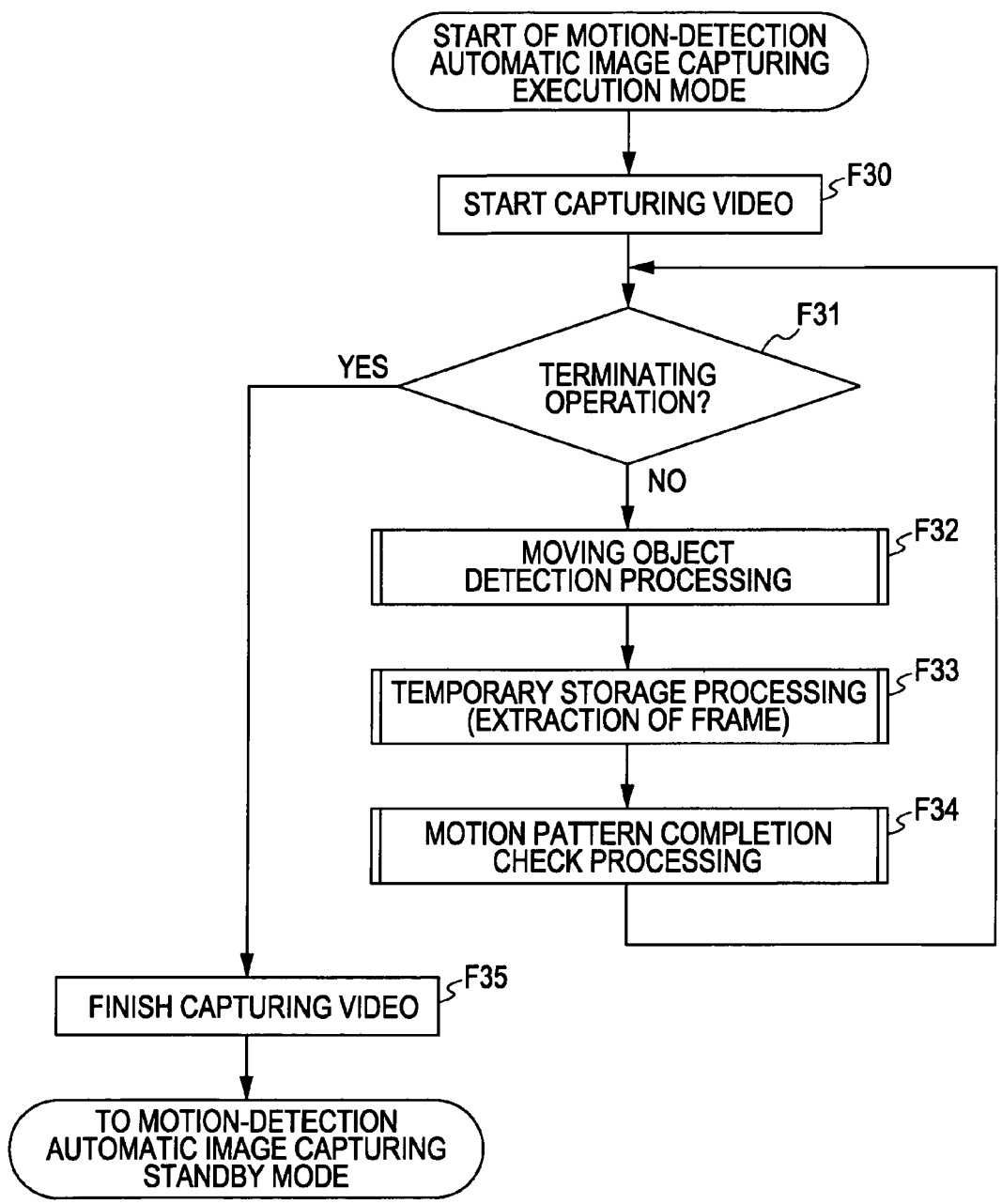
FIG. 33 is a flowchart showing processing performed in a motion-detection automatic image capturing execution mode according still another embodiment.

FIG. 33 shows processing performed by a controlling unit 17.

At STEP F30, the controlling unit 17 starts capturing a video in response to, for example, a user operation. More specifically, the controlling unit 17 executes processing for causing a compressing/decompressing unit 19 to compress image data of each frame of a video transferred to an image memory 18 through processing of an image pickup element 8, an analog signal processing unit 12, an A/D converting unit 13, and an image processing unit 15 and to transfer the compressed memory to a memory card I/F unit 26 so as to store the image data in a memory card 90 as video data.

In the process of such video capturing processing, the controlling unit 17 causes the motion detecting unit 24 to execute moving object detection processing at STEP F32. More specifically, the controlling unit 17 causes the data of a current frame, among image data of frames constituting the video, to be transferred from the image memory 18 to the motion detecting unit 24 and causes the motion detecting unit 24 to execute processing shown in FIG. 10.

At STEP F33, the controlling unit 17 executes temporary storage processing shown in FIG. 16A. At STEP F34, the controlling unit 17 executes motion detection pattern completion check processing shown in FIG. 17.

More specifically, the processing of STEPs F32, F33, and F34 is performed on image data of each frame in parallel to the video capturing operation.

In this case, image data that can be a candidate of the selected motion pattern, among the frames constituting the video, is temporarily stored in a nonvolatile memory 29. If the temporarily stored image data satisfies a condition for matching the motion pattern, the temporarily stored image data is stored in the memory card 90 or the like as a valid still image.

In this case, one or more pieces of image data matching the motion pattern among the captured video data are stored in the memory card 90 as still images while the video capturing being performed. A user can obtain still images at a time when a subject moves in a manner matching a specific motion pattern while capturing a video.

The still image data does not have to be stored independently from the video data. For example, in validation performed at STEP F306 shown in FIG. 17, the image data of the corresponding frame may be stored as still image data, which is independent from the video data. In addition, a method for marking a frame of video data used as a still image may also be employed.

For example, information indicating that this frame matches the motion pattern may be attached to the video data as metadata.

Alternatively, valid frame management information for managing corresponding frame numbers may be created. More specifically, the frame number and the time code of a validated frame determined to match the motion pattern are recorded.

According to these methods, matching frames can be extracted from video data thereafter using metadata or a frame number. That is, the image can be presented to a user in the similar manner that the image data is recorded as a still image.

As the validation processing performed on image data of one or more frames determined to match the motion pattern, the image data may be brought into an extractable state as valid images by attachment of the metadata, management of the frame number, or other methods.

By allowing automatic image capturing to be performed when image data matches the motion pattern during capturing of a video as in the third embodiment, the present invention can be utilized in a wide variety of image capturing styles.

Although still images matching a specific motion pattern are obtained during capturing of a video, the motion-detection automatic image capturing can be applied to general video capturing.

More specifically, the video capturing operation can be obviously executed by treating all pieces of image data as temporarily stored image data and ultimately storing only images matching the motion pattern as captured image data.

4. Fourth Embodiment

Image Processing Apparatus

An example for applying a fourth embodiment of the present invention to an information processing apparatus will be discussed. A personal computer is employed as an example of the information processing apparatus.

Figure 34:
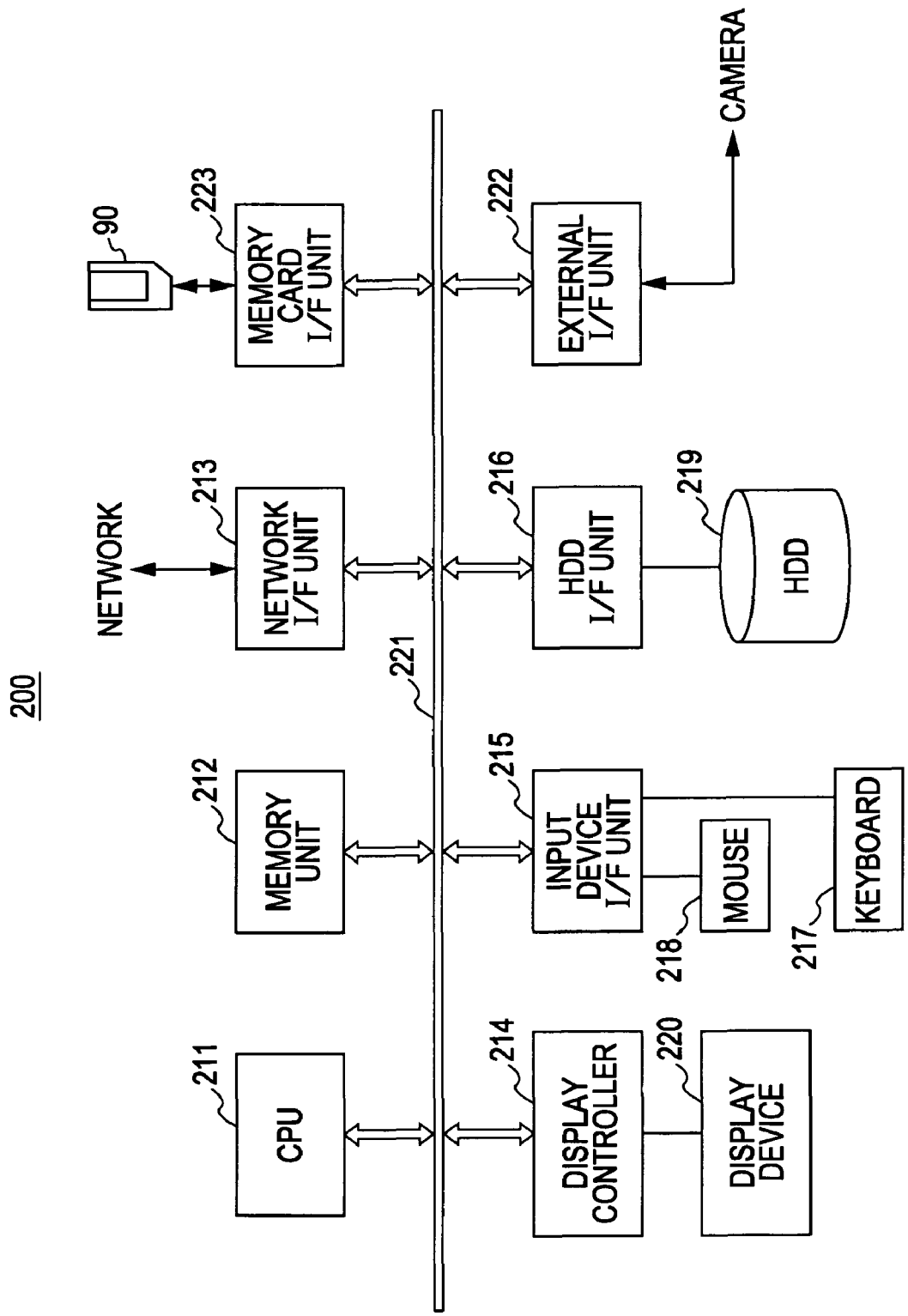
FIG. 34 is a block diagram showing a personal computer according to an embodiment.

FIG. 34 shows an example of a configuration of a personal computer (hereinafter, abbreviated as a "PC") 200.

As shown in the drawing, the PC 200 includes a central processing unit (CPU) 211, a memory unit 212, a network I/F unit 213, a display controller 214, an input device I/F unit 215, a HDD I/F unit 216, a keyboard 217, a mouse 218, an HDD 219, a display device 220, a bus 221, an external I/F unit 222, and a memory card I/F unit 223.

The CPU 211, which is a main controller of the PC 200, executes various kinds of control processing in accordance with programs stored in the memory unit 212. The CPU 211 is connected to other units through the bus 221.

A unique memory address or I/O address is granted to each device located on the bus 221. The CPU 211 can access the devices using these addresses. For example, the bus 221 may be a peripheral component interconnect (PCI) bus.

The memory unit 212 includes both of a volatile memory and a nonvolatile memory. For example, the memory unit 212 includes nonvolatile memories, such as a read only memory (ROM) for storing programs, a random access memory used as a processing work area and various temporary storage areas, and an electrically erasable and programmable read only memory (EEPROM).

This memory unit 212 stores program codes executed by the CPU 211, identification information unique to the PC 200, and other information and is used as a buffer areas of communication data and a work area of work data.

The network I/F unit 213 connects the PC 200 to a network, such as the Internet and a local area network (LAN), in accordance with a predetermined communication protocol, such as the Ethernet®. The CPU 211 can communicate with each device connected via the network through the network I/F unit 213.

The display controller 214 is a dedicated controller for actually processing draw commands issued by the CPU 211. The display controller 214 supports a bitmap drawing function for, for example, the super video graphic array (SVGA) or the extended graphic array (XGA). The draw data processed by the display controller 214 is temporarily stored in, for example, a frame buffer (not shown) and then output on the display device 220. The display device 220 may be, for example, an organic electroluminescence (EL) display, a cathode ray tube (CRT) display, or a liquid crystal display.

The input device I/F unit 215 is a device for connecting user input devices, such as the keyboard 217 and the mouse 218, to a computer system serving as the PC 200.

More specifically, a user performs input operations in the PC 200 using the keyboard 217 and the mouse 218 and the input operation information is supplied to the CPU 211 through the input device I/F unit 215.

The HDD I/F unit 216 performs interface processing of writing/reading out data in/from the HDD 219.

The HDD 219 is external storage device including a magnetic disk serving as a memory carrier in a fixed manner and has an advantage over other external storage devices with regard to storage capacity and data transfer speed. Storing software programs in the HDD 219 in an executable manner is called "installation" of the programs to the system. In general, the HDD 219 stores program codes of an operating system, application programs, and device drivers to be executed by the CPU 211 in a nonvolatile manner.

The various programs stored in the HDD 219 are loaded to the memory unit 212 at the time of booting of the PC 200 or activation of application programs corresponding to a user layer. The CPU 211 executes processing based on the programs loaded to the memory unit 212.

The external I/F unit 222 is an interface with external devices connected through, for example, the universal serial bus (USB).

In this embodiment, for example, a digital still camera, a video camera, or a video player may be employed as the external device.

The PC 200 can load image data from the digital still camera or the like in communication performed through this external I/F unit 222.

The external I/F unit 222 may be compliant with other interface standards, such as, for example, IEEE (Institute of Electrical and Electronics Engineers) 1394, in addition to the USB.

The memory card I/F unit 223 writes/reads data in/from the memory card 90.

By inserting the memory card 90 used in a digital still camera, such as the above-described image capturing apparatus 1, and a video camera, the memory card I/F unit 223 can load image data from the memory card 90.

In such a PC 200, the CPU 211 performs arithmetic processing/controlling operations based on a software structure, i.e., software such as application programs, the OS, and device drivers, whereby various operations are executed.

In this embodiment, processing shown in FIG. 35 to be described below is performed. A program for allowing the CPU 211 to execute this processing is installed in, for example, the HDD 219 and is loaded to the memory unit 212 at the time of booting. The CPU 211 executes arithmetic processing and controlling processing based on the program loaded to the memory unit 212.

Figure 35:
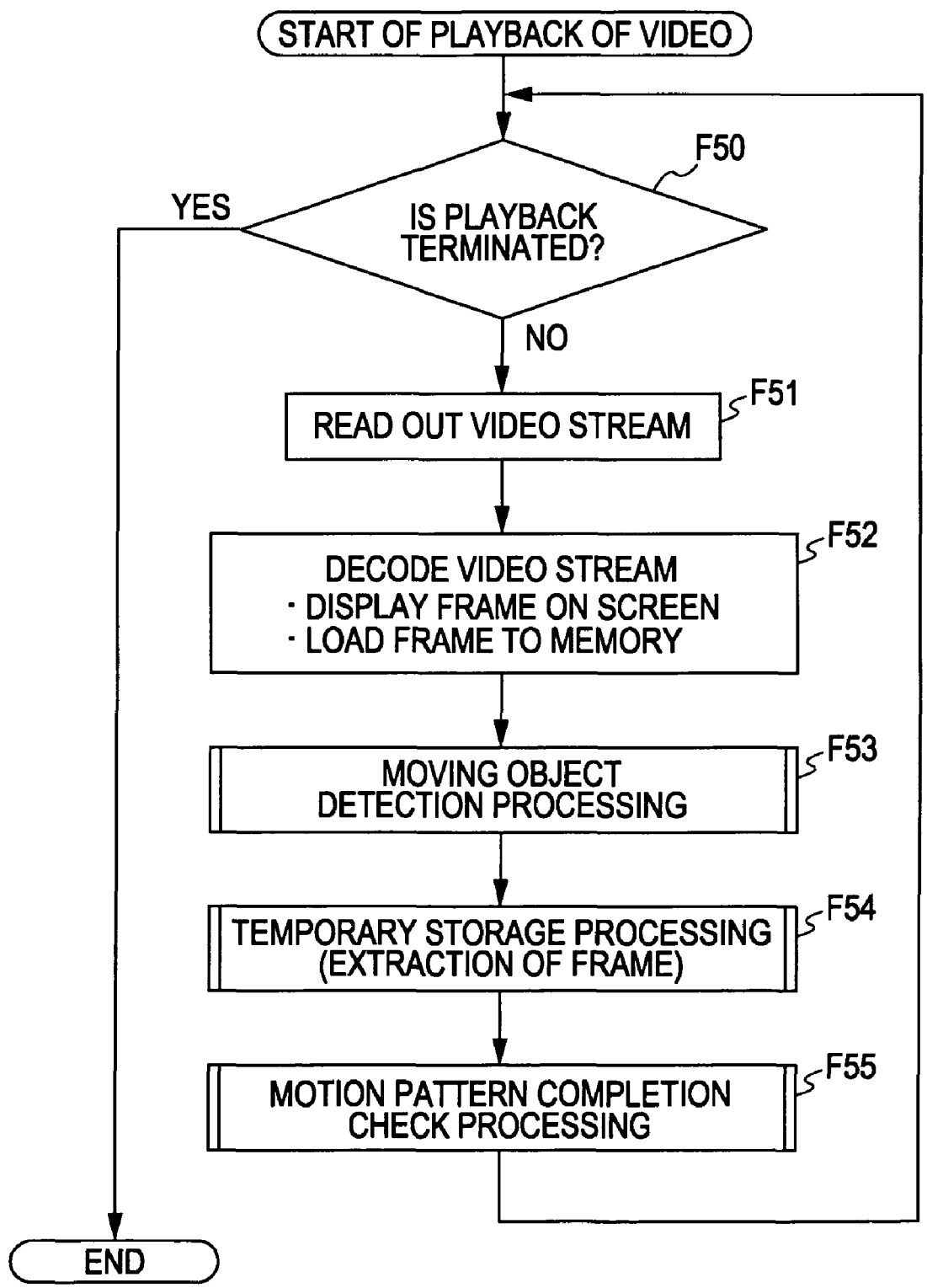
FIG. 35 is a flowchart showing processing performed during reproduction of a video according to another embodiment.

The program functioning in this embodiment and allowing the CPU 211 to execute the processing shown in FIG. 35 can be previously stored in the HDD, which is a recording medium included in a device such as the PC 200, and a ROM or a flash memory included in a microcomputer including the CPU.

Alternatively, the program can be temporarily or permanently stored (recorded) on removal media, such as a flexible disk, a compact disc read only memory (CD-ROM), a magneto-optical (MO) disk, a digital versatile disc (DVD), a blu-ray disc, a magnetic disk, a semiconductor memory, and a memory card. Such removable recording media can be provided as so-called package software.

In addition to installation of the program to a PC from removable recording media, the program may be downloaded from a download site via a network, such as a LAN and the Internet.

Various image contents can be stored in, for example, the HDD 219 of such a PC 200. For example, a user loads image content captured with a digital still camera or a video camera and store the image content in the HDD 219, thereby being able to play and enjoy the captured images using this PC 200.

In addition to image content captured by the user, the user can store, for example, image content played by an external video player and loaded from the external I/F unit 222 and image content downloaded by the network I/F unit 213 from an external server via a network in the HDD 219 and play the image content.

When video content is stored in the HDD 219 as such image content or when video content is stored in the memory card 90, the processing shown in FIG. 35 can be performed on the video content as an operation according to this embodiment.

FIG. 35 shows processing executed by the CPU 211 in accordance with a program.

A user specifies given video content and performs a playback operation, whereby the processing shown in FIG. 35 is started.

STEP F50 indicates processing for monitoring termination of playback. In response to a user's playback terminating operation or an end of playback of video content, the CPU 211 terminates the processing at STEP F50.

During playback, the CPU 211 repeats processing of STEPs F51 to F55.

At STEP F51, the CPU 211 controls reading of video stream data of video content subjected to playback from, for example, the HDD 219. Based on the control of the CPU 211, processing for reading out the video stream data is continuously performed in the HDD 219 and the HDD I/F unit 216.

At STEP F52, based on the control of the CPU 211, the video stream data is decoded, the decoded frame image data is displayed, and the frame image data is loaded to the memory.

More specifically, the video stream data sequentially read out from the HDD 219 or the like is decoded by the HDD I/F unit 216 and the CPU 211, is processed by the display controller 214, and is displayed on the display device 220. That is, a series of video playback processing is performed.

At this time, decoded image data of each frame is used in the processing of STEPs F53, F54, and F55, to be described later, while being temporarily stored in the memory unit 212.

At STEP F53, the CPU 211 performs moving object detection processing on a current frame. That is, the CPU 211 executes the processing shown in FIG. 10.

At STEP F54, the CPU 211 executes the processing shown in FIG. 16A as temporary storage processing. In this case, when an image capturing flag in FIG. 16A is ON, image data of the frame may be temporarily stored in a predetermined area of the memory unit 212 as the temporary storage processing.

At STEP F55, the CPU 211 executes the processing shown in FIG. 17 as motion detection pattern completion check processing.

More specifically, in this embodiment, the processing of STEPs F53, F54, and F55 is performed on image data of each frame during playback of a video. Through this operation, image data of candidate frames matching a motion pattern is temporarily stored. When the image data is determined to match the motion pattern, temporarily stored image data of one or more frames are validated.

For example, the image data may be stored in a predetermined area of the memory unit 212, the HDD 219, or the memory card 90 as still image data extracted from the video content.

By executing processing similar to those shown in FIGS. 10, 16A, and 17 in such a PC 200, images of a scene desired by a user, namely, images of a scene matching a motion pattern selected by the user, are extracted as one or more still images and stored during playback of a video. Needless to say, the images may be extracted and stored as a video instead of still images.

With this configuration, the user can readily extract scenes that the user particularly wants to extract from video content, convert the scenes into, for example, a file, and play and enjoy the file.

For example, the user can automatically extract still images or a video of an intended scene by executing the processing shown in FIG. 35 on, for example, video content captured with a video camera by the user, which is thus very convenient.

In this case, as the validation, the image data may be brought into an extractable state by attachment of the metadata, management of the frame number, or address management in the content instead of independently storing images of the scene. Furthermore, the images of the scene may be transferred to another device and stored in the other device.

Although it is assumed that the processing shown in FIG. 35 is executed while playing and displaying a video on the display device 220, the video does not have to be played and displayed at the same time.

More specifically, the processing shown in FIG. 35 is performed in response to the user's specification of video content without displaying the video content. As a result, still images or a video of a scene matching the motion pattern are extracted. Such processing is also acceptable. In such a case, the scene matching the desired motion pattern can be extracted with a shorter period by playing the video content at a high speed, which is thus more useful.

Although scene extraction is performed on video content stored in, for example, the HDD 219 or the memory card 90 in the above-described embodiment, various kinds of video contents may be subjected to the extraction processing.

Although not shown in FIG. 34, for example, image content recorded on an optical disc, such as a DVD or a blu-ray disc, can be played by connecting the PC 200 to a DVD drive or a blu-ray disc drive. In this case, a scene matching the desired motion pattern can be extracted by performing the processing shown in FIG. 35 on the video content recorded on the optical disc. Furthermore, when the PC 200 includes or is connected to a television broadcasting tuner, extraction of a scene matching the desired motion pattern may be performed on broadcasted content.

Although a PC is employed as example of an information processing apparatus in this embodiment, the present invention can be applied to, for example, a mobile phone, a personal digital assistant (PDA), a video game machine, a video editing equipment, and various information processing apparatuses using image data. In addition, the processing shown in FIG. 35 may be realized by the image capturing apparatus 1 (such as a digital still camera and a video camera) employed in the first embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   determining means for determining whether processing-target image data has image content matching a previously set motion pattern; and
   validating means for validating image data that is determined to match the motion pattern by the determining means,
   wherein the motion pattern corresponds to a plurality of motion detection windows, a direction for each window itself, and a spatial window order.

2. The apparatus according to claim 1, wherein the determining means performs:
   moving object detection processing for detecting an image of a moving object from image data of one frame and determining whether the image data of the one frame is a candidate constituting the motion pattern using the detected image of the moving object;
   temporary storage processing for temporarily storing image data that is determined to be a candidate constituting the motion pattern in the moving object detection processing; and
   pattern matching determining processing for determining whether the image data temporarily stored in the temporary storage processing is an image matching the motion pattern.

3. The apparatus according to claim 2, wherein the determining means determines, in the moving object detection processing, whether the image data of the one frame is a candidate constituting the motion pattern using the image of the moving object detected from the image data of the one frame and a motion detection window specifying a range on a screen as setting information of the motion pattern.

4. The apparatus according to claim 3, wherein the determining means checks, in the moving object detection processing, whether at least part of the image of the moving object is included in the range of the motion detection window as one kind of the processing for determining whether the image data is a candidate constituting the motion pattern.

5. The apparatus according to claim 3, wherein the determining means checks, in the moving object detection processing, whether a moving direction or a moving amount of the image of the moving object matches a moving direction or a moving amount set for the motion detection window as one kind of the processing for determining whether the image data is a candidate constituting the motion pattern.

6. The apparatus according to claim 2, the determining means temporarily stores, in the temporary storage processing, image data of a plurality of frames including the image data that is determined to be a candidate constituting the motion pattern in the moving object detection processing.

7. The apparatus according to claim 2, wherein, when a plurality of motion detection windows specifying ranges on a screen are set as setting information of the motion pattern,
   the determining means checks, in the pattern matching determining processing, whether the image of the moving object included in image data of each of the plurality of frames enters the respective ranges of the plurality of motion detection windows in motion represented by the plurality of frames in order to determine whether the temporarily stored image data of the plurality of frames is images matching the motion pattern.

8. The apparatus according to claim 2, wherein, when a plurality of motion detection windows specifying ranges on a screen are set as setting information of the motion pattern,
   the determining means checks, in the pattern matching determining processing, the order that the image of the moving object included in the image data of each of the plurality of frames enters the respective ranges of the plurality of motion detection windows in motion represented by the plurality of frames in order to determine whether the temporarily stored image data of the plurality of frames is images matching the motion pattern.

9. The apparatus according to claim 1, wherein a motion detection window specifying a range on a screen is set as setting information of the motion pattern, and
   wherein the determining means determines whether the image data including the image of the moving object has image content matching the motion pattern using a result obtained by checking whether the image of the moving object included in each image data enters the range of the motion detection window.

10. The apparatus according claim 1, wherein a plurality of motion detection windows specifying ranges on a screen are set as setting information of the motion pattern, and
    wherein the determining means determines whether the image data including the image of the moving object has image content matching the motion pattern using a result obtained by checking whether the image of the moving object included in each image data enters the respective ranges of the plurality of motion detection windows.

11. The apparatus according to claim 1, wherein a motion detection window specifying a range on a screen is set as setting information of the motion pattern, and
    wherein the determining means determines whether the image data including the image of the moving object has image content matching the motion pattern using a result obtained by checking whether the image of the moving object included in each image data enters the range of the motion detection window while having a direction or a moving amount set for the motion detection window.

12. The apparatus according claim 1, wherein a plurality of motion detection windows specifying ranges on a screen are set as setting information of the motion pattern, and wherein the determining means determines whether the image data including the image of the moving object has image content matching the motion pattern using a result obtained by checking the order that the image of the moving object included in each image data enters the respective ranges of the plurality of motion detection windows.

13. The apparatus according to claim 1, wherein the validating means records, as the validation, image data that is determined to match the motion pattern on a recording medium.

14. The apparatus according to claim 1, wherein the validating means creates, as the validation, a state in which the image data that is determined to match the motion pattern can be extracted as valid image data.

15. The apparatus according to claim 1, wherein the validating means discards image data that is determined not to match the motion pattern.

16. An image processing method comprising the steps of using a processor for:
   determining whether processing-target image data has image content matching a previously set motion pattern; and
   processing image data determined to match the motion pattern as valid image data,
wherein the motion pattern corresponds to a plurality of motion detection windows, a direction for each window itself, and a spatial window order.

17. A non-transitory computer-readable medium having stored thereon a computer-readable program for allowing a computer to execute an image processing method, the image processing method comprising the steps of:
   determining whether processing-target image data has image content matching a previously set motion pattern; and
   processing image data determined to match the motion pattern as valid image data,
wherein the motion pattern corresponds to a plurality of motion detection windows, a direction for each window itself, and a spatial window order.

18. An image processing apparatus comprising:
   a determining unit configured to determine whether processing-target image data has image content matching a previously set motion pattern; and
   a validating unit configured to validate image data that is determined to match the motion pattern by the determining unit,
wherein the motion pattern corresponds to a plurality of motion detection windows, a direction for each window itself, and a spatial window order.

* * * * *